(12) United States Patent
Lee et al.

(10) Patent No.: US 12,706,619 B2
(45) Date of Patent: Aug. 11, 2026

(54) ELECTRONIC DEVICE FOR PROCESSING RADIO SIGNAL FOR PLURALITY OF COMMUNICATION SYSTEMS AND OPERATING METHOD THEREOF

(71) Applicant: Samsung Electronics Co., Ltd., Suwon-si (KR)

(72) Inventors: Hyosung Lee, Suwon-si (KR); Hyoseok Na, Suwon-si (KR); Namjun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 18/608,351

(22) Filed: Mar. 18, 2024

(65) Prior Publication Data

US 2024/0223225 A1 Jul. 4, 2024

Related U.S. Application Data

(63) Continuation of application No. PCT/KR2023/020549, filed on Dec. 13, 2023.

(30) Foreign Application Priority Data

Dec. 13, 2022 (KR) ........................ 10-2022-0173973
Feb. 14, 2023 (KR) ........................ 10-2023-0019284

(51) Int. Cl.
*H04B 1/00* (2006.01)
*H04B 1/40* (2015.01)

(52) U.S. Cl.
CPC ............. *H04B 1/0064* (2013.01); *H04B 1/40* (2013.01)

(58) Field of Classification Search
CPC .. H04B 1/0064; H04B 1/0053; H04B 1/0067; H04B 1/0075; H04B 1/40; H04B 1/403; H04B 1/405; H04B 1/50
See application file for complete search history.

(56) References Cited

U.S. PATENT DOCUMENTS 5,038,150 A 8/1991 Bains
10,014,901 B1 7/2018 Wang
(Continued)

FOREIGN PATENT DOCUMENTS

CN 113992224 A 1/2022
JP 07-087414 9/1995
(Continued)

OTHER PUBLICATIONS

Search Report dated Mar. 14, 2024 in International Patent Application No. PCT/KR2023/020549.
(Continued)

*Primary Examiner* — Keith Ferguson

(74) *Attorney, Agent, or Firm* — Nixon & Vanderhye, P.C.

(57) ABSTRACT

An example electronic device may include a first transmission mixer configured to up-convert transmission signals, a second transmission mixer configured to up-convert signals output by the first transmission mixer, a divider circuit configured to divide signals output by the second transmission mixer, first antenna ports associated with a first antenna structure for performing first frequency band communication based on signals output by the divider circuit, a third transmission mixer configured to up-convert output signals from the divider circuit, and second antenna ports associated with a second antenna structure for performing second frequency band communication based on signals output by the third transmission mixer.

20 Claims, 16 Drawing Sheets

(56) References Cited

U.S. PATENT DOCUMENTS

| | | | | |
|---|---|---|---|---|
| 10,707,924 | B2 | 7/2020 | Kim et al. | |
| 11,095,340 | B2 | 8/2021 | Park et al. | |
| 11,108,418 | B2 | 8/2021 | Choi | |
| 11,368,174 | B2 | 6/2022 | Huang | |
| 11,444,653 | B2 | 9/2022 | Lee et al. | |
| 11,557,842 | B2 | 1/2023 | Cho et al. | |
| 12,101,108 | B2 | 9/2024 | Brunel | |
| 2009/0009392 | A1 | 1/2009 | Jacomb-hood | |
| 2014/0036777 | A1 | 2/2014 | Kokkinos et al. | |
| 2014/0045478 | A1 | 2/2014 | Moshfeghi | |
| 2015/0214633 | A1 | 7/2015 | Pan | |
| 2020/0295450 | A1 | 9/2020 | Park et al. | |
| 2021/0184719 | A1 | 6/2021 | Lee et al. | |
| 2024/0098530 | A1* | 3/2024 | Bar-Or Tillinger .. | H04B 7/0695 |

FOREIGN PATENT DOCUMENTS

| | | | |
|---|---|---|---|
| JP | 6009251 | B2 | 9/2016 |
| KR | 10-1806173 | | 12/2017 |
| KR | 10-2020-0003615 | | 1/2020 |
| KR | 10-2021-0135098 | | 11/2021 |
| KR | 10-2427572 | | 7/2022 |
| KR | 102444887 | B1 | 9/2022 |
| WO | 2020/149434 | | 7/2020 |

OTHER PUBLICATIONS

Written Opinion dated Mar. 14, 2024 in International Patent Application No. PCT/KR2023/020549.

Extended Search Report dated Jan. 13, 2026 in European Patent Application No. 23904000.9.

* cited by examiner 200
201
202
203
210
211
212
220
221
222
230
231
232
240
250
260
WIRELESS COMMUNICATION CIRCUIT
PMIC
IFIC
CP
AP FIG. 3A
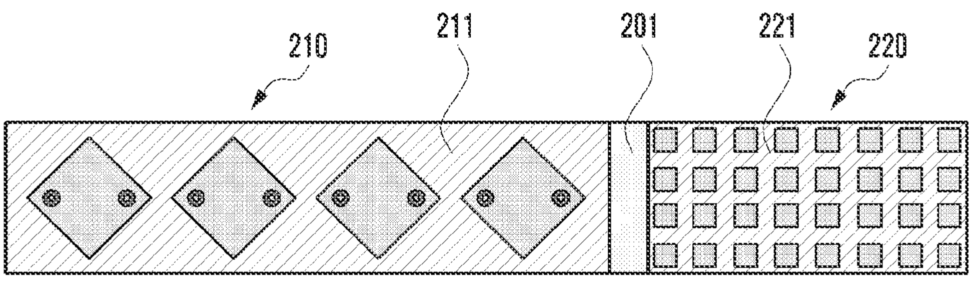
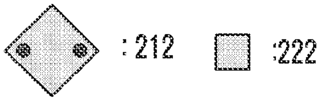

610
611-1
612-1
613-1
614-1
615-1
616-1
610-1
611-n1
612-n1
613-n1
614-n1
615-n1
616-n1
610-n1
620
621-1
622-1
623-1
624-1
655-1
656-1
620-1
621-n2
622-n2
623-n2
624-n2
655-n2
656-n2
620-n2
650
651
652
653-1
653-n2
1 : n2
Divider (LO)
630
631
633
634
635
637
639
643
645
647
649
1 : N
Combiner (RX)
1 : N
Divider (TX)
IF2

710
711-1
710-1
712-1
713-1
714-1
715-1
716-1
711-n1
710-n1
712-n1
713-n1
714-n1
715-n1
716-n1
720
721-1
720-1
722-1
723-1
724-1
753-1
754-1
755-1
756-1
721-n2
720-n2
722-n2
723-n2
724-n2
753-n2
754-n2
755-n2
756-n2
1 : n2
Divider (LO)
752
751
750
1 : N
Combiner (RX)
1 : N
Divider (TX)
747
745
743
730
749
734
IF2
731
739
737
735
733

810
811-1
810-1
812-1
813-1
814-1
811-n1
810-n1
812-n1
813-n1
814-n1
820
821-1
820-1
822-1
823-1
824-1
821-n2
820-n2
822-n2
823-n2
824-n2
830
831
833
837
839
843
847
849
1 : N Divider (TX)
1 : N Combiner (RX)
IF
850
851
852
1 : n2 Divider
853-1
853-n2
855-1
855-n2
856-1
856-n2
860
861
862
1 : n1 Divider
863-1
863-n1
865-1
865-n1
866-1
866-n1

FIG. 9

1010
1010-1
1010-n1
1020
1020-1
1020-n2
1011-1
1012-1
1013-1
1014-1
1010-1
1017-1
1015-1
1021-1
1023-1
1022-1
1020-1
1024-1
1056-1
1055-1
1027-1
1025-1
1 : n2
Divider
1052
1051
1021-n2
1022-n2
1020-n2
1024-n2
1023-n2
1056-n2
1027-n2
1055-n2
1025-n2
1011-n1
1012-n1
1010-n1
1013-n1
1014-n1
1017-n1
1015-n1
1037
1 : N
Divider (TX)
1 : N
Combiner (RX)
1047
1034
1035
1045
1033
1031
1043
1039
1049
1030

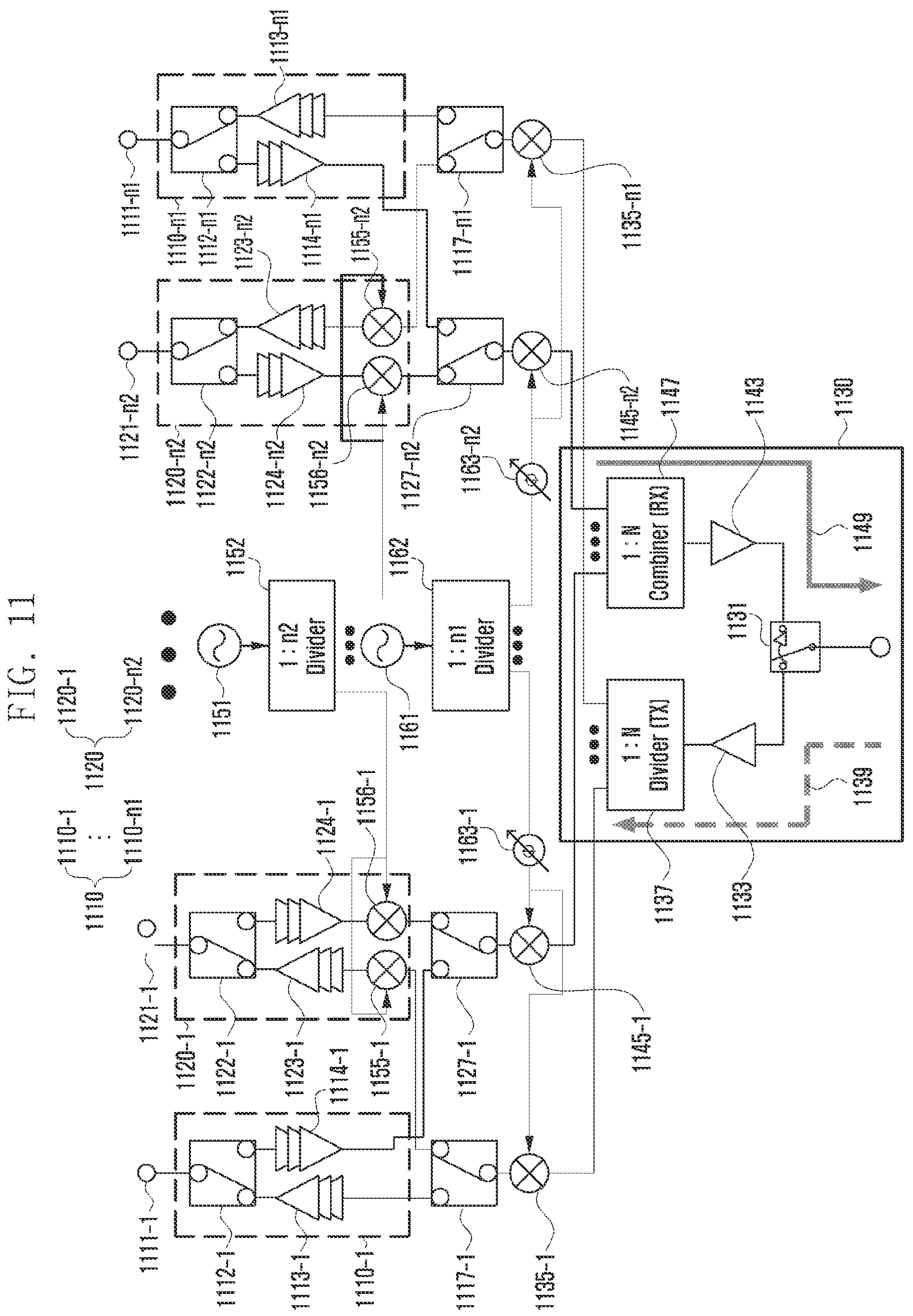

1310
1310-1
1311-1
1312-1
1313-1
1314-1
1315-1
1316-1
1310-n1
1311-n1
1312-n1
1313-n1
1314-n1
1315-n1
1316-n1
1320
1320-1
1321-1
1322-1
1323-1
1324-1
1353-1
1354-1
1320-n2
1321-n2
1322-n2
1323-n2
1324-n2
1353-n2
1354-n2
1:n1 Divider
1:n2 Divider
1:2 Divider
1:n1 Combiner
1:n2 Combiner
1:2 Combiner
1361
1362
1337
1364
1363
1371
1372
1347
1374
1373
1345
1343
1334
1335
1333
1331
IF2
Ref. CLK
1351

FIG. 14

ELECTRONIC DEVICE FOR PROCESSING RADIO SIGNAL FOR PLURALITY OF COMMUNICATION SYSTEMS AND OPERATING METHOD THEREOF

CROSS-REFERENCE TO RELATED APPLICATIONS

This application is a continuation of PCT/KR2023/020549, designating the United States, filed Dec. 13, 2023, in the Korean Intellectual Property Receiving Office, which claims priority to Korean Patent Application No. 10-2022-0173973, filed on Dec. 13, 2022, in the Korean Intellectual Property Office and to Korean Patent Application No. 10-2023-0019284, filed on Feb. 14, 2023, in the Korean Intellectual Property Office. The contents of each of these applications are incorporated by reference herein in their entireties.

BACKGROUND

Field

The disclosure relates to a device and a method for processing radio signals for multiple communication systems.

Description of Related Art

In line with development of information/communication technologies and semiconductor technologies, electronic devices can provide various functions. For example, electronic devices can provide not only voice communication functions, but also wireless communication functions (for example, long-term evolution (LTE), LTE-A (advanced), or $5^{th}$ generation new radio (5G NR)).

5G communication systems have been developed after commercialization of 4G communication systems in order to satisfy the demand for wireless data traffic increased by various electronic devices, and there have also been efforts to develop $6^{th}$ generation (6G) communication systems. A 5G communication system may be implemented in a millimeter wave (mmWave) band of 6 GHz or higher (for example, a band between 20 GHz and 60 GHz). A 6G communication system may be implemented in a terahertz (THz) high-frequency band (for example, a band between 100 GHz and 10 THz) in order to accomplish a high data transmission rate.

An electronic device may generate and/or restore radio frequency (RF) signals to perform a wireless communication function. In order to support multiple communication systems such as a 5G communication system and a 6G communication system, an electronic device may need circuits for processing RF signals (for example, radio frequency front ends (RFFE)), respectively, and the circuits for processing RF signals may occupy a large physical area in the electronic device.

SUMMARY

An electronic device according to various embodiments may include multiple first antenna ports connected to a first antenna structure for mmWave band communication, multiple second antenna ports connected to a second antenna structure for THz high-frequency band communication, a first transmission mixer configured to up-convert a signal, a first reception mixer configured to down-convert a signal, a second transmission mixer connected to the multiple second antenna ports and configured to up-convert a signal, a second reception mixer connected to the multiple second antenna ports and configured to down-convert a signal, a third transmission mixer configured to up-convert a signal and transfer the signal to the first transmission mixer, a third reception mixer configured to down-convert a signal transferred from the first reception mixer, a divider circuit configured to divide a signal up-converted in the first transmission mixer and transfer the signal to at least one of the multiple first antenna ports or the second transmission mixer, and a combiner circuit configured to combine signals received from at least one of the multiple first antenna ports or the second reception mixer and provide the combined signals to the first reception mixer.

An electronic device according to various embodiments may include a first antenna structure including multiple antenna elements for mmWave band communication, a second antenna structure including multiple antenna elements for THz high-frequency band communication, and a circuit configured to transmit or receive a radio frequency signal through the first antenna structure or the second antenna structure. The circuit may include multiple first antenna ports connected to the multiple antenna elements of the first antenna structure, multiple second antenna ports connected to the multiple antenna elements of the second antenna structure, a first transmission mixer configured to up-convert a signal, a first reception mixer configured to down-convert a signal, a second transmission mixer connected to the multiple second antenna ports and configured to up-convert a signal, a second reception mixer connected to the multiple second antenna ports and configured to down-convert a signal, a third transmission mixer configured to up-convert a signal and transfer the signal to the first transmission mixer, a third reception mixer configured to down-convert a signal transferred from the first reception mixer, a divider circuit configured to divide a signal up-converted in the first transmission mixer and transfer the signal to at least one of the multiple first antenna ports or the second transmission mixer, and a combiner circuit configured to combine signals received from at least one of the multiple first antenna ports or the second reception mixer and provide the combined signals to the first reception mixer.

BRIEF DESCRIPTION OF THE DRAWINGS

The above and/or other aspects of the disclosure will be more apparent by describing certain embodiments of the disclosure with reference to the accompanying drawings, in which:

FIG. 3A and FIG. 3B illustrate example electronic devices configured to process radio signals for multiple communication systems according to various embodiments;

FIG. 9 illustrates an example wireless communication circuit structure configured to process radio signals for multiple communication systems in an example electronic device according to various embodiments;

FIG. 11 illustrates an example wireless communication circuit structure configured to process radio signals for multiple communication systems in an example electronic device according to various embodiments;

FIG. 14 illustrates an example wireless communication circuit structure configured to process radio signals for multiple communication systems in an example electronic device according to various embodiments.

DETAILED DESCRIPTION

Hereinafter, various example embodiments will be described in detail with reference to the attached drawings.

Figure 1:
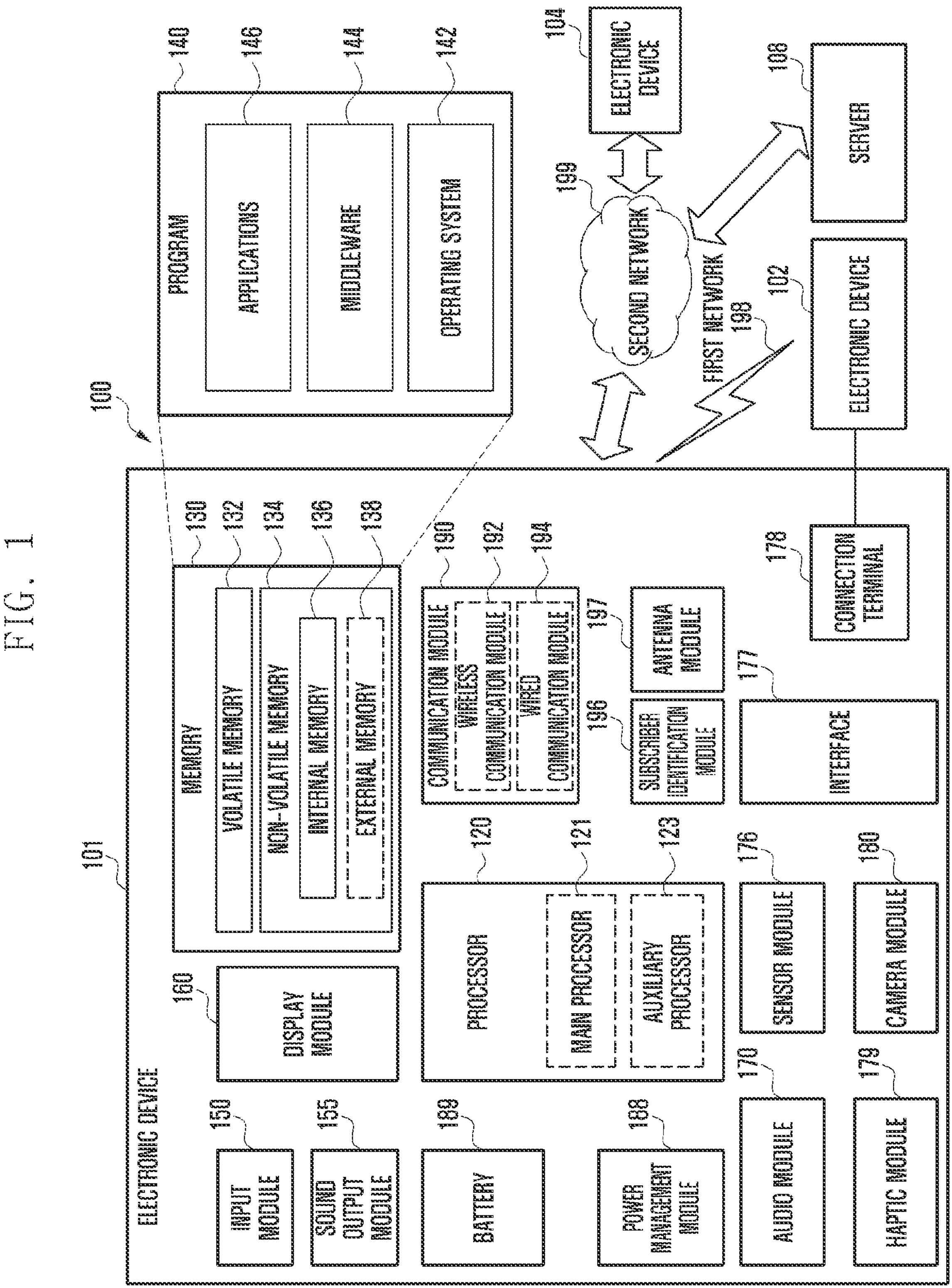
FIG. 1 is a block diagram of an example electronic device inside a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and are intended include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readables to 내 rage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
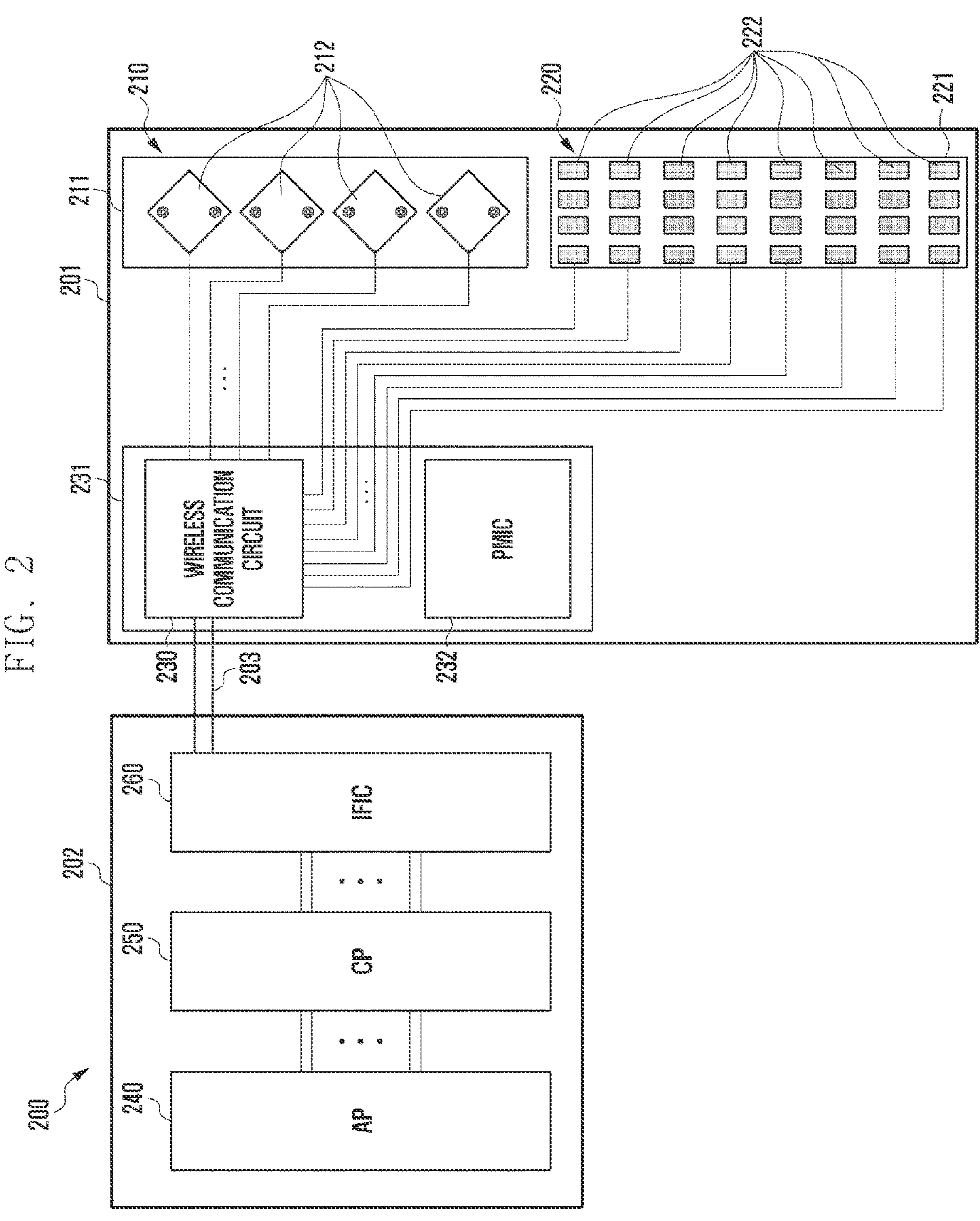
FIG. 2 is a block diagram of an example electronic device configured to process radio signals for multiple communication systems according to various embodiments.

FIG. 2 is a block diagram of an example electronic device 200 (for example, the electronic device 101 in FIG. 1) configured to process radio signals for multiple communication systems. The block diagram of electronic device 200 is an example of a structure for processing signals transmitted and/or received in the electronic device 200 in order to perform a wireless communication function. Among illustrated components, some components may be implemented redundantly as multiple entities, omitted, or integrated, and components of the electronic device 101 illustrated in FIG. 1 other than those illustrated may be additionally included.

According to various embodiments, the electronic device 200 may include components for supporting multiple communication systems including a first communication system (for example, a 5G communication system) and a second communication system (for example, a 6G communication system).

The electronic device 200 according to various embodiments may include a first antenna structure 210, a second antenna structure 220, a wireless communication circuit 230, an application processor 240 (for example, the processor 120 in FIG. 1), and a communication processor 250 (for example, the auxiliary processor 123 in FIG. 1).

According to various embodiments, the application processor 240 may perform various kinds of data processing or computation to control at least one other component (for example, the communication processor 250) included in the electronic device 200.

According to an embodiment, the electronic device 200 may further include an intermediate frequency integrated circuit (IFIC) 260 separately from the communication processor 250, for signal processing. For example, the communication processor 250 may generate a baseband signal for direct communication or wireless communication and may transfer the same to the IFIC 260. According to an embodiment, the communication processor 250 and the IFIC 260 may be implemented inside a single chip or a single package.

According to an embodiment, the IFIC 260 may up-convert a baseband signal transferred from the communication processor 250 into an IF signal and may transfer the same to the wireless communication circuit 230. For example, the IFIC 260 may down-convert an IF signal transferred from the communication circuit 230 into a baseband signal and may transfer the same to the communication processor 250. The communication processor 250 may process the baseband signal transferred from the IFIC 260.

According to various embodiments, the wireless communication circuit 230 may up-convert a baseband signal acquired from the communication processor 250 into an RF signal in a designated band. The wireless communication circuit 230 may down-convert an RF signal received through the first antenna structure 210 and/or the second antenna structure 220 into a baseband signal and may transfer the same to the communication processor 250.

According to various embodiments, if the electronic device 200 includes the IFIC 260, the wireless communication circuit 230 may up-convert an IF signal acquired from the IFIC 260 into an RF signal in a designated band. The wireless communication circuit 230 may down-convert an RF signal received through the first antenna structure 210 and/or the second antenna structure 220 into an IF signal and may transfer the same to the IFIC 260.

According to various embodiments, two antenna structures (the first antenna structure 210 and the second antenna structure 220) are illustrated as being connected to the wireless communication circuit 230, but the number of antenna structures is not limited to two, and multiple antenna structures may be connected to the wireless communication circuit 230.

According to various embodiments, a pair of two different antenna structures (the first antenna structure 210 and the second antenna structure 220) is illustrated as being connected to the wireless communication circuit 230, but the number of antenna structures connected to the wireless communication circuit 230 is not limited thereto, and multiple antenna structures may be connected to the wireless communication circuit.

According to an embodiment, the communication processor 250 may support wireless communication for the first communication system or the second communication system. According to an embodiment, the first communication system may include a 5G communication network (for example, new radio (NR)) implemented in a millimeter wave (mmWave) band (for example, about 20 GHz to about 60 GHz) (hereinafter, referred to as a first frequency band) among bands to be used for wireless communication through a long-distance communication network (for example, the second network 199 in FIG. 1) defined by 3GPP. According to an embodiment, the second communication system may include a 6G communication network implemented in a terahertz (THz) high-frequency band (for example, about 100 GHz to about 10 THz) (hereinafter, referred to as a second frequency band) among bands to be used for wireless communication through the long-distance communication network.

According to various embodiments, during transmission, the IFIC 260 may convert a baseband signal generated by the communication processor 250 into a designated frequency band (for example, a radio frequency (RF) signal of about 700 MHz to about 3 GHZ) (hereinafter, referred to as an intermediate frequency signal or IF signal) and may transfer the same to the wireless communication circuit 230. According to various embodiments, during reception, the IFIC 260 may convert an RF signal (IF signal) in a designated frequency band, preprocessed by the wireless communication circuit 230, into a baseband signal such that the same can be processed by the communication processor 250. An example in which the IFIC 260 and the communication processor 250 are implemented as separate components has been described above, but embodiments are not limited thereto, and the IFIC 260 may be implemented integrally with the communication processor 250, for example.

According to various embodiments, the communication processor 250 may be connected to the processor 240 to transmit and/or receive control information and packet data information. For example, the communication processor 250 and the processor 240 may transmit and/or receive data through an HS-UART interface or a PCIe interface, but the type of interface is not limited. For example, the communication processor 250 and the processor 240 may exchange control information and packet data information using a shared memory.

According to an embodiment, the application processor 240, the communication processor 250, and the IFIC 260 may be formed inside a single chip or a single package. For example, the application processor 240, the communication processor 250, and the IFIC 260 may be disposed on a second printed circuit board 202 (for example, a main PCB). The second printed circuit board 202 may be formed as a rigid flexible printed circuit board, for example.

According to an embodiment, the electronic device 200 may further include a power management integrate circuit (PMIC) 232 for supplying power to various components (for example, the wireless communication circuit 230).

According to an embodiment, during transmission, the wireless communication circuit 230 may convert a baseband signal generated by the communication processor 250 or an IF signal generated by the IFIC 260 into a first frequency band signal used in the first communication system and/or a second frequency band signal used in the second communication system.

According to an embodiment, during transmission, the wireless communication circuit 230 may convert a baseband signal generated by the communication processor 250 or an IF signal generated by the IFIC 260 into a first frequency band signal used in the first communication system and may convert the first frequency band signal into a second frequency band signal used in the second communication system.

According to an embodiment, the wireless communication circuit 230 may include first components for converting a baseband signal generated by the communication processor 250 or an IF signal generated by the IFIC 260 into a first frequency band signal used in the first communication system and transferring the same to the first antenna structure 210 and/or the second antenna structure 220, during transmission, and second components for receiving the first frequency band signal from the first components, converting the same into a second frequency band used in the second communication system, and transferring the same to the second antenna structure 220.

According to various embodiments, during reception, the wireless communication circuit 230 may convert a first frequency band signal used in the first communication system and/or a second frequency band signal used in the second communication system, acquired through the first antenna structure 210 and/or the second antenna structure 220, into a baseband signal or an IF band signal such that the same can be processed by the IFIC 260 or the communication processor 250.

According to an embodiment, during reception, the wireless communication circuit 230 may convert an RF signal in a first frequency band used in the first communication system, acquired through the first antenna structure 210, into a baseband signal or an IF band signal such that the same can be processed by the IFIC 260 or the communication processor 250.

According to an embodiment, during reception, the wireless communication circuit 230 may convert an RF signal in a second frequency band used in the second communication system, acquired through the second antenna structure 220, into an RF signal in a first frequency band used in the first communication system and may then convert the RF signal in the first frequency band into a baseband signal or an IF band signal such that the same can be processed by the IFIC 260 or the communication processor 250.

According to an embodiment, the wireless communication circuit 230 may include third components for converting an RF signal in a first frequency band used in the first communication system, acquired through the first antenna structure 210, into a baseband signal or an IF band signal such that the same can be processed by the IFIC 260 or the communication processor 250, during reception.

According to an embodiment, the wireless communication circuit 230 may include fourth components for converting an RF signal in a second frequency band used in the second communication system, acquired through the second antenna structure 220, into an RF signal in a first frequency band used in the first communication system, during reception. According to an embodiment, during reception, the wireless communication circuit 230 may convert an RF signal in a first frequency band, which has been acquired through the second antenna structure 220 and converted through the fourth components, into a baseband signal or an IF band signal through the third components such that the same can be processed by the IFIC 260 or the communication processor 250.

According to an embodiment, the first antenna structure 210 may support wireless communication for the first communication system. According to an embodiment, the first antenna structure 210 may be implemented to transmit and/or receive RF signals in a millimeter wave (mmWave) band (for example, about 20 GHz to about 60 GHz) (hereinafter, referred to as a first frequency band) among bands to be used for wireless communication through a long-distance communication network (for example, the second network 199 in FIG. 1) defined by 3GPP.

According to an embodiment, the second antenna structure 220 may support wireless communication through the second communication system. According to an embodiment, the second antenna structure 220 may be implemented to transmit and/or receive RF signals in a terahertz (THz) high-frequency band (for example, about 100 GHz to about 10 THz) (hereinafter, referred to as a second frequency band) among bands to be used for wireless communication through the long-distance communication network.

Figure 3B:
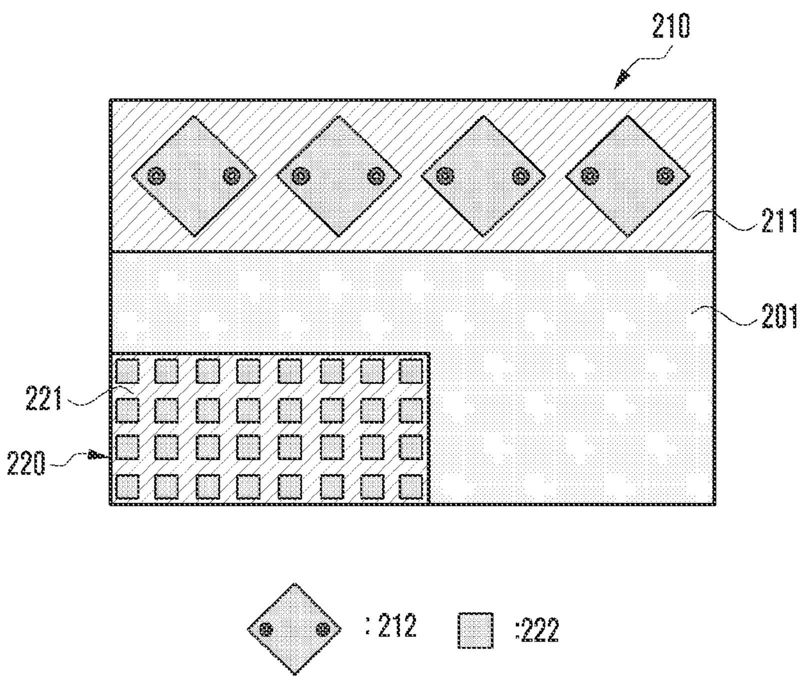

FIG. 3A and FIG. 3B illustrate example dispositions of the first antenna structure 210 and the second antenna structure 220.

According to an embodiment, the first antenna structure 210, the second antenna structure 220, and the wireless communication circuit 230 may be disposed on a first printed circuit board 201.

According to an embodiment, the first antenna structure 210 may include multiple first antenna elements 212 disposed to form a directional beam, as an array antenna.

According to an embodiment, the multiple first antenna elements 212 may be disposed in a first area 211 of the first printed circuit board 201. According to an embodiment, the multiple first antenna elements 212 may be disposed inside the first printed circuit board 201 to be adjacent to the first area 211. According to an embodiment, the multiple first antenna elements 212 may be disposed at a predetermined interval. As an example, the multiple first antenna elements 212 may have a substantially identical configuration (for example, size, shape, thickness, and/or material). As an example, the first antenna structure 210 may include four first antenna elements 212 as illustrated, but the number of first antenna elements 212 included in the first antenna structure 210 is not limited thereto, and the same may include multiple first antenna elements 212.

According to various embodiments, the second antenna structure 220 may include multiple second antenna elements 222 disposed to form a directional beam, as an array antenna. According to an embodiment, the multiple second antenna elements 222 may be disposed in a second area 221 of the first printed circuit board 201 or inside the second printed circuit board 201 or adjacent to the second area 221. According to an embodiment, the multiple second antenna elements 222 may be disposed at a predetermined interval. As an example, the multiple second antenna elements 222 may have a substantially identical configuration (for example, size, shape, thickness, and/or material). As an example, the second antenna structure 220 may include 32 second antenna elements 222 as illustrated, for example, but the number of second antenna elements 222 included in the second antenna structure 220 is not limited thereto, and the same may include multiple second antenna elements 222.

According to an embodiment, the first printed circuit board 201 may be formed to include a flexible printed circuit board (FPCB), a rigid flexible printed circuit board, or a flexible printed circuit board and a rigid flexible printed circuit board.

According to an embodiment, the first printed circuit board 201 and the second printed circuit board 202 may be electrically connected through an electric connection member 203. For example, the electric connection member 203 may include a radio frequency (RF) coaxial cable or a flexible printed circuit board (FPCB) type RF cable (FRC).

According to an embodiment, as illustrated in FIG. 3A and FIG. 3B, the position and/or direction in which the first antenna structure 210 and the second antenna structure 220 are disposed on the first printed circuit board 201 may be variously modified based on the position and/or direction in which antenna structures are to be disposed in the electronic device 200.

According to an embodiment, the first antenna structure 210 and the second antenna structure 220 may be disposed side by side in the long-axis direction or short-axis direction as illustrated in FIG. 3A and FIG. 3B.

Figure 4:
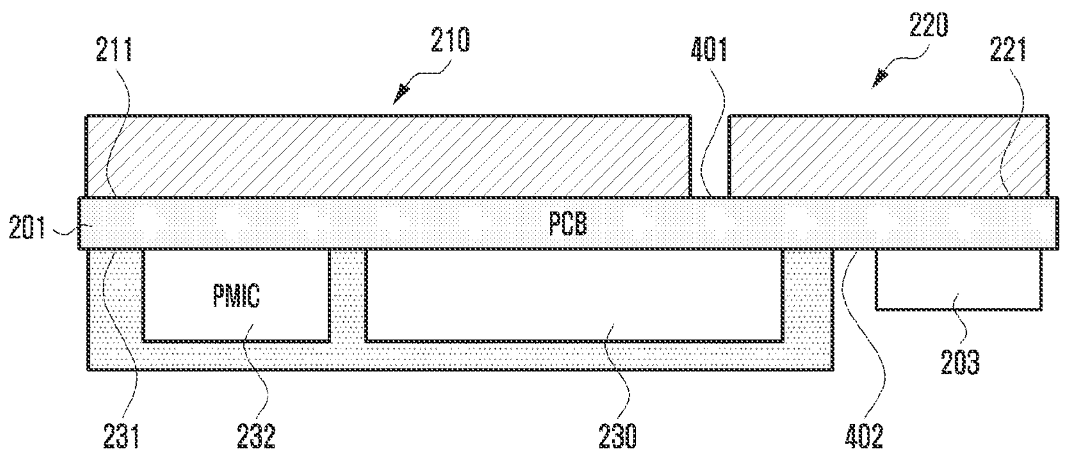
FIG. 4 illustrates an example electronic device configured to process radio signals for multiple communication systems according to various embodiments.

FIG. 4 illustrates a section of a first printed circuit board 201 on which a first antenna structure 210, a second antenna structure 220, and a wireless communication circuit 230 are disposed.

According to an embodiment, on the first surface 401 (for example, top surface) of the first printed circuit board 201, a first antenna structure 210 and a second antenna structure 220 may be disposed side by side in a first area 211 and a second area 221, respectively.

According to various embodiments, the wireless communication circuit 230 may be disposed on the second surface 402 (for example, bottom surface) of the first printed circuit board 201 to face the first antenna structure 210 and/or the second antenna structure 220. For example, the wireless communication circuit 230 may be disposed in one area 231 of the second surface 402 (for example, bottom surface) of the first printed circuit board 201 and electrically connected to the first antenna structure 210 and the second antenna structure 220. For example, a PMIC 232 may be disposed in one area 231 of the second surface 402 (for example, bottom surface) of the first printed circuit board 201. The PMIC 232 may receive power supplied from the second printed circuit board 202 (for example, main PCB) and supply power to the wireless communication circuit 230.

According to various embodiments, an electric connection member 203 for electrically connecting components disposed on the first printed circuit board 201 to the second printed circuit board 202 may be disposed on the second surface 402 (for example, bottom surface) of the first printed circuit board 201.

Figure 5:
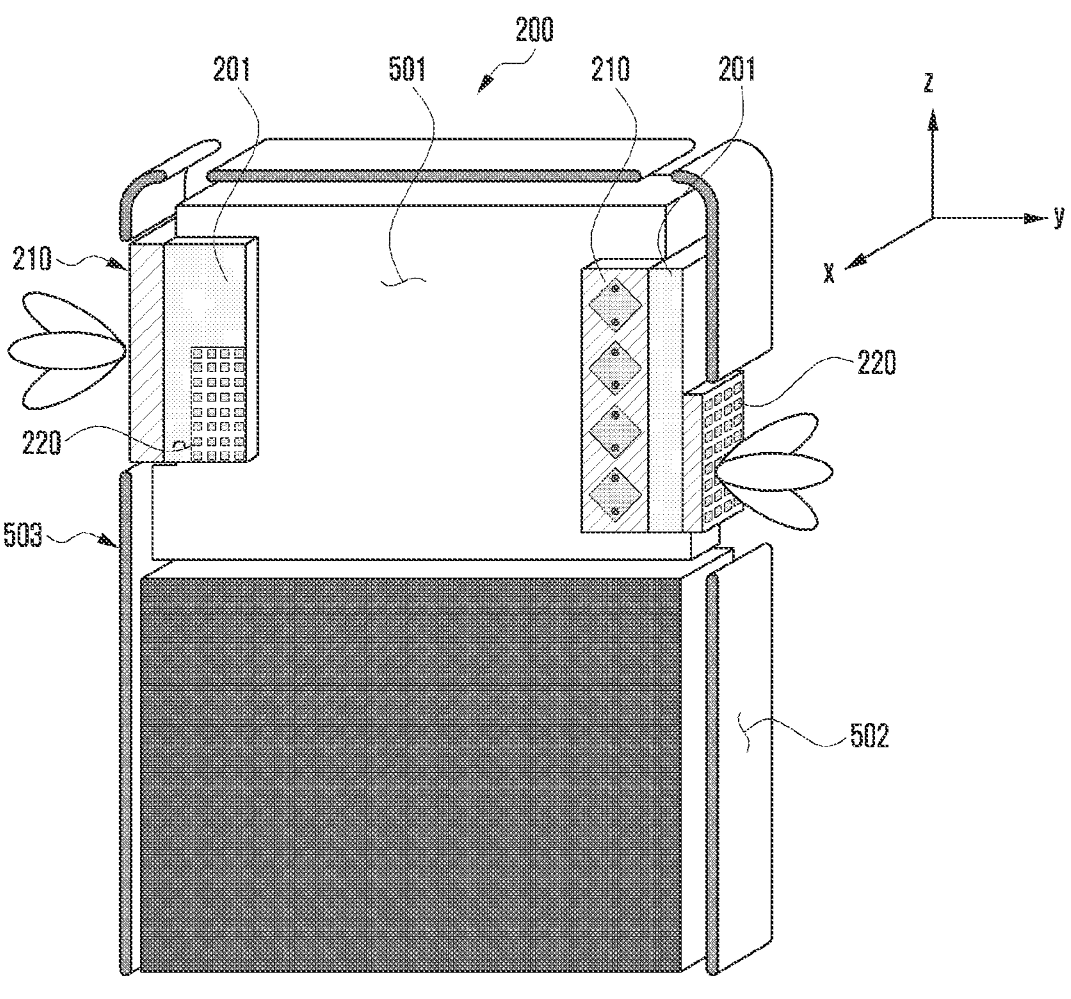
FIG. 5 illustrates an example electronic device configured to process radio signals for multiple communication systems according to various embodiments.

FIG. 5 illustrates an example in which antenna structures (for example, a first antenna structure 210 and a second antenna structure 220) are disposed on an electronic device 200.

According to an embodiment, the first printed circuit board 201 on which the first antenna structure 210 and the second antenna structure 220 are disposed may include a bendable material, for example, a flexible printed circuit board (FPCB)).

According to an embodiment, as illustrated in FIG. 3A, FIG. 3B, or FIG. 4, the first antenna structure 210 and the second antenna structure 220 may be disposed on the same surface of the first printed circuit board 201, for example, on the first surface 401 (top surface)) thereof. As illustrated in FIG. 5, the first printed circuit board 201 on which the first antenna structure 210 and the second antenna structure 220 are disposed may bend such that the first antenna structure 210 and the second antenna structure 220 are disposed toward different surfaces of the electronic device 200, and the first antenna structure 210 and the second antenna structure 220 may thus face in different directions.

According to an embodiment, the first antenna structure 210 may be disposed to face the first surface 501 (for example, rear surface) of the housing of the electronic device 200, and the second antenna structure 220 may be disposed to face the second surface 502 (for example, one side surface) of the housing of the electronic device 200 such that the first antenna structure 210 forms a beam pattern in the x-axis direction, for example, and the second antenna structure 220 forms a beam pattern in the y-axis direction, for example.

According to an embodiment, the first antenna structure 210 may be disposed to face the third surface 503 (for example, one side surface) of the housing of the electronic device 200, and the second antenna structure 220 may be disposed to face the first surface 501 (for example, rear surface) of the housing of the electronic device 200 such that the first antenna structure 210 forms a beam pattern in the −y-axis direction, for example, and the second antenna structure 220 forms a beam pattern in the x-axis direction, for example.

Figure 6A:
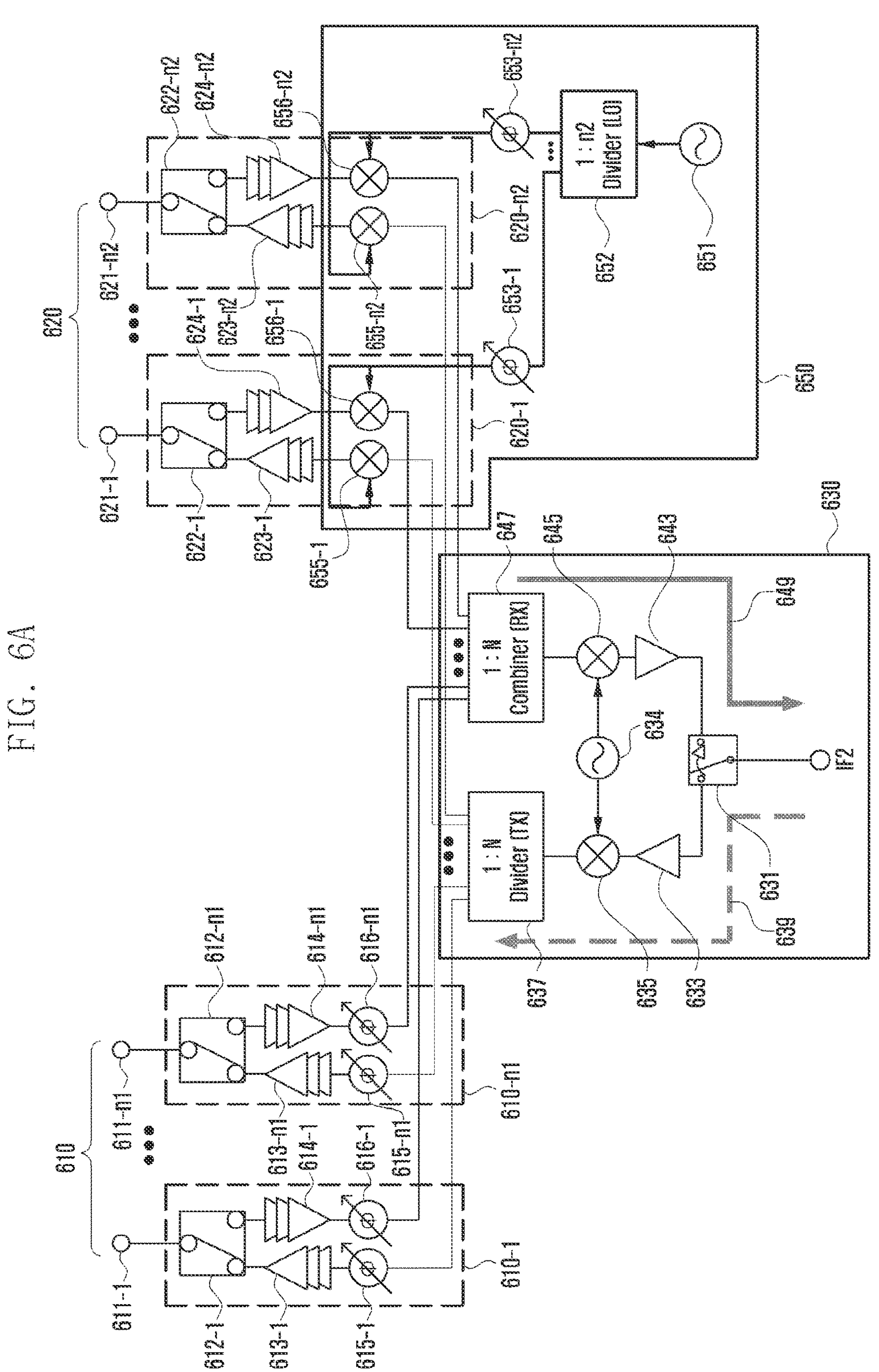
FIG. 6A illustrates an example circuit structure configured to process radio signals for multiple communication systems in an example electronic device according to various embodiments.

FIG. 6A illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 6A, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5) and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first circuit 630 as a common circuit for processing RF signals transmitted and/or received through the multiple first antenna elements 212 of the first antenna structure 210 and/or the multiple second antenna elements 222 of the second antenna structure 220.

According to an embodiment, the wireless communication circuit 230 may further include a second circuit 650 for processing RF signals transmitted and/or received through multiple second antenna elements 222 of the second antenna structure 220, as a circuit dedicated to the second antenna structure 220, in addition to the above-described first circuit 630. According to an embodiment, the second circuit 650 may process an RF signal in a first frequency band processed through the first circuit 630 into an RF signal in a second frequency band such that the same can be transmitted through multiple second antenna elements 222 of the second antenna structure 220. According to an embodiment, the second circuit 650 may process an RF signal in a second frequency band received through multiple second antenna elements 222 of the second antenna structure 220 such that the same is converted into an RF signal in a first frequency band and then processed through the first circuit 630.

According to an embodiment, the wireless communication circuit 230 may include a first RF chain array (for example, a first RF chain 610-1, . . . , an n1$^{th}$ RF chain **610-*n*1) for processing RF signals transmitted and/or received through multiple first antenna elements 212 of the first antenna structure 210. According to an embodiment, the wireless communication circuit 230 may include a second RF chain array (for example, a second RF chain 620-1, an n2$^{th}$ RF chain 620-*n*2) for processing RF signals transmitted and/or received through multiple second antenna elements 222 of the second antenna structure 220. Although the wireless communication circuit 230 includes n1 (a natural number equal to/larger than 2) antenna ports 611-1, . . . , 611-*n*1 in order to connect to multiple first antenna elements 212 of the first antenna structure 210, and includes n2 (a natural number equal to/larger than 2) antenna ports 621-1, . . . , 621-*n*2 in order to connect to multiple second antenna elements 222 of the second antenna structure 220 in the illustrated example, embodiments are not limited thereto, and various numbers of antenna ports and RF chains may be used. As an example, the first RF chain 610-1, . . . , and the n1$^{th}$ RF chain 610-*n*1 of the first chain array 610 may be substantially identical to each other. As an example, the first RF chain 620-1, . . . , and the n2$^{th}$ RF chain 620-*n*2 of the second chain array 620 may be substantially identical to each other. Hereinafter, the configuration of the first RF chain 610-1 of the first RF chain array 610 and the first RF chain 620-1 (hereinafter, referred to as second RF chain 620-1) of the second RF chain array 620 will be described in detail, and descriptions of the configuration of the second RF chain 610-2, . . . , the n1$^{th}$ RF chain 610-*n*1 of the first RF chain array 610, and the second RF chain 620-2, . . . the n2$^{th}$ RF chain 620-*n*2 of the second RF chain array 620** will be omitted.

According to an embodiment, the wireless communication circuit 230 may include a divider circuit 637 and a combiner circuit 647. Although the divider circuit 637 and the combiner circuit 639 are illustrated separately, the divider circuit 637 and the combiner circuit 639 may be integrated into a single entity.

According to an embodiment, the wireless communication circuit 230 may include a transmission path 639 configured such that a transmission signal (for example, an IF signal) received from an IFIC (for example, the IFIC 260 in FIG. 2) is processed and transferred to the first RF chain array 610 and/or the second RF chain array 620.

According to an embodiment, the wireless communication circuit 230 may up-convert a transmission signal (for example, an IF signal) received from the IFIC 260 and may transfer the same to the first RF chain array 610 and/or the second RF chain array 620 via the divider circuit 637 through the transmission path 639.

According to an embodiment, during transmission, the divider circuit 637 may divide an RF signal received from the transmission path 639 into multiple RF signals (for example, n1, n2, or n1+n2 RF signals) and may provide the same to the first RF chain array 610 and/or the second RF chain array 620. For example, the divider circuit 637 may provide divided RF signals to the first RF chain 610-1, . . . and/or the n1$^{th}$ RF chain **610-*n*1 of the first RF chain array 610, and/or the first RF chain 620-1, . . . and/or the n2$^{th}$ RF chain 620-*n*2 of the second RF chain array 620**.

According to various embodiments, during reception, the combiner circuit 647 may combine multiple RF signals received from the first RF chain array 610 and/or the second RF chain array 620 into a single RF signal and may provide the same to a reception path 649. For example, the combiner circuit 647 may combine multiple RF signals received from the first RF chain 610-1, . . . and/or the n1$^{th}$ RF chain **610-*n*1 of the first RF chain array 610, and/or the first RF chain 620-1, . . . and/or the n2$^{th}$ RF chain 620-*n*2 of the second RF chain array 620 into a single RF signal and may provide the same to the reception path 649**.

According to various embodiments, the first RF chain 610-1 may include phase shifters 615-1 and 616-1, a power amplifier (PA) 613-1, and/or a low-noise amplifier (LNA) 614-1. According to an embodiment, the phase shifter 615-1 may adjust the phase of an RF signal transferred from the divider circuit 637 and input to the power amplifier 613-1 and may output the same. For example, a phase value adjusted by the phase shifter 615-1 may be a phase value of a signal transmitted through multiple first antenna elements 212 of the first antenna structure 210, and may be determined by a control signal. As an example, the control signal may be input from another component (for example, the processor 120 in FIG. 1 or the application processor 240 in FIG. 2).

According to an embodiment, the phase shifter 616-1 may adjust the phase of an RF signal transferred from the LNA 614-1 and may output the same. For example, a phase value adjusted by the phase shifter 616-1 may be a phase value that changes the phase of a signal received through multiple arrays of the first antenna structure 220, and may be determined by a control signal. As an example, the control signal may be input from another component (for example, the processor 120 in FIG. 1 or the application processor 240 in FIG. 2).

According to various embodiments, the PA 613-1 may amplify the power of an RF signal received from the phase shifter 615-1. According to an embodiment, the PA 613-1 may amplify the power of an RF signal received from the phase shifter 615-1 and may output the same to one of multiple antenna elements 212 of the first antenna structure 210 connected to the first antenna port 611-1, through a first switch 612-1.

According to various embodiments, the LNA 614-1 may low-noise-amplify an RF signal received through the first switch 612-1 and may output the same. According to an embodiment, the LNA 614-1 may low-noise-amplify an RF signal received from one of multiple first antenna elements 212 of the first antenna structure 210 connected to the first antenna port 611-1, through the first switch 612-1, and may output the same to the phase shifter 616-1.

According to various embodiments, the first switch 612-1 may selectively connect the first antenna port 611-1 to the PA 613-1 or the LNA 614-1. According to an embodiment, during signal transmission, the first switch 612-1 may connect the first antenna port 611-1 and the PA 613-1 based on control of a processor (for example, the communication processor 250 or the application processor 240 in FIG. 2). According to an embodiment, during signal reception, the first switch 612-1 may connect the first antenna port 611-1 and the LNA 614-1 based on control of the processor (for example, the communication processor 250 or the application processor 240 in FIG. 2).

According to various embodiments, the wireless communication circuit 230 may up-convert a transmission signal (for example, an IF signal) input through the IFIC 260 and may output the same to the first RF chain array 610 and/or the second RF chain array 620 through the transmission path 639.

According to an embodiment, during transmission, the wireless communication circuit 230 may transmit an input from the IFIC 260 to the transmission path 639 through the third switch 631. A transmission mixer 635 may up-convert an IF signal amplified by the PA 633 into a first RF signal, based on a local oscillation frequency supplied from a second local oscillator 634. An RF signal in a first frequency band up-converted in the transmission mixer 635 may be transferred to the first RF chain array 610 and/or the second RF chain array 620 through the divider circuit 637. For example, the first frequency band may be a millimeter wave (mmWave) band (for example, about 20 GHz to about 60 GHz) among bands to be used for wireless communication through a long-distance communication network (for example, the second network 199 in FIG. 1) defined by 3GPP, used in a first communication system of 5G.

According to various embodiments, the wireless communication circuit 230 may down-convert an RF signal in a first frequency band received from the first RF chain array 610 and/or the second RF chain array 620 and may output the same to the IFIC 260 through the reception path 649. According to an embodiment, during signal reception, the wireless communication circuit 230 may connect an output port to the IFIC 260 and the reception path 649 through a third switch 631. A reception mixer 645 may down-convert an RF signal input from the first RF chain array 610 and/or the second RF chain array 620 through the combiner circuit 647, based on a local oscillation frequency supplied from the second local oscillator 634. A signal (for example, an IF signal) down-converted in the reception mixer 645 may be low-noise-amplified through the LNA 643 and transferred to the IFIC 260 through the third switch 631.

According to various embodiments, the second RF chain 620-1 may include a power amplifier (PA) 623-1 and/or a low-noise amplifier (LNA) 624-1.

According to an embodiment, the second RF chain 620-1 may further include a second transmission mixer 655-1 and a second reception mixer 656-1. According to an embodiment, the second transmission mixer 655-1 may up-convert an RF signal in a first frequency band up-converted by the transmission mixer 635 into an RF signal in a second frequency band.

According to an embodiment, the PA 623-1 of the second RF chain 620-1 may amplify the power of an RF signal in a second frequency band received from the second transmission mixer 655-1. For example, the second frequency band may be a terahertz (THz) high-frequency band (for example, about 100 GHz to about 10 THz) (hereinafter, referred to as a second frequency band) among bands to be used for wireless communication through a long-distance communication network used in a second communication system of 6G.

According to an embodiment, the second transmission mixer 655-1 may up-convert an RF signal in a first frequency band transferred from the divider circuit 637 into an RF signal in a second frequency band, based on a local oscillation frequency supplied from a first local oscillator 651, divided through a second divider 652, and phase-adjusted through a second phase shifter 653-1. The RF signal in a second frequency band up-converted by the second transmission mixer 655-1 may be power-amplified through the PA 623-1, transferred to the second antenna port 621-1 through a second switch 622-1, and output to one of multiple antenna elements 222 of the second antenna structure 220.

According to an embodiment, the LNA 624-1 may receive an RF signal in a second frequency band, which has been received by one of multiple antenna elements 222 of the second antenna structure 220, from the second antenna port 621-1 through the second switch 622-1, may low-noise-amplify the same, and may output the same to the second reception mixer 656-1.

According to an embodiment, the second switch 622-1 may selectively connect the second antenna port 621-1 to the PA 623-1 or the LNA 624-1. According to an embodiment, during signal transmission, the second switch 622-1 may connect the second antenna port 621-1 and the PA 623-1 based on control of a processor (for example, the communication processor 250 or the application processor 240 in FIG. 2). According to an embodiment, during signal reception, the second switch 622-1 may connect the second antenna port 621-1 and the LNA 624-1 based on control of the processor (for example, the communication processor 250 or the application processor 240 in FIG. 2).

According to an embodiment, the second reception mixer 656-1 may down-convert a received RF signal in a second frequency band into an RF signal in a first frequency band, based on a local oscillation frequency supplied from the first local oscillator 651, divided through the second divider 652, and phase-adjusted through the second phase shifter 653-1. The RF signal in a first frequency band down-converted by the second reception mixer 656-1 may be transferred to the combiner circuit 647, down-converted into an IF signal through the reception mixer 645 of the reception path 649, and transferred to the IFIC 260.

According to various embodiments, in order to down-convert an RF signal in a second frequency band (THz high-frequency band) of the second communication system received through the second antenna structure 220 into an IF signal, a two-step down-conversion process may be performed, for example, by down-converting the same into an RF signal in a first frequency band (millimeter wave band) of the first communication system through the second reception mixer 655-1, and then down-converting the same into an IF signal through the reception mixer 645 shared with the first antenna structure 210.

According to various embodiments, in order to generate an RF signal in a second frequency band (THz high-frequency band) of the second communication system transmitted through the second antenna structure 220, a two-step up-conversion process may be performed, for example, by up-converting an IF signal into an RF signal in a first frequency band (millimeter wave band) of the first communication system through the transmission mixer 635 shared with the first antenna structure 210, and then up-converting the same into an RF signal in a second frequency band (THz high-frequency band) of the second communication system through the second transmission mixer 655-1.

FIG. 6A illustrates an example structure of a circuit (for example, the IFIC 260 in FIG. 2) configured to process radio signals for multiple communication systems in an example electronic device (for example, the electronic device 200 in FIG. 2) according to various embodiments. The structure of the IFIC 260 described with reference to FIG. 6A not only may operate while being connected to the wireless communication circuit 230 in FIG. 6A, but also may operate while being connected to the wireless communication circuit 230 described later with reference to FIG. 7, FIG. 8, FIG. 9, FIG. 10, FIG. 11, FIG. 13, or FIG. 14.

Figure 6B:
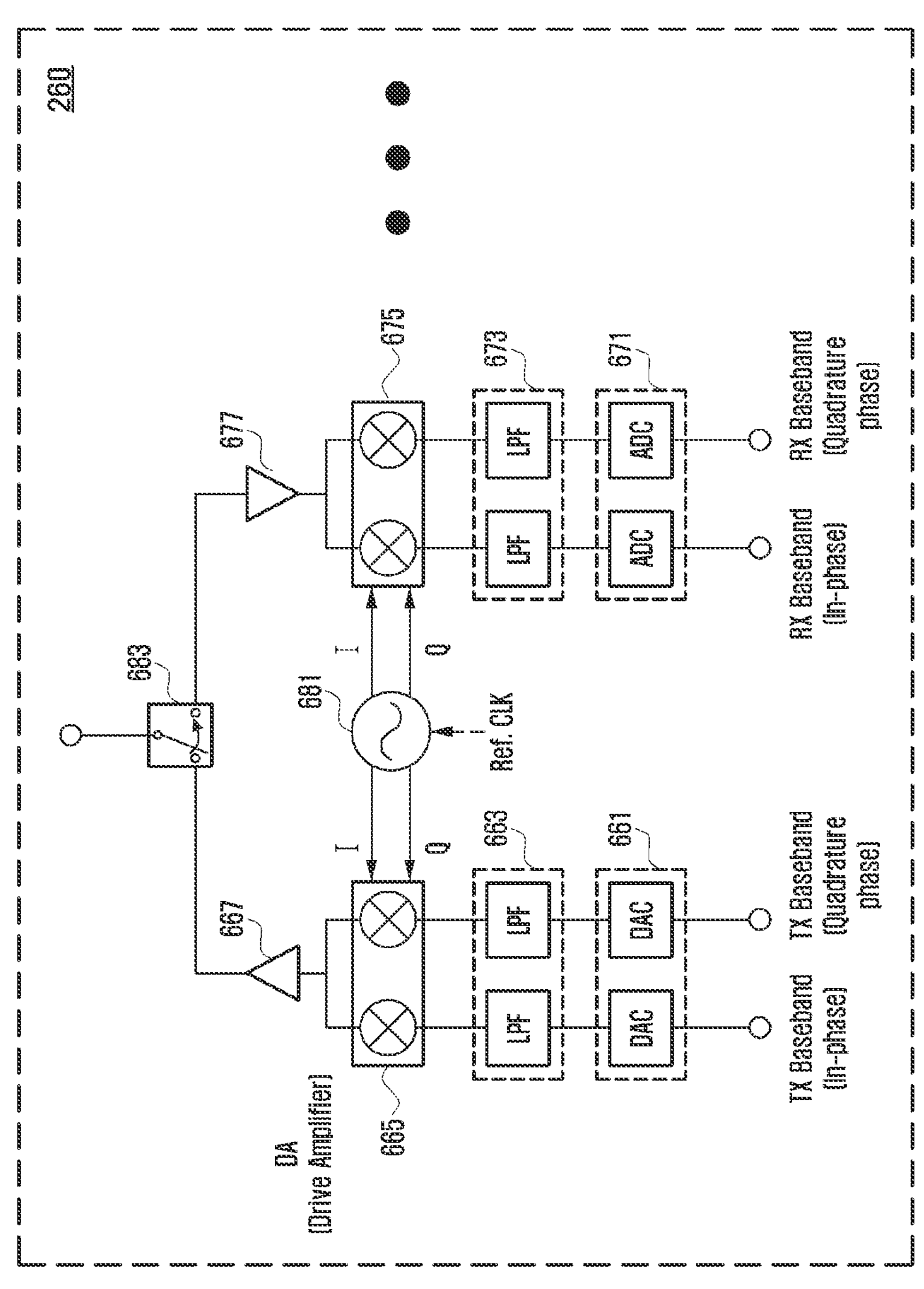
FIG. 6B illustrates an example circuit structure configured to process radio signals for multiple communication systems in an example electronic device according to various embodiments.

Referring to FIG. 6B, the IFIC 260 may be connected to a communication processor 250 (for example, the communication processor 250 in FIG. 2) to convert a received digital I/Q baseband signal into an analog I/Q baseband signal through a digital analog converter (DAC) 661, and may apply the same to a third transmission mixer 665 via a low pass filter (LPF) 663. The analog I/Q baseband signal applied to the third transmission mixer 665 may be multiplied by an I/Q local oscillation frequency signal applied from a third local oscillator 681 and thus up-converted into an IF band signal, and may be applied to an amplifier (for example, a drive amplifier) 667. The signal applied to the amplifier 667 may be amplified and transferred to the wireless communication circuit 230 via a switch 683. Referring to FIG. 6B, the IFIC 260 may amplify an intermediate band signal, which has been received from the wireless communication circuit 230, through the amplifier 677 via the switch 683. The amplified signal may be applied to a third reception mixer 675, multiplied by an I/Q local oscillation frequency signal applied from the third local oscillator 681, and thus down-converted into an analog I/Q baseband signal. The analog I/Q baseband signal may be applied to an analog digital converter (ADC) 671 via an LPF 673, converted into a digital I/Q baseband signal in the ADC 671, and then transferred to the communication processor 250.

Figure 7:
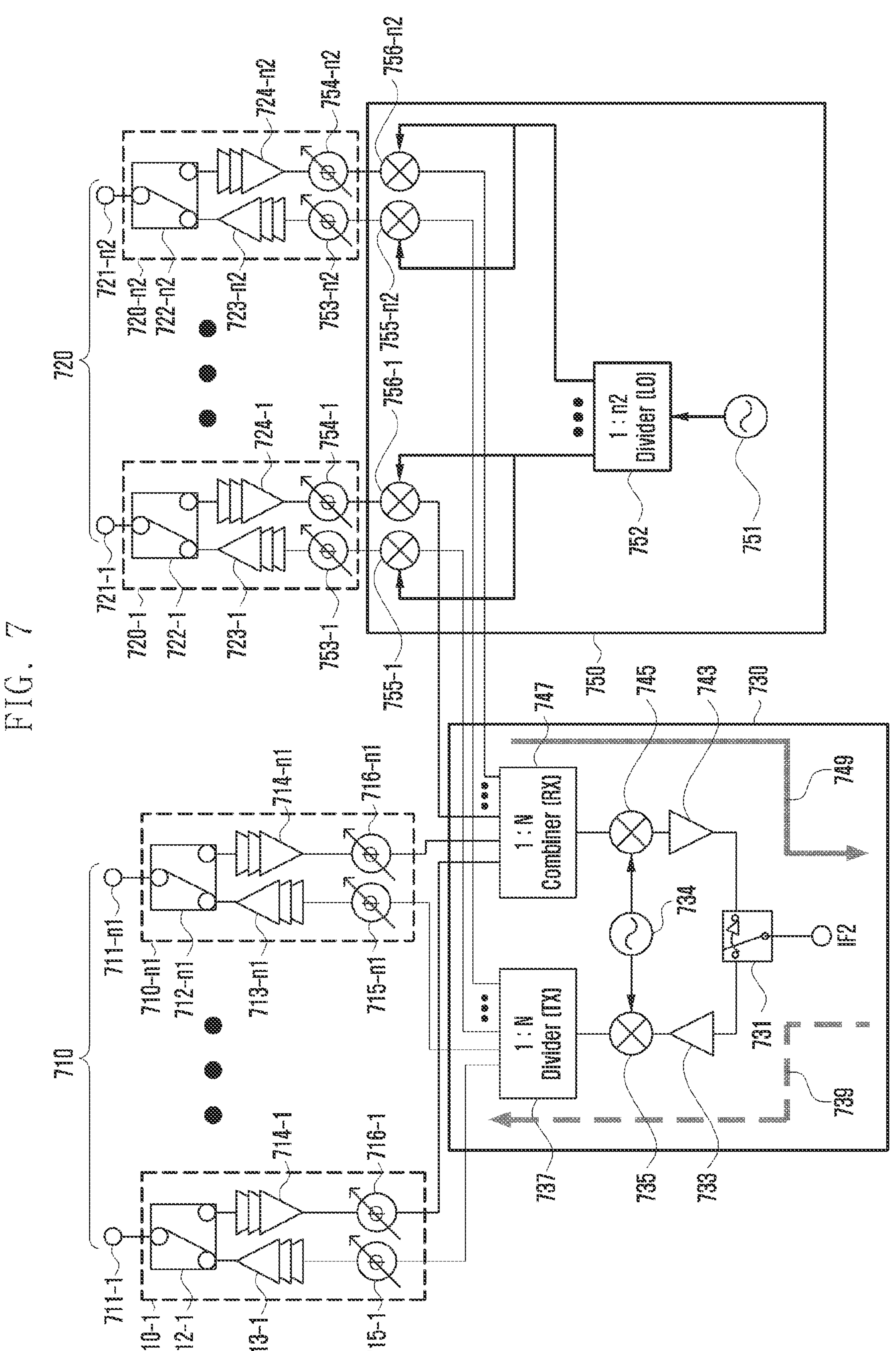
FIG. 7 illustrates an example wireless communication circuit structure configured to process radio signals for multiple communication systems in an example electronic device according to various embodiments.

FIG. 7 illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 7, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5) and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first circuit 730 as a common circuit for processing RF signals transmitted and/or received through the multiple first antenna elements 212 of the first antenna structure 210 and/or the multiple first antenna elements 222 of the second antenna structure 220.

According to an embodiment, the wireless communication circuit 230 may further include a second circuit 750 for processing RF signals transmitted and/or received through multiple first antenna elements 222 of the second antenna structure 220, as a circuit dedicated to the second antenna structure 220, in addition to the above-described first circuit 730. According to an embodiment, the second circuit 750 may process an RF signal in a first frequency band processed through the first circuit 730 into an RF signal in a second frequency band such that the same can be transmitted through multiple first antenna elements 222 of the second antenna structure 220. According to an embodiment, the second circuit 750 may process an RF signal in a second frequency band received through multiple second antenna elements 222 of the second antenna structure 220 such that the same is converted into an RF signal in a first frequency band and then processed through the first circuit 730.

According to an embodiment, the wireless communication circuit 230 may include a first RF chain array (for example, a first RF chain 710-1, . . . , an n1th RF chain **710-*n*1) for processing RF signals transmitted and/or received through multiple first antenna elements 212 of the first antenna structure 210. According to an embodiment, the wireless communication circuit 230 may include a second RF chain array (for example, a second RF chain 720-1, . . . , an n2th RF chain 720-*n*2) for processing RF signals transmitted and/or received through multiple second antenna elements 222 of the second antenna structure 220. Although the wireless communication circuit 230 includes n1 (a natural number equal to/larger than 2) antenna ports 711-1, . . . , 711-*n*1 in order to connect to multiple first antenna elements 212 of the first antenna structure 210, and includes n2 (a natural number equal to/larger than 2) antenna ports 721-1, . . . , 721-*n*2 in order to connect to multiple second antenna elements 222 of the second antenna structure 220 in the illustrated example, embodiments are not limited thereto, and various numbers of antenna ports and RF chains may be used. As an example, the first RF chain 710-1, . . . , and the n1th RF chain 710-*n*1 of the first chain array 710 may be substantially identical to each other. As an example, the first RF chain 720-1, . . . , and the n2th RF chain 720-*n*2 of the second chain array may be substantially identical to each other. Hereinafter, the configuration of the first RF chain 710-1 of the first RF chain array 710 and the first RF chain 720-1 (hereinafter, referred to as second RF chain 720-1) of the second RF chain array 720 will be described in detail, and descriptions of the configuration of the second RF chain 710-2, the n1th RF chain 710-*n*1 of the first RF chain array 710, and the second RF chain 720-2, . . . , the n2th RF chain 720-*n*2 of the second RF chain array 720** will be omitted.

According to an embodiment, the wireless communication circuit 230 may include a divider circuit 737 and a combiner circuit 747. Although the divider circuit 737 and the combiner circuit 747 are illustrated separately, the divider circuit 737 and the combiner circuit 747 may be integrated into a single entity.

According to an embodiment, the wireless communication circuit 230 may include a transmission path 739 configured such that a transmission signal (for example, an IF signal) received from an IFIC (for example, the IFIC 260 in FIG. 2) is processed and transferred to the first RF chain array 710 and/or the second RF chain array 720.

According to an embodiment, the wireless communication circuit 230 may up-convert a transmission signal (for example, an IF signal) received from the IFIC 260 and may transfer the same to the first RF chain array 710 and/or the second RF chain array 720 via the divider circuit 737 through the transmission path 739.

According to an embodiment, during transmission, the divider circuit 737 may divide an RF signal received from the transmission path 739 into multiple RF signals (for example, n1, n2, or n1+n2 RF signals) and may provide the same to the first RF chain array 710 and/or the second RF chain array 720. For example, the divider circuit 737 may provide divided RF signals to the first RF chain 710-1, . . . and/or the n1th RF chain **710-*n*1 of the first RF chain array 710, and/or the first RF chain 720-1, . . . and/or the n2th RF chain 720-*n*2 of the second RF chain array 720**.

According to various embodiments, during reception, the combiner circuit 747 may combine multiple RF signals received from the first RF chain array 710 and/or the second RF chain array 720 into a single RF signal and may provide the same to a reception path 749. For example, the combiner circuit 747 may combine multiple RF signals received from the first RF chain 710-1, . . . and/or the n1th RF chain **710-*n*1 of the first RF chain array 710, and/or the first RF chain 720-1, . . . and/or the n2th RF chain 720-*n*2 of the second RF chain array 720 into a single RF signal and may provide the same to the reception path 749**.

According to various embodiments, the first RF chain 710-1 may include phase shifters 715-1 and 716-1, a power amplifier (PA) 713-1, and/or a low-noise amplifier (LNA) 714-1. According to an embodiment, the phase shifter 715-1 may adjust the phase of an RF signal transferred from the divider circuit 737 and input to the power amplifier 713-1 and may output the same. For example, a phase value adjusted by the phase shifter 715-1 may be a phase value of a signal transmitted through multiple first antenna elements 212 of the first antenna structure 210, and may be determined by a control signal. As an example, the control signal may be input from another component (for example, the processor 120 in FIG. 1 or the application processor 240 in FIG. 2).

According to an embodiment, the phase shifter 716-1 may adjust the phase of an RF signal transferred from the LNA 714-1 and may output the same. For example, a phase value adjusted by the phase shifter 716-1 may be a phase value that changes the phase of an RF signal received through multiple antenna elements of the first antenna structure 210, and may be determined by a control signal. As an example, the control signal may be input from another component (for example, the processor 120 in FIG. 1 or the application processor 240 in FIG. 2).

According to various embodiments, the PA 713-1 may amplify the power of an RF signal received from the phase shifter 715-1. According to an embodiment, the PA 713-1 may amplify the power of an RF signal received from the phase shifter 715-1 and may output the same to one of multiple antenna elements 212 of the first antenna structure 210 connected to the first antenna port 711-1, through a first switch 712-1.

According to various embodiments, the LNA 714-1 may low-noise-amplify an RF signal received through the first switch 712-1 and may output the same. According to an embodiment, the LNA 714-1 may low-noise-amplify an RF signal received from one of multiple first antenna elements 212 of the first antenna structure 210 connected to the first antenna port 711-1, through the first switch 712-1, and may output the same to the phase shifter 716-1.

According to various embodiments, the first switch 712-1 may selectively connect the first antenna port 711-1 to the PA 713-1 or the LNA 714-1. According to an embodiment, during signal transmission, the first switch 712-1 may connect the first antenna port 711-1 and the PA 713-1 based on control of a processor (for example, the communication processor 250 or the application processor 240 in FIG. 2). According to an embodiment, during signal reception, the first switch 712-1 may connect the first antenna port 711-1 and the LNA 714-1 based on control of the processor (for example, the communication processor 250 or the application processor 240 in FIG. 2).

According to various embodiments, the wireless communication circuit 230 may up-convert a transmission signal (for example, an IF signal) input through the IFIC 260 and may output the same to the first RF chain array 710 and/or the second RF chain array 720 through the transmission path 739.

According to an embodiment, during transmission, the wireless communication circuit 230 may connect an input from the IFIC 260 to the transmission path 739 through the third switch 731. A transmission mixer 735 may up-convert an IF signal amplified by the PA 733 into a first RF signal, based on a local oscillation frequency supplied from a second local oscillator 734. An RF signal in a first frequency band up-converted in the transmission mixer 735 may be transferred to the first RF chain array 710 and/or the second RF chain array 720 through the divider circuit 737. For example, the first frequency band may be a millimeter wave (mmWave) band (for example, about 20 GHz to about 60 GHz) among bands to be used for wireless communication through a long-distance communication network (for example, the second network 199 in FIG. 1) defined by 3GPP, used in a first communication system of 5G.

According to various embodiments, the wireless communication circuit 230 may down-convert an RF signal in a first frequency band received from the first RF chain array 710 and/or the second RF chain array 720 and may output the same to the IFIC 260 through the reception path 749. According to an embodiment, during signal reception, the wireless communication circuit 230 may connect an output port to the IFIC 260 and the reception path 749 through a third switch 731. A reception mixer 745 may down-convert an RF signal input from the first RF chain array 710 and/or the second RF chain array 720 through the combiner circuit 747, based on a local oscillation frequency supplied from the second local oscillator 734. A signal (for example, an IF signal) down-converted in the reception mixer 745 may be low-noise-amplified through the LNA 743 and transferred to the IFIC 260 through the third switch 731.

According to various embodiments, the second RF chain 720-1 may include a power amplifier (PA) 723-1, a low-noise amplifier (LNA) 724-1, and phase shifters 753-1 and 754-1.

According to an embodiment, the second RF chain 720-1 may further include a second transmission mixer 755-1 and a second reception mixer 756-1. According to an embodiment, the second transmission mixer 755-1 may up-convert an RF signal in a first frequency band up-converted by the transmission mixer 735 into an RF signal in a second frequency band.

According to an embodiment, the phase shifter 753-1 may adjust the phase of an RF signal transferred from the second transmission mixer 755-1 and input to the PA 723-1 and may output the same. For example, a phase value adjusted by the phase shifter 753-1 may be a phase value of a signal transmitted through multiple second antenna elements 222 of the second antenna structure 220, and may be determined by a control signal. As an example, the control signal may be input from another component (for example, the processor 120 in FIG. 1 or the application processor 240 in FIG. 2).

According to an embodiment, the phase shifter 754-1 may adjust the phase of an RF signal transferred from the LNA 724-1 and may output the same. For example, a phase value adjusted by the phase shifter 754-1 may be a phase value that changes the phase of a signal received through multiple second antenna elements 222 of the second antenna structure 220, and may be determined by a control signal. As an example, the control signal may be input from another component (for example, the processor 120 in FIG. 1 or the application processor 240 in FIG. 2).

According to an embodiment, the PA 723-1 of the second RF chain 720-1 may amplify the power of an RF signal in a second frequency band received from the second transmission mixer 755-1. For example, the second frequency band may be a terahertz (THz) high-frequency band (for example, about 100 GHz to about 10 THz) (hereinafter, referred to as a second frequency band) among bands to be used for wireless communication through a long-distance communication network used in a second communication system of 6G.

According to an embodiment, the second transmission mixer 755-1 may up-convert an RF signal in a first frequency band transferred from the divider circuit 737 into an RF signal in a second frequency band, based on a local oscillation frequency supplied from a first local oscillator 751 and divided through a first divider 752. The RF signal in a second frequency band up-converted by the second transmission mixer 755-1 may be phase-adjusted by the phase shifter 753-1, power-amplified through the PA 723-1, transferred to the second antenna port 721-1 through a second switch 722-1, and output to one of multiple second antenna elements 222 of the second antenna structure 220.

According to an embodiment, the LNA 724-1 may receive an RF signal in a second frequency band, which has been received by one of multiple second antenna elements 222 of the second antenna structure 220, from the second antenna port 721-1 through the second switch 722-1, may low-noise-amplify the same, and may output the same to the second phase shifter 754-1.

According to an embodiment, the second switch 722-1 may selectively connect the second antenna port 721-1 to the PA 723-1 or the LNA 724-1. According to an embodiment, during signal transmission, the second switch 722-1 may electrically connect the second antenna port 721-1 and the PA 723-1 based on control of a processor (for example, the communication processor 250 or the application processor 240 in FIG. 2). According to an embodiment, during signal reception, the second switch 722-1 may electrically connect the second antenna port 721-1 and the LNA 724-1 based on control of the processor (for example, the communication processor 250 or the application processor 240 in FIG. 2).

According to an embodiment, the phase shifter 754-1 may adjust the phase of an RF signal in a second frequency band, which has been low-noise-amplified, and may output the same to the second reception mixer 756-1.

According to an embodiment, the second reception mixer 756-1 may down-convert a received RF signal in a second frequency band into an RF signal in a first frequency band, based on a local oscillation frequency supplied from the first local oscillator 751 and divided through the second divider 752. The RF signal in a first frequency band down-converted by the second reception mixer 756-1 may be transferred to the combiner circuit 747, down-converted into an IF signal through the reception mixer 745 of the reception path 749, and transferred to the IFIC 260.

According to various embodiments, in order to down-convert an RF signal in a second frequency band (THz high-frequency band) of the second communication system received through the second antenna structure 220 into an IF signal, a two-step down-conversion process may be performed, for example, by down-converting the same into an RF signal in a first frequency band (millimeter wave band) of the first communication system through the second reception mixer 756-1, and then down-converting the same into an IF signal through the reception mixer 745 shared with the first antenna structure 210.

According to various embodiments, in order to generate an RF signal in a second frequency band (THz high-frequency band) of the second communication system transmitted through the second antenna structure 220, a two-step up-conversion process may be performed, for example, by up-converting an IF signal into an RF signal in a first frequency band (millimeter wave band) of the first communication system through the transmission mixer 735 shared with the first antenna structure 210, and then up-converting the same into an RF signal in a second frequency band (THz high-frequency band) of the second communication system through the second transmission mixer 755-1.

Figure 8:
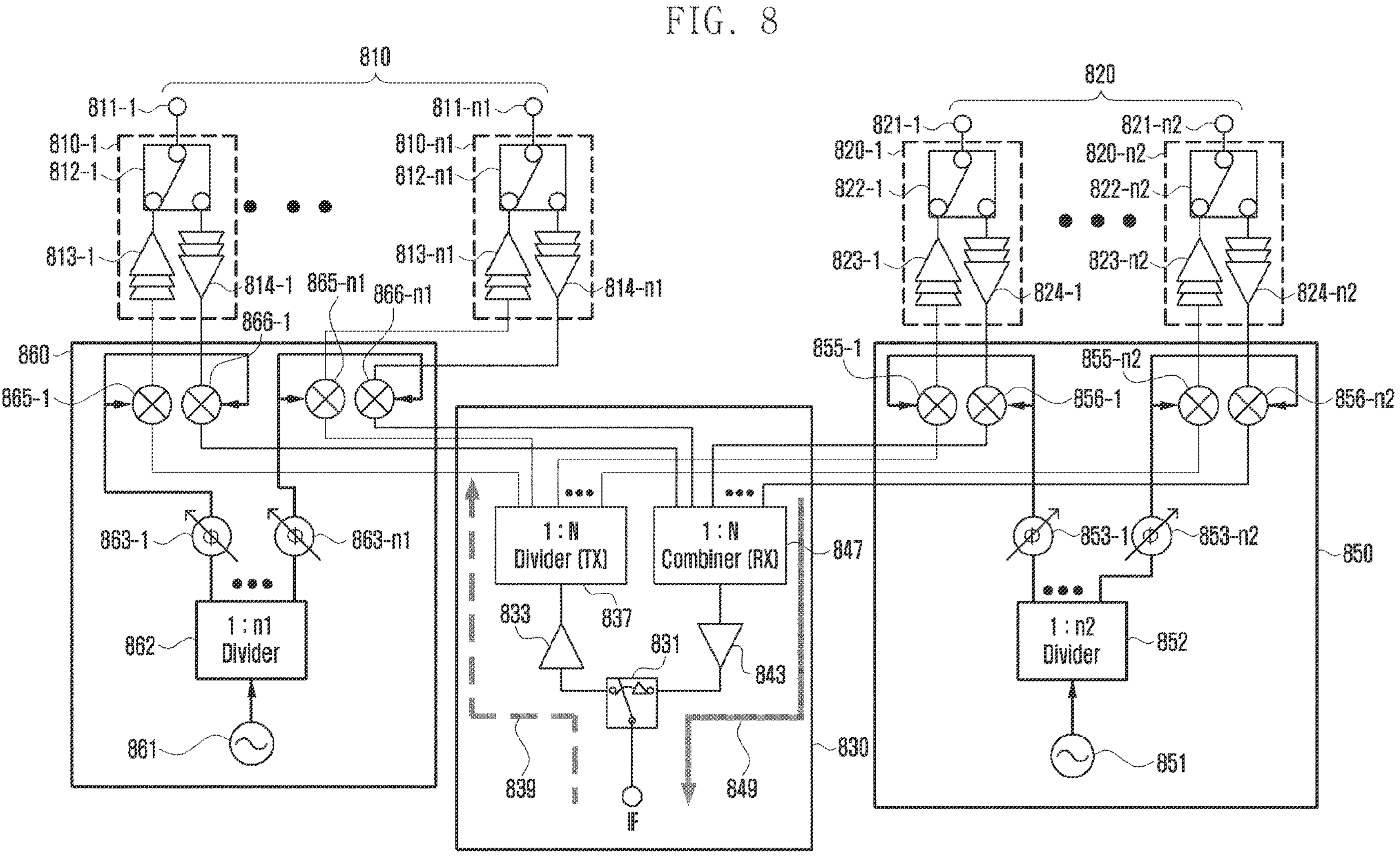
FIG. 8 illustrates an example wireless communication circuit structure configured to process radio signals for multiple communication systems in an example electronic device according to various embodiments.

FIG. 8 illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 8, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5) and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first RF chain array (for example, a first RF chain 810-1, . . . , an n1th RF chain **810-*n*1) for processing RF signals transmitted and/or received through multiple first antenna elements 212 of the first antenna structure 210. According to an embodiment, the wireless communication circuit 230 may include a second RF chain array (for example, a first RF chain 820-1, . . . , an n2th RF chain 820-*n*2) for processing RF signals transmitted and/or received through multiple second antenna elements 222 of the second antenna structure 220. Although the wireless communication circuit 230 includes n1 (a natural number equal to/larger than 2) antenna ports 811-1, . . . , 811-*n*1 in order to connect to multiple first antenna elements 212 of the first antenna structure 210, and includes n2 (a natural number equal to/larger than 2) antenna ports 821-1, 821-*n*2 in order to connect to multiple second antenna elements 222 of the second antenna structure 220 in the illustrated example, embodiments are not limited thereto, and various numbers of antenna ports and RF chains may be used. As an example, the first RF chain 810-1, . . . , and the n1th RF chain 810-*n*1 of the first chain array 810 may be substantially identical to each other. As an example, the first RF chain 820-1, . . . , and the n2th RF chain 820-*n*2 of the second chain array may be substantially identical to each other. Hereinafter, the configuration of the first RF chain 810-1 of the first RF chain array 810 and the first RF chain 820-1 (hereinafter, referred to as second RF chain 820-1) of the second RF chain array 820 will be described in detail, and descriptions of the configuration of the second RF chain 810-2, . . . , the n1th RF chain 810-*n*1 of the first RF chain array 810, and the second RF chain 820-2, . . . , the n2th RF chain 820-*n*2 of the second RF chain array 820** will be omitted.

According to an embodiment, the wireless communication circuit 230 may include a first circuit 830 as a common circuit for processing RF signals transmitted and/or received through the multiple first antenna elements 212 of the first antenna structure 210 and/or the multiple first antenna elements 222 of the second antenna structure 220.

According to an embodiment, the wireless communication circuit 230 may further include a second circuit 850 for processing RF signals transmitted and/or received through multiple second antenna elements 222 of the second antenna structure 220, as a circuit dedicated to the second antenna structure 220, in addition to the above-described first circuit 830. According to an embodiment, the second circuit 850 may process an intermediate frequency signal divided through the first circuit 830 into an RF signal in a second frequency band such that the same can be transmitted through multiple second antenna elements 222 of the second antenna structure 220. According to an embodiment, the second circuit 850 may process an RF signal in a second frequency band received through multiple second antenna elements 222 of the second antenna structure 220 such that the same is converted into a signal in an intermediate frequency band and transferred to the IFIC 260 through the first circuit 830.

According to an embodiment, the wireless communication circuit 230 may further include a third circuit 860 for processing RF signals transmitted and/or received through multiple first antenna elements 212 of the first antenna structure 210, as a circuit dedicated to the first antenna structure 210, in addition to the above-described first circuit 830. According to an embodiment, the third circuit 860 may process a signal in an intermediate frequency band divided through the first circuit 830 into an RF signal in a first frequency band such that the same can be transmitted through multiple first antenna elements 212 of the first antenna structure 210. According to an embodiment, the third circuit 860 may process an RF signal in a first frequency band received through multiple first antenna elements 212 of the first antenna structure 210 such that the same is converted into a signal in an intermediate frequency band and transferred to the IFIC 260 through the first circuit 830. According to an embodiment, the first circuit 830 may include a divider circuit 837 and a combiner circuit 847. Although the divider circuit 837 and the combiner circuit 847 are illustrated separately, the divider circuit 837 and the combiner circuit 847 may be integrated into a single entity.

According to an embodiment, the first circuit 830 may include a power amplifier 833 configured to power-amplify a transmission signal (for example, an IF signal) received from an IFIC (for example, the IFIC 260 in FIG. 2) and to transfer the same to the first RF chain array 810 and/or the second RF chain array 820.

According to an embodiment, during transmission, the divider circuit 837 may divide an IF signal received from the power amplifier 833 into multiple IF signals (for example, n1, n2, or n1+n2 IF signals) and may provide the same to the first RF chain array 810 and/or the second RF chain array 820. For example, the divider circuit 837 may provide divided IF signals to the first RF chain 810-1, . . . and/or the n1$^{th}$ RF chain **810-*n*1 of the first RF chain array 810, and/or the first RF chain 820-1, . . . and/or the n2$^{th}$ RF chain 820-*n*2 of the second RF chain array 820**.

According to various embodiments, during reception, the combiner circuit 847 may combine multiple IF signals received from the first RF chain array 810 and/or the second RF chain array 820 into a single IF signal and may provide the same to a low-noise amplifier 843. For example, the combiner circuit 847 may combine multiple IF signals received from the first RF chain 810-1, . . . and/or the n1th RF chain **810-*n*1 of the first RF chain array 810, and/or the first RF chain 820-1, . . . and/or the n2th RF chain 820-*n*2 of the second RF chain array 820 into a single IF signal and may provide the same to the low-noise amplifier 843**.

According to various embodiments, the first RF chain 810-1 may include a power amplifier (PA) 813-1, a low-noise amplifier (LNA) 814-1, a first transmission mixer 865-1, and/or a first reception mixer 866-1.

According to various embodiments, the PA 813-1 may amplify the power of an RF signal received from the first transmission mixer 865-1. According to an embodiment, the PA 813-1 may amplify the power of an RF signal received from the first transmission mixer 865-1 and may output the same to one of multiple first antenna elements 212 of the first antenna structure 210 connected to the first antenna port 811-1, through a first switch 812-1.

According to various embodiments, the LNA 814-1 may low-noise-amplify an RF signal received through the first switch 812-1 and may output the same. According to an embodiment, the LNA 814-1 may low-noise-amplify an RF signal received from one of multiple first antenna elements 212 of the first antenna structure 210 connected to the first antenna port 811-1, through the first switch 812-1, and may output the same to the first reception mixer 866-1.

According to various embodiments, the first switch 812-1 may selectively connect the first antenna port 811-1 to the PA 813-1 or the LNA 814-1.

According to an embodiment, during transmission, the wireless communication circuit 230 may connect an IF signal input from the IFIC 260 to the PA 833 through the third switch 831. A power-amplified IF signal may be divided by the divider 837 and provided to the first transmission mixer 865-1. The first transmission mixer 865-1 may up-convert an IF signal transferred from the divider circuit 837 into an RF signal in a first frequency band, based on a local oscillation frequency supplied from a second local oscillator 861, divided through a first divider 862, and phase-adjusted through a first phase shifter 863-1.

According to various embodiments, the first circuit 830 may amplify a signal in an intermediate frequency band received from the first RF chain array 810 and/or the second RF chain array 820 and may output the same to the IFIC 260 through a reception path 849. According to an embodiment, during signal reception, the first circuit 830 may connect an output port to the IFIC 260 and the reception path through a third switch 831.

According to an embodiment, the first reception mixer 866-1 may down-convert an RF signal input from the LNA 814-1, based on a local oscillation frequency supplied from the second local oscillator 861, divided by the first divider 862, and phase-adjusted by the phase shifter 863-1. A signal (for example, an IF signal) down-converted in the first reception mixer 866-1 may be provided to the combiner circuit 847 and combined therein, may be low-noise-amplified by the LNA 843, and transferred to the IFIC 260 through the third switch 831.

According to various embodiments, the second RF chain 820-1 may include a power amplifier (PA) 823-1, a low-noise amplifier (LNA) 824-1, a second transmission mixer 855-1, and/or a second reception mixer 856-1. According to an embodiment, the second transmission mixer 855-1 may up-convert an RF signal in a first frequency band up-converted by the transmission mixer 833 into an RF signal in a second frequency band.

According to an embodiment, the PA 823-1 of the second RF chain 820-1 may amplify the power of an RF signal in a second frequency band received from the second transmission mixer 855-1. For example, the second frequency band may be a terahertz (THz) high-frequency band (for example, about 100 GHz to about 10 THz) (hereinafter, referred to as a second frequency band) among bands to be used for wireless communication through a long-distance communication network used in a second communication system of 6G.

According to an embodiment, the second transmission mixer 855-1 may up-convert an IF signal transferred from the divider circuit 837 into an IF signal in a second frequency band, based on a local oscillation frequency supplied from a first local oscillator 851, divided through a second divider 852, and phase-adjusted through a second phase shifter 853-1. The RF signal in a second frequency band up-converted by the second transmission mixer 855-1 may be power-amplified through the PA 823-1, transferred to the second antenna port 821-1 through a second switch 822-1, and output to one of multiple second antenna elements 222 of the second antenna structure 220.

According to an embodiment, the LNA 824-1 may receive an RF signal in a second frequency band, which has been received by one of multiple second antenna elements 222 of the second antenna structure 220, from the second antenna port 821-1 through the second switch 822-1, may low-noise-amplify the same, and may output the same to the second reception mixer 856-1.

According to an embodiment, the second switch 822-1 may selectively connect the second antenna port 821-1 to the PA 823-1 or the LNA 824-1. According to an embodiment, during signal transmission, the second switch 822-1 may electrically connect the second antenna port 821-1 and the PA 823-1 based on control of a processor (for example, the communication processor 250 or the application processor 240 in FIG. 2). According to an embodiment, during signal reception, the second switch 822-1 may electrically connect the second antenna port 821-1 and the LNA 824-1 based on control of the processor (for example, the communication processor 250 or the application processor 240 in FIG. 2).

According to an embodiment, the second reception mixer 856-1 may down-convert a received RF signal in a second frequency band into an IF signal, based on a local oscillation frequency supplied from the first local oscillator 851, divided through the second divider 852, and phase-adjusted through the second phase shifter 853-1. The IF signal down-converted by the second reception mixer 856-1 may be transferred to the combiner circuit 847, low-noise-amplified through the LNA 843 of the reception path, and transferred to the IFIC 260.

Figure 9:
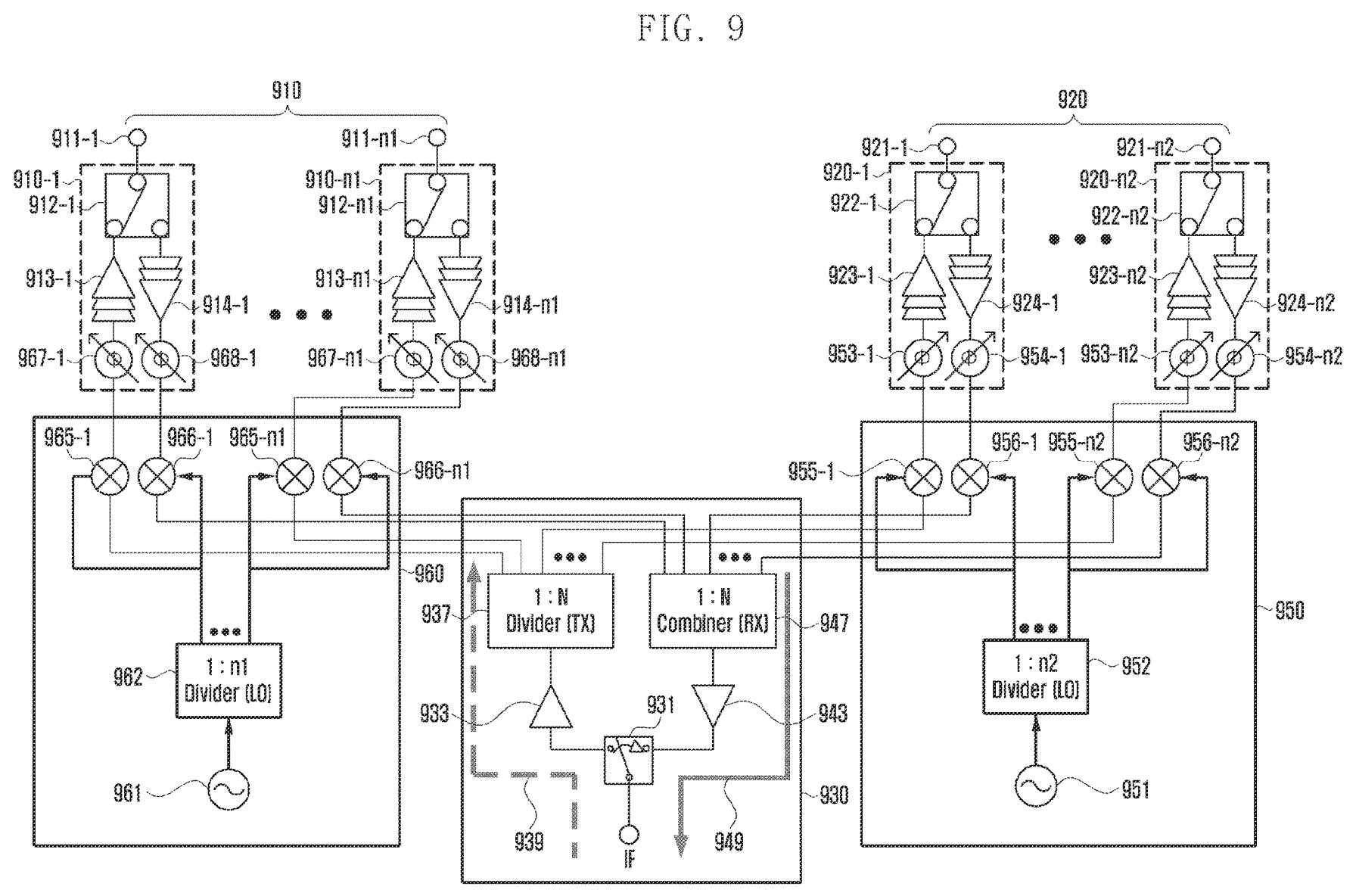

FIG. 9 illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 9, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5) and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first RF chain array (for example, a first RF chain 910-1, . . . , an n1th RF chain **910-*n*1) for processing RF signals transmitted and/or received through multiple first antenna elements 212 of the first antenna structure 210. According to an embodiment, the wireless communication circuit 230 may include a second RF chain array (for example, a first RF chain 920-1, . . . , an n2th RF chain 920-*n*2) for processing RF signals transmitted and/or received through multiple second antenna elements 222 of the second antenna structure 220. Although the wireless communication circuit 230 includes n1 (a natural number equal to/larger than 2) antenna ports 911-1, . . . , 911-*n*1 in order to connect to multiple first antenna elements 212 of the first antenna structure 210, and includes n2 (a natural number equal to/larger than 2) antenna ports 921-1, . . . , 921-*n*2 in order to connect to multiple second antenna elements 222 of the second antenna structure 220 in the illustrated example, embodiments are not limited thereto, and various numbers of antenna ports and RF chains may be used. As an example, the first RF chain 910-1, . . . , and the n1th RF chain 910-*n*1 of the first chain array 910 may be substantially identical to each other. As an example, the first RF chain 920-1, . . . , and the n2th RF chain 920-*n*2 of the second chain array may be substantially identical to each other. Hereinafter, the configuration of the first RF chain 910-1 of the first RF chain array 910 and the first RF chain 920-1 (hereinafter, referred to as second RF chain 920-1) of the second RF chain array 920 will be described in detail, and descriptions of the configuration of the second RF chain 910-2, . . . , the n1th RF chain 910-*n*1 of the first RF chain array 910, and the second RF chain 920-2, . . . , the n2th RF chain 920-*n*2 of the second RF chain array 920** will be omitted.

According to an embodiment, the wireless communication circuit 230 may include a first circuit 930 as a common circuit for processing RF signals transmitted and/or received through the multiple first antenna elements 212 of the first antenna structure 210 and/or the multiple first antenna elements 222 of the second antenna structure 220.

According to an embodiment, the wireless communication circuit 230 may further include a second circuit 950 for processing RF signals transmitted and/or received through multiple first antenna elements 222 of the second antenna structure 220, as a circuit dedicated to the second antenna structure 220, in addition to the above-described first circuit 930. According to an embodiment, the second circuit 950 may process an intermediate frequency signal divided through the first circuit 930 into an RF signal in a second frequency band such that the same can be transmitted through multiple first antenna elements 222 of the second antenna structure 220. According to an embodiment, the second circuit 950 may process an RF signal in a second frequency band received through multiple second antenna elements 222 of the second antenna structure 220 such that the same is converted into a signal in an intermediate frequency band and transferred to the IFIC 260 through the first circuit 930.

According to an embodiment, the wireless communication circuit 230 may further include a third circuit 960 for processing RF signals transmitted and/or received through multiple first antenna elements 212 of the first antenna structure 210, as a circuit dedicated to the first antenna structure 210, in addition to the above-described first circuit 930. According to an embodiment, the third circuit 960 may process a signal in an intermediate frequency band divided through the first circuit 930 into an RF signal in a first frequency band such that the same can be transmitted through multiple first antenna elements 212 of the first antenna structure 210. According to an embodiment, the third circuit 960 may process an RF signal in a first frequency band received through multiple first antenna elements 212 of the first antenna structure 210 such that the same is converted into a signal in an intermediate frequency band and transferred to the IFIC 260 through the first circuit 930.

According to an embodiment, the first circuit 930 may include a divider circuit 937 and a combiner circuit 947. Although the divider circuit 937 and the combiner circuit 947 are illustrated separately, the divider circuit 937 and the combiner circuit 947 may be integrated into a single entity.

According to an embodiment, the first circuit 930 may include a power amplifier 933 configured to power-amplify a transmission signal (for example, an IF signal) received from an IFIC (for example, the IFIC 260 in FIG. 2) and to transfer the same to the first RF chain array 910 and/or the second RF chain array 920.

According to an embodiment, during transmission, the divider circuit 937 may divide an IF signal received from the power amplifier 933 into multiple IF signals (for example, n1, n2, or n1+n2 IF signals) and may provide the same to the first RF chain array 910 and/or the second RF chain array 920. For example, the divider circuit 937 may provide divided IF signals to the first RF chain 910-1, . . . and/or the n1th RF chain **910-*n*1 of the first RF chain array 910, and/or the first RF chain 920-1, . . . and/or the n2th RF chain 920-*n*2 of the second RF chain array 920**.

According to various embodiments, during reception, the combiner circuit 947 may combine multiple IF signals received from the first RF chain array 910 and/or the second RF chain array 920 into a single IF signal and may provide the same to a low-noise amplifier 943. For example, the combiner circuit 947 may combine multiple IF signals received from the first RF chain 910-1, . . . and/or the n1th RF chain **910-*n*1 of the first RF chain array 910, and/or the first RF chain 920-1, . . . and/or the n2th RF chain 920-*n*2 of the second RF chain array 920 into a single IF signal and may provide the same to the low-noise amplifier 943**.

According to various embodiments, the first RF chain 910-1 may include a power amplifier (PA) 913-1, a low-noise amplifier (LNA) 914-1, a phase shifter 967-1, and/or a phase shifter 968-1.

According to an embodiment, the first transmission mixer 965-1 may up-convert an IF signal received through the divider circuit 937 into an RF signal in a first frequency band.

According to various embodiments, the PA 913-1 of the first RF chain 910-1 may amplify the power of an RF signal in a first frequency band received from the first transmission mixer 965-1.

According to an embodiment, a phase shifter 967-1 may adjust the phase of an RF signal transferred from the first transmission mixer 965-1 and input to the PA 913-1, and may output the same. For example, a phase value adjusted by the phase shifter 967-1 may be a phase value of a signal transmitted through multiple first antenna elements 212 of the first antenna structure 210, and may be determined by a control signal. As an example, the control signal may be input from another component (for example, the processor 120 in FIG. 1 or the application processor 240 in FIG. 2).

According to an embodiment, a phase shifter 968-1 may adjust the phase of an RF signal transferred from the LNA 914-1 and may output the same. For example, a phase value adjusted by the phase shifter 968-1 may be a phase value that changes the phase of a signal received through multiple antenna elements of the first antenna structure 210, and may be determined by a control signal. As an example, the control signal may be input from another component (for example, the processor 120 in FIG. 1 or the application processor 240 in FIG. 2).

According to an embodiment, the first transmission mixer 965-1 may up-convert an IF signal transferred from the divider circuit 937 into an RF signal in a first frequency band, based on a local oscillation frequency supplied from a second local oscillator 961 and divided through a first divider 962. The RF signal in a first frequency band up-converted by the first transmission mixer 965-1 may be phase-adjusted by the phase shifter 967-1, power-amplified through the PA 913-1, transferred to the first antenna port 911-1 through a first switch 912-1, and output to one of multiple first antenna elements 212 of the first antenna structure 210.

According to an embodiment, the LNA 914-1 may receive an RF signal in a second frequency band, which has been received by one of multiple first antenna elements 212 of the first antenna structure 210, from the first antenna port 911-1 through the first switch 912-1, may low-noise-amplify the same, and may output the same to the phase shifter 968-1.

According to an embodiment, the first switch 912-1 may selectively connect the first antenna port 911-1 to the PA 913-1 or the LNA 914-1. According to an embodiment, during signal transmission, the first switch 912-1 may electrically connect the first antenna port 911-1 and the PA 913-1 based on control of a processor (for example, the communication processor 250 or the application processor 240 in FIG. 2). According to an embodiment, during signal reception, the first switch 912-1 may electrically connect the first antenna port 911-1 and the LNA 914-1 based on control of the processor (for example, the communication processor 250 or the application processor 240 in FIG. 2).

According to an embodiment, the phase shifter 968-1 may adjust the phase of a low-noise-amplified RF signal in a first frequency band and may output the same to the first reception mixer 966-1.

According to an embodiment, the first reception mixer 966-1 may down-convert an RF signal in a first frequency band into an IF signal, based on a local oscillation frequency supplied from the second local oscillator 961 and divided by the first divider 962. The IF signal down-converted by the first reception mixer 966-1 may be transferred to the combiner circuit 947, low-noise-amplified by the LNA 943 of the reception path, and transferred to the IFIC 260 through the third switch 931.

According to various embodiments, the second RF chain 920-1 may include a power amplifier (PA) 923-1, a low-noise amplifier (LNA) 924-1, a phase shifter 953-1, and a phase shifter 954-1. According to an embodiment, the second transmission mixer 955-1 may up-convert an IF signal received through the divider circuit 937 into an RF signal in a second frequency band.

According to an embodiment, the PA 923-1 of the second RF chain 920-1 may amplify the power of an RF signal in a second frequency band received from the second transmission mixer 955-1.

According to an embodiment, a phase shifter 953-1 may adjust the phase of an RF signal transferred from the second transmission mixer 955-1 and input to the PA 923-1, and may output the same. For example, a phase value adjusted by the phase shifter 953-1 may be a phase value that changes the phase of a signal received through multiple second antenna elements 222 of the second antenna structure 220, and may be determined by a control signal. As an example, the control signal may be input from another component (for example, the processor 120 in FIG. 1 or the application processor 240 in FIG. 2).

According to an embodiment, a phase shifter 954-1 may adjust the phase of an RF signal received from the LNA 924-1 and may output the same. For example, a phase value adjusted by the phase shifter 954-1 may be a phase value that changes the phase of an RF signal received through multiple second antenna elements 222 of the second antenna structure 220, and may be determined by a control signal. As an example, the control signal may be input from another component (for example, the processor 120 in FIG. 1 or the application processor 240 in FIG. 2).

According to an embodiment, the second transmission mixer 955-1 may up-convert an IF signal transferred from the divider circuit 937 into an RF signal in a second frequency band, based on a local oscillation frequency supplied from a first local oscillator 951 and divided through a second divider 952. The RF signal in a second frequency band up-converted by the second transmission mixer 955-1 may be phase-adjusted by the phase shifter 953-1, power-amplified through the PA 923-1, transferred to the second antenna port 921-1 through a second switch 922-1, and output to one of multiple second antenna elements 222 of the second antenna structure 220.

According to an embodiment, the LNA 924-1 may receive an RF signal in a second frequency band, which has been received by one of multiple second antenna elements 222 of the second antenna structure 220, from the second antenna port 921-1 through the second switch 922-1, may low-noise-amplify the same, and may output the same to the phase shifter 954-1.

According to an embodiment, the second switch 922-1 may selectively connect the second antenna port 921-1 to the PA 923-1 or the LNA 924-1. According to an embodiment, during signal transmission, the second switch 922-1 may electrically connect the second antenna port 921-1 and the PA 923-1 based on control of a processor (for example, the communication processor 250 or the application processor 240 in FIG. 2). According to an embodiment, during signal reception, the second switch 922-1 may electrically connect the second antenna port 921-1 and the LNA 924-1 based on control of the processor (for example, the communication processor 250 or the application processor 240 in FIG. 2).

According to an embodiment, the phase shifter 954-1 may adjust the phase of a low-noise-amplified RF signal in a second frequency band and may output the same to the second reception mixer 956-1.

According to an embodiment, the second reception mixer 956-1 may down-convert an RF signal in a second frequency band into an IF signal, based on a local oscillation frequency supplied from the first local oscillator 951 and divided through the second divider 952. The IF signal down-converted by the second reception mixer 956-1 may be transferred to the combiner circuit 947, low-noise-amplified through the LNA 943 of the reception path, and transferred to the IFIC 260 through the third switch 931.

Figure 10:
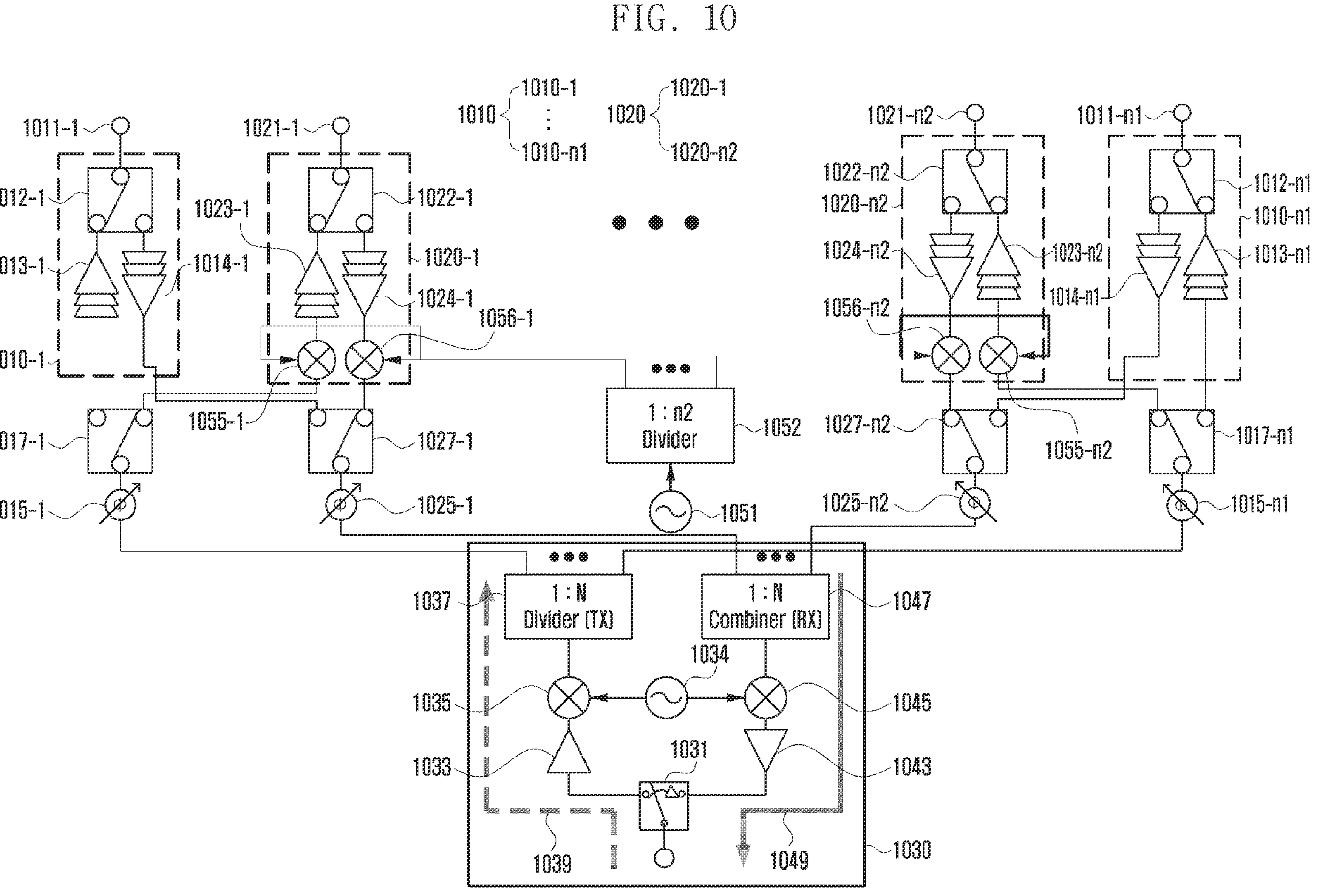
FIG. 10 illustrates an example wireless communication circuit structure configured to process radio signals for multiple communication systems in an example electronic device according to various embodiments.

FIG. 10 illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 10, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5) and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first RF chain array (for example, a first RF chain 1010-1, . . . , an n1$^{th}$ RF chain **1010-*n*1) for processing RF signals transmitted and/or received through multiple first antenna elements 212 of the first antenna structure 210. According to an embodiment, the wireless communication circuit 230 may include a second RF chain array (for example, a first RF chain 1020-1, . . . , an n2$^{th}$ RF chain 1020-*n*2) for processing RF signals transmitted and/or received through multiple second antenna elements 222 of the second antenna structure 220. Although the wireless communication circuit 230 includes n1 (a natural number equal to/larger than 2) antenna ports 1011-1, . . . , 1011-*n*1 in order to connect to multiple first antenna elements 212 of the first antenna structure 210, and includes n2 (a natural number equal to/larger than 2) antenna ports 1021-1, . . . , 1021-*n*2 in order to connect to multiple second antenna elements 222 of the second antenna structure 220 in the illustrated example, embodiments are not limited thereto, and various numbers of antenna ports and RF chains may be used. As an example, the first RF chain 1010-1, . . . , and the n1$^{th}$ RF chain 1010-*n*1 of the first chain array 1010 may be substantially identical to each other. As an example, the first RF chain 1020-1, . . . , and the n2$^{th}$ RF chain 1020-*n*2 of the second chain array may be substantially identical to each other. Hereinafter, the configuration of the first RF chain 1010-1 of the first RF chain array 1010 and the first RF chain 1020-1 (hereinafter, referred to as second RF chain 1020-1) of the second RF chain array 1020 will be described in detail, and descriptions of the configuration of the second RF chain 1010-2, . . . , the n1$^{th}$ RF chain 1010-*n*1 of the first RF chain array 1010, and the second RF chain 1020-2, . . . , the n2$^{th}$ RF chain 1020-*n*2 of the second RF chain array 1020** will be omitted.

According to an embodiment, the wireless communication circuit 230 may include a divider circuit 1037 and a combiner circuit 1047. Although the divider circuit 1037 and the combiner circuit 1047 are illustrated separately, the divider circuit 1037 and the combiner circuit 1047 may be integrated into a single entity.

According to an embodiment, the wireless communication circuit 230 may include a transmission path 1039 configured such that a transmission signal (for example, an IF signal) received from an IFIC (for example, the IFIC 260 in FIG. 2) is processed and transferred to the first RF chain array 1010 and/or the second RF chain array 1020.

According to an embodiment, the wireless communication circuit 230 may up-convert a transmission signal (for example, an IF signal) received from the IFIC 260 and may transfer the same to the first RF chain 1010-1 or the second RF chain 1020-1 via a transmission switch 1017-1 through the transmission path 1039.

According to an embodiment, during transmission, the divider circuit 1037 may divide an RF signal received from a transmission mixer 1035 into multiple RF signals (for example, N RF signals) and may provide the same to the first RF chain array 1010 or the second RF chain array 1020.

According to an embodiment, an RF signal phase-adjusted by a phase shifter 1015-1 may be provided to the first RF chain 1010-1 or the second RF chain 1020-1 by the transmission switch 1017-1.

According to various embodiments, during reception, a reception switch 1027-1 may transfer an RF signal, which has been received from the first RF chain 1010-1 or the second RF chain 1020-1, to a phase shifter 1025-1 such that the phase thereof is adjusted. The phase-adjusted RF signal may be provided to a reception path 1049.

According to various embodiments, during reception, the combiner circuit 1047 of the reception path 1049 may combine multiple RF signals received from the first RF chain array 1010 or the second RF chain array 1020 into a single RF signal and may provide the same to a reception mixer 1045.

According to various embodiments, the first RF chain 1010-1 may include a power amplifier (PA) 1013-1 and/or a low-noise amplifier (LNA) 1014-1.

According to an embodiment, the reception switch 1027-1 may transfer an RF signal in a first frequency band received from the LNA 1014-1 or an RF signal in a first frequency band received from a second reception mixer 1056-1 to the phase shifter 1025-1 such that the phase value thereof is adjusted.

According to various embodiments, the PA 1013-1 may amplify the power of an RF signal in a first frequency band received from the transmission switch 1017-1 and may output the same to one of multiple first antenna elements 212 of the first antenna structure 210 connected to the first antenna port 1011-1, through a first switch 1012-1.

According to various embodiments, the LNA 1014-1 may low-noise-amplify an RF signal in a first frequency band received from one of multiple first antenna elements 212 of the first antenna structure 210 connected to the first antenna port 1011-1, through a first switch 1012-1, and may output the same to the phase shifter 1025-1 through the reception switch 1027-1.

According to various embodiments, the first switch 1012-1 may selectively connect the first antenna port 1011-1 to the PA 1013-1 or the LNA 1014-1.

According to various embodiments, the wireless communication circuit 230 may up-convert a transmission signal (for example, an IF signal) input through the IFIC 260 and may output the same to the first RF chain array 1010 and/or the second RF chain array 1020 through the transmission path 1039.

According to an embodiment, during transmission, the wireless communication circuit 230 may transmit an input from the IFIC 260 to the transmission path 1039 through the third switch 1031. A transmission mixer 1035 may up-convert an IF signal amplified by the PA 1033 into an RF signal in a first frequency band, based on a local oscillation frequency supplied from a second local oscillator 1034.

According to various embodiments, the wireless communication circuit 230 may down-convert an RF signal in a first frequency band received from the first RF chain array 1010 and/or the second RF chain array 1020 and may output the same to the IFIC 260 through the reception path 1049.

According to an embodiment, during signal reception, the wireless communication circuit 230 may connect an output port to the IFIC 260 and the reception path 1049 through a third switch 1031. A reception mixer 1045 may down-convert an RF signal in a first frequency band input through the combiner circuit 1047 into an IF signal, based on a local oscillation frequency supplied from the second local oscillator 1034. A signal (for example, an IF signal) down-converted in the reception mixer 1045 may be low-noise-amplified through the LNA 1043 and transferred to the IFIC 260 through the third switch 1031.

According to various embodiments, the second RF chain 1020-1 may include a power amplifier (PA) 1023-1, a low-noise amplifier (LNA) 1024-1, a second transmission mixer 1055-1, and a second reception mixer 1056-1. According to an embodiment, the second transmission mixer 1055-1 may up-convert an RF signal in a first frequency band up-converted by the transmission mixer 1035 into an RF signal in a second frequency band.

According to an embodiment, the second transmission mixer 1055-1 may up-convert an RF signal in a first frequency band transferred from the divider circuit 1037 into an RF signal in a second frequency band, based on a local oscillation frequency supplied from a first local oscillator 1051 through a divider 1052. The RF signal in a second frequency band up-converted by the second transmission mixer 1055-1 may be power-amplified through the PA 1023-1, transferred to the second antenna port 1021-1 through a second switch 1022-1, and output to one of multiple second antenna elements 222 of the second antenna structure 220.

According to an embodiment, the LNA 1024-1 may receive an RF signal in a second frequency band, which has been received by one of multiple second antenna elements 222 of the second antenna structure 220, from the second antenna port 1021-1 through the second switch 1022-1, may low-noise-amplify the same, and may output the same to the second reception mixer 1056-1.

According to an embodiment, the second switch 1022-1 may selectively connect the second antenna port 1021-1 to the PA 1023-1 or the LNA 1024-1.

According to an embodiment, the second reception mixer 1056-1 may down-convert a received RF signal in a second frequency band into an RF signal in a first frequency band, based on a local oscillation frequency supplied from the first local oscillator 1051 and divided through the divider 1052. The RF signal in a first frequency band down-converted by the second reception mixer 1056-1 may be transferred to the combiner circuit 1047, down-converted into an IF signal through the reception mixer 1045, and transferred to the IFIC 260.

According to various embodiments, in order to down-convert an RF signal in a second frequency band (THz high-frequency band) of the second communication system received through the second antenna structure 220 into an IF signal, a two-step down-conversion process may be performed, for example, by down-converting the same into an RF signal in a first frequency band (millimeter wave band) of the first communication system through the second reception mixer 1056-1, and then down-converting the same into an IF signal through the reception mixer 1045 shared with the first antenna structure 210.

According to various embodiments, in order to generate an RF signal in a second frequency band (THz high-frequency band) of the second communication system transmitted through the second antenna structure 220, a two-step up-conversion process may be performed, for example, by up-converting an IF signal into an RF signal in a first frequency band (millimeter wave band) of the first communication system through the transmission mixer 1035 shared with the first antenna structure 210, and then up-converting the same into an RF signal in a second frequency band (THz high-frequency band) of the second communication system through the second transmission mixer 1055-1.

FIG. 11 illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 11, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5) and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first RF chain array (for example, a first RF chain 1110-1, . . . , an n1$^{th}$ RF chain **1110-*n*1) for processing RF signals transmitted and/or received through multiple first antenna elements 212 of the first antenna structure 210. According to an embodiment, the wireless communication circuit 230 may include a second RF chain array (for example, a first RF chain 1120-1, . . . , an n2$^{th}$ RF chain 1120-*n*2) for processing RF signals transmitted and/or received through multiple second antenna elements 222 of the second antenna structure 220. Although the wireless communication circuit 230 includes n1 (a natural number equal to/larger than 2) antenna ports 1111-1, . . . , 1111-*n*1 in order to connect to multiple first antenna elements 212 of the first antenna structure 210, and includes n2 (a natural number equal to/larger than 2) antenna ports 1121-1, . . . , 1121-*n*2 in order to connect to multiple second antenna elements 222 of the second antenna structure 220 in the illustrated example, embodiments are not limited thereto, and various numbers of antenna ports and RF chains may be used. As an example, the first RF chain 1110-1, . . . , and the n1$^{th}$ RF chain 1110-*n*1 of the first chain array 1110 may be substantially identical to each other. As an example, the first RF chain 1120-1, . . . , and the n2$^{th}$ RF chain 1120-*n*2 of the second chain array may be substantially identical to each other. Hereinafter, the configuration of the first RF chain 1110-1 of the first RF chain array 1110 and the first RF chain 1120-1 (hereinafter, referred to as second RF chain 1120-1) of the second RF chain array 1120 will be described in detail, and descriptions of the configuration of the second RF chain 1110-2, . . . , the n1$^{th}$ RF chain 1110-*n*1 of the first RF chain array 1110**, and the second RF chain

1120-2, . . . , the n2$^{th}$ RF chain **1120-*n*2 of the second RF chain array 1120** will be omitted.

According to an embodiment, the wireless communication circuit 230 may include a divider circuit 1137 and a combiner circuit 1147. Although the divider circuit 1137 and the combiner circuit 1147 are illustrated separately, the divider circuit 1137 and the combiner circuit 1147 may be integrated into a single entity.

According to an embodiment, the wireless communication circuit 230 may include a transmission path 1139 configured such that a transmission signal (for example, an IF signal) received from an IFIC (for example, the IFIC 260 in FIG. 2) is processed and transferred to the first RF chain array 1110 and/or the second RF chain array 1120.

According to an embodiment, the wireless communication circuit 230 may transfer a transmission signal (for example, an IF signal) received from the IFIC 260 to the first RF chain 1110-1 or the second RF chain 1120-1 via a transmission switch 1117-1 through the transmission path 1139.

According to an embodiment, during transmission, the divider circuit 1137 may divide an IF signal power-amplified through a PA 1133 into multiple IF signals (for example, n1 IF signals) and may provide the same to multiple transmission mixers 1135-1, . . . **1135-*n*1**.

According to an embodiment, a transmission mixer 1135-1 may up-convert an IF signal transferred from the divider circuit 1137 into an RF signal in a first frequency band, based on a local oscillation frequency generated by a second local oscillator 1161, divided by divider 1162, and phase-adjusted by a phase shifter 1163-1. According to an embodiment, the transmission switch 1117-1 may provide an RF signal in a first frequency band up-converted by the transmission mixer 1135-1 to the first RF chain 1110-1 or the second RF chain 1120-1.

According to various embodiments, during reception, a reception switch 1127-1 may transfer an RF signal, which has been received from the first RF chain 1110-1 or the second RF chain 1120-1, to a reception mixer 1145-1.

According to various embodiments, the reception mixer 1145-1 may down-convert an RF signal in a first frequency band, which has been received from the first RF chain 1110-1 or the second RF chain 1120-1, into an IF signal, based on a local oscillation frequency generated by the second local oscillator 1161, transferred through a divider 1162, and phase-adjusted by the phase shifter 1163-1, and may provide the same to a reception path 1149.

According to various embodiments, during reception, the combiner circuit 1147 of the reception path 1149 may combine multiple RF signals received from the first RF chain array 1110 or the second RF chain array 1120 into a single RF signal and may provide the same to an LNA 1143. A low-noise-amplified signal may be transferred to the IFIC 260 through a switch 1131.

According to various embodiments, the first RF chain 1110-1 may include a power amplifier (PA) 1113-1 and/or a low-noise amplifier (LNA) 1114-1.

According to various embodiments, the first switch 1112-1 may selectively connect the first antenna port 1111-1 to the PA 1113-1 or the LNA 1114-1.

According to an embodiment, the reception switch 1127-1 may transfer an RF signal in a first frequency band received from the LNA 1114-1 or an RF signal in a first frequency band received from a second reception mixer 1156-1 to the reception mixer 1145-1 such that the same is down-converted into an IF signal.

According to various embodiments, the PA 1113-1 may amplify the power of an RF signal in a first frequency band received from the transmission switch 1117-1 and may output the same to one of multiple first antenna elements 212 of the first antenna structure 210 connected to the first antenna port 1111-1, through the first switch 1112-1.

According to various embodiments, the LNA 1114-1 may low-noise-amplify an RF signal in a first frequency band received from one of multiple first antenna elements 212 of the first antenna structure 210 connected to the first antenna port 1111-1, through the first switch 1112-1, and may output the same to the reception switch 1127-1.

According to various embodiments, the wireless communication circuit 230 may up-convert a transmission signal (for example, an IF signal) input through the IFIC 260 and may output the same to the first RF chain array 1110 or the second RF chain array 1120 through the transmission path 1139.

According to an embodiment, during transmission, the wireless communication circuit 230 may transmit an input from the IFIC 260 to the transmission path 1139 through the third switch 1131. The transmission mixer 1135-1 may up-convert an IF signal, which is amplified by the PA 1133, divided through the divider circuit 1137, and then provided, into an RF signal in a first frequency band, based on a local oscillation frequency supplied from the second local oscillator 1161, divided by divider 1162, and phase-adjusted by the phase shifter 1163-1.

According to various embodiments, the wireless communication circuit 230 may down-convert an RF signal in a first frequency band received from the first RF chain array 1110 and/or the second RF chain array 1120 and may output the same to the IFIC 260 through the reception path 1149.

According to an embodiment, during signal reception, the wireless communication circuit 230 may connect an output port to the IFIC 260 and the reception path 1149 through the third switch 1131. The reception mixer 1145-1 may down-convert an RF signal in a first frequency band input from the LNA 1114-1 or the second reception mixer 1156-1 into an IF signal, based on a local oscillation frequency supplied from the second local oscillator 1161, divided by divider 1162, and phase-adjusted by the phase shifter 1163-1. A signal (for example, an IF signal) down-converted in the reception mixer 1145-1 may be low-noise-amplified through the LNA 1143 and transferred to the IFIC 260 through the third switch 1131.

According to various embodiments, the second RF chain 1120-1 may include a power amplifier (PA) 1123-1, a low-noise amplifier (LNA) 1124-1, a second transmission mixer 1155-1, and a second reception mixer 1156-1.

According to an embodiment, the second transmission mixer 1155-1 may up-convert an RF signal in a first frequency band up-converted by the transmission mixer 1135-1 into an RF signal in a second frequency band.

According to an embodiment, the second transmission mixer 1155-1 may up-convert an RF signal in a first frequency band transferred through the transmission switch 1117-1 into an RF signal in a second frequency band, based on a local oscillation frequency supplied from a first local oscillator 1151. For example, the transmission switch 1117-1 may be implemented as a divider circuit. The RF signal in a second frequency band up-converted by the second transmission mixer 1155-1 may be power-amplified through the PA 1123-1, transferred to the second antenna port 1121-1 through a second switch 1122-1, and output to one of multiple second antenna elements 222 of the second antenna structure 220.

According to an embodiment, the LNA 1124-1 may receive an RF signal in a second frequency band, which has been received by one of multiple second antenna elements 222 of the second antenna structure 220, from the second antenna port 1121-1 through the second switch 1122-1, may low-noise-amplify the same, and may output the same to the second reception mixer 1156-1.

According to an embodiment, the second switch 1122-1 may selectively connect the second antenna port 1121-1 to the PA 1123-1 or the LNA 1124-1.

According to an embodiment, the second reception mixer 1156-1 may down-convert a received RF signal in a second frequency band into an RF signal in a first frequency band, based on a local oscillation frequency supplied from the first local oscillator 1151 through the divider 1152. The RF signal in a first frequency band down-converted by the second reception mixer 1156-1 may be down-converted into an IF signal through the reception mixer 1145-1 via the reception switch 1127-1 and transferred to the IFIC 260. For example, the reception switch 1127-1 may be implemented as a divider circuit.

According to various embodiments, in order to down-convert an RF signal in a second frequency band (THz high-frequency band) of the second communication system received through the second antenna structure 220 into an IF signal, a two-step down-conversion process may be performed, for example, by down-converting the same into an RF signal in a first frequency band (millimeter wave band) of a first communication system through the second reception mixer 1156-1, and then down-converting the same into an IF signal through the reception mixer 1145-1 shared with the first antenna structure 210.

According to various embodiments, in order to generate an RF signal in a second frequency band (THz high-frequency band) of the second communication system transmitted through the second antenna structure 220, a two-step up-conversion process may be performed, for example, by up-converting an IF signal into an RF signal in a first frequency band (millimeter wave band) of the first communication system through the transmission mixer 1135-1 shared with the first antenna structure 210, and then up-converting the same into an RF signal in a second frequency band (THz high-frequency band) of the second communication system through the second transmission mixer 1155-1.

Figures 12A, 12B, 12C:
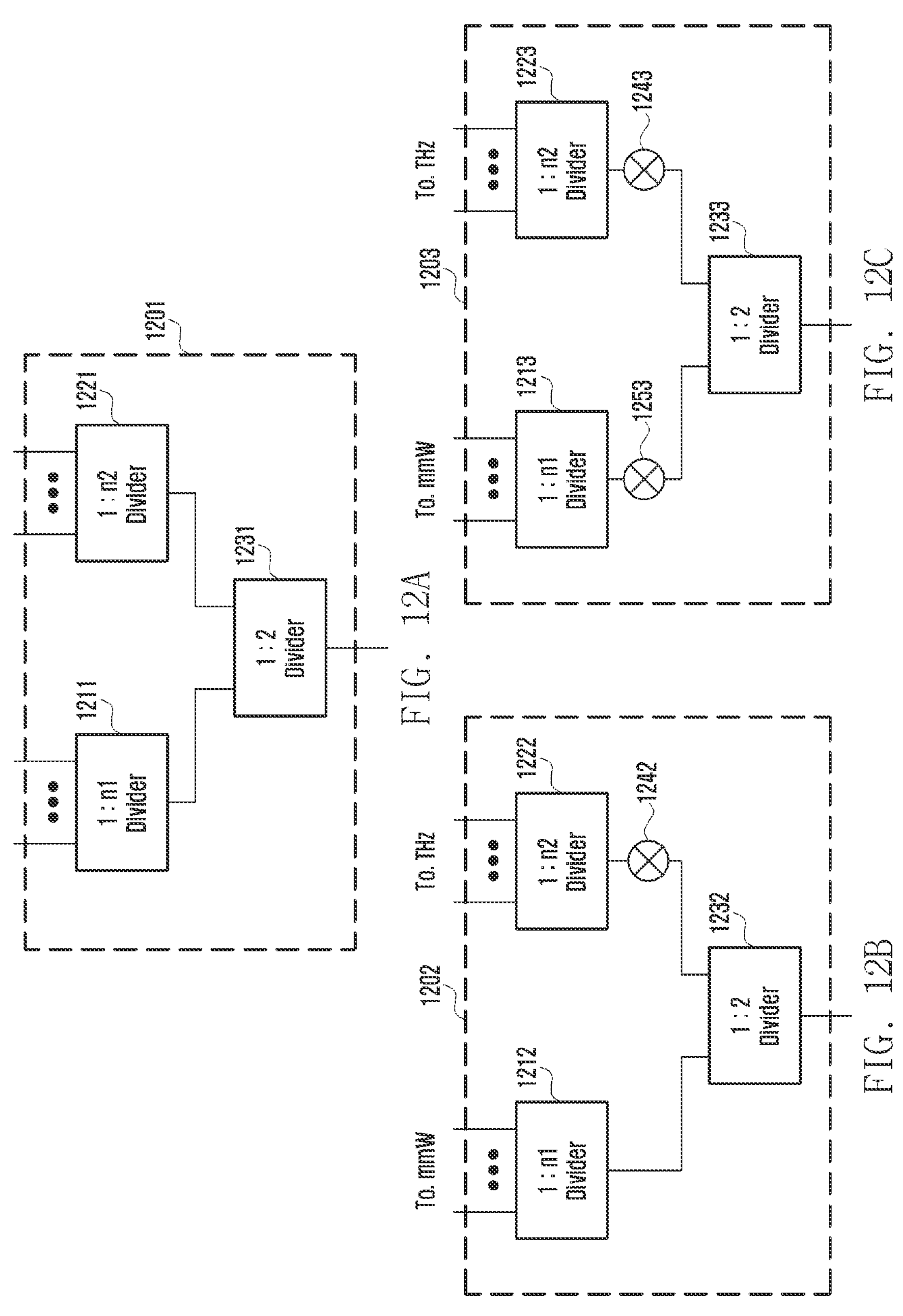
FIG. 12A, 12B, and FIG. 12C illustrate an example divider circuits and/or combiner circuits in an example electronic device according to various embodiments.

FIGS. 12A, 12B, and 12C illustrate example structures of a divider circuit or a combiner circuit 1201, 1202, or 1203 (for example, the divider circuit 637, 737, 837, 937, 1037, or 1137 and the combiner circuit 647, 747, 847, 947, 1047, or 1147 in FIG. 6, FIG. 7, FIG. 8, FIG. 9, FIG. 10, or FIG. 11) in an example electronic device according to various embodiments. Although the structure of a divider circuit will be described hereinafter, the structure of a combiner circuit is similar thereto, and detailed descriptions thereof will be omitted. For example, a divider circuit 1201, 1202, or 1203 of FIGS. 12A, 12B and 12C may be implemented as a combiner circuit 1201, 1202, or 1203.

Referring to FIG. 12A, the divider circuit 1201 may include a 1:n1 divider 1211, a 1:n2 divider 1221, and/or a 1:2 divider 1231. As used herein, n, n1, and n2 are natural numbers, and n=n1+n2. Here, the 1:n1 divider 1211, the 1:n2 divider 1221, and the 1:2 divider 1231 may be implemented as a 1:n1 combiner 1211, a 1:n2 combiner 1221, and/or a 1:2 combiner 1231.

According to an embodiment, the 1:2 divider 1231 may divide an input signal into two signals such that the divided signals are input to the 1:n1 divider 1211 and the 1:n2 divider 1221, respectively.

According to an embodiment, the 1:n1 divider 1211 may divide an input signal into n1 signals such that the divided signals are input to, for example, the first RF chain 610-1, 710-1, 810-1, 910-1, 1010-1, or 1110-1, . . . and the n1$^{th}$ RF chain 610-*n*1, 710-*n*1, 810-*n*1, 910-*n*1, 1010-*n*1, or 1110-*n*1 of a first RF chain array (for example, the first RF chain array 610, 710, 810, 910, 1010, or 1110 in FIG. 6, FIG. 7, FIG. 8, FIG. 9, FIG. 10, or FIG. 11), respectively.

According to an embodiment, the 1:n2 divider 1221 may divide an input signal into n2 signals such that the divided signals are input to, for example, the first RF chain 620-1, 720-1, 820-1, 920-1, 1020-1, or 1120-1, . . . and the n2$^{th}$ RF chain 620-*n*2, 720-*n*2, 820-*n*2, 920-*n*2, 1020-*n*2, or 1120-*n*2 of a second RF chain array (for example, the second RF chain array 620, 720, 820, 920, 1020, or 1120 in FIG. 6, FIG. 7, FIG. 8, FIG. 9, FIG. 10, or FIG. 11), respectively.

Referring to FIG. 12B, the divider circuit 1202 may include a 1:n1 divider 1212, a 1:n2 divider 1222, and a 1:2 divider 1232. As used herein, n, n1, and n2 are natural numbers, and n=n1+n2. The divider circuit 1202 may have a mixer 1242 disposed in addition to the structure of the divider circuit 1201 in FIG. 12A. Here, the 1:n1 divider 1212, the 1:n2 divider 1222, and the 1:2 divider 1232 may be implemented as a 1:n1 combiner 1212, a 1:n2 combiner 1222, and/or a 1:2 combiner 1232. Further, the mixer 1242 may be implemented as a mixer 1242 down-convert an input signal such as an RF signal in a designated frequency band (for example, second frequency band) to output the down-converted signal to the 1:2 combiner 1232.

According to an embodiment, the 1:2 divider 1232 may divide an input signal into two signals such that the divided signals are input to the 1:n1 divider 1212 and the mixer 1242, respectively.

According to an embodiment, the 1:n1 divider 1212 may divide an input signal into n1 signals such that the divided signals are input to, for example, the first RF chain 610-1, 710-1, 810-1, 910-1, 1010-1, or 1110-1, . . . and the n1$^{th}$ RF chain 610-*n*1, 710-*n*1, 810-*n*1, 910-*n*1, 1010-*n*1, or 1110-*n*1 of a first RF chain array (for example, the first RF chain array 610, 710, 810, 910, 1010, or 1110 in FIG. 6, FIG. 7, FIG. 8, FIG. 9, FIG. 10, or FIG. 11), respectively.

According to an embodiment, the mixer 1242 may up-convert an input signal such that an RF signal in a designated frequency band (for example, second frequency band) is output.

According to an embodiment, the 1:n2 divider 1222 may divide an RF signal input from the mixer 1242 into n2 signals such that the divided signals are input to, for example, the first RF chain 620-1, 720-1, 820-1, 920-1, 1020-1, or 1120-1, . . . and the n2$^{th}$ RF chain 620-*n*2, 720-*n*2, 820-*n*2, 920-*n*2, 1020-*n*2, or 1120-*n*2 of a second RF chain array (for example, the second RF chain array 620, 720, 820, 920, 1020, or 1120 in FIG. 6, FIG. 7, FIG. 8, FIG. 9, FIG. 10, or FIG. 11), respectively.

Referring to FIG. 12C, the divider circuit 1203 may include a 1:n1 divider 1213, a 1:n2 divider 1223, and a 1:2 divider 1233. As used herein, n, n1, and n2 are natural numbers, and n=n1+n2. The divider circuit 1203 may have two mixers 1243 and 1253 disposed in addition to the structure of the divider circuit 1201 in FIG. 12A. Here, the 1:n1 divider 1213, the 1:n2 divider 1223, and the 1:2 divider 1233 may be implemented as a 1:n1 combiner 1213, a 1:n2 combiner 1223, and/or a 1:2 combiner 1233. Further, the mixer 1243 may be implemented as a mixer 1243 down-convert an input signal such that an RF signal in a designated frequency band (for example, first frequency band) and output the down-converted signal to the 1:2 combiner 1233. Further, the mixer 1253 may be implemented as a mixer 1253 down-convert an input signal such that an RF signal in a designated frequency band (for example, second frequency band) to output the down converted signal to the 1:2 combiner 1233.

According to an embodiment, the 1:2 divider 1233 may divide an input signal into two signals such that the divided signals are input to the mixer 1253 and the mixer 1243, respectively.

According to an embodiment, the mixer 1253 may up-convert an input signal such that an RF signal in a designated frequency band (for example, first frequency band) is output.

According to an embodiment, the mixer 1243 may up-convert an input signal such that an RF signal in a designated frequency band (for example, second frequency band) is output.

According to an embodiment, the 1:n1 divider 1213 may divide an RF signal input from the mixer 1253 into n1 signals such that the divided signals are input to, for example, the first RF chain 610-1, 710-1, 810-1, 910-1, 1010-1, or 1110-1, . . . and the n1$^{th}$ RF chain 610-*n*1, 710-*n*1, 810-*n*1, 910-*n*1, 1010-*n*1, or 1110-*n*1 of a first RF chain array (for example, the first RF chain array 610, 710, 810, 910, 1010, or 1110 in FIG. 6, FIG. 7, FIG. 8, FIG. 9, FIG. 10, or FIG. 11), respectively.

According to an embodiment, the 1:n2 divider 1223 may divide an RF signal input from the mixer 1243 into n2 signals such that the divided signals are input to, for example, the first RF chain 620-1, 720-1, 820-1, 920-1, 1020-1, or 1120-1, . . . and the n2$^{th}$ RF chain 620-*n*2, 720-*n*2, 820-*n*2, 920-*n*2, 1020-*n*2, or 1120-*n*2 of a second RF chain array (for example, the second RF chain array 620, 720, 820, 920, 1020, or 1120 in FIG. 6, FIG. 7, FIG. 8, FIG. 9, FIG. 10, or FIG. 11), respectively.

Figure 13:
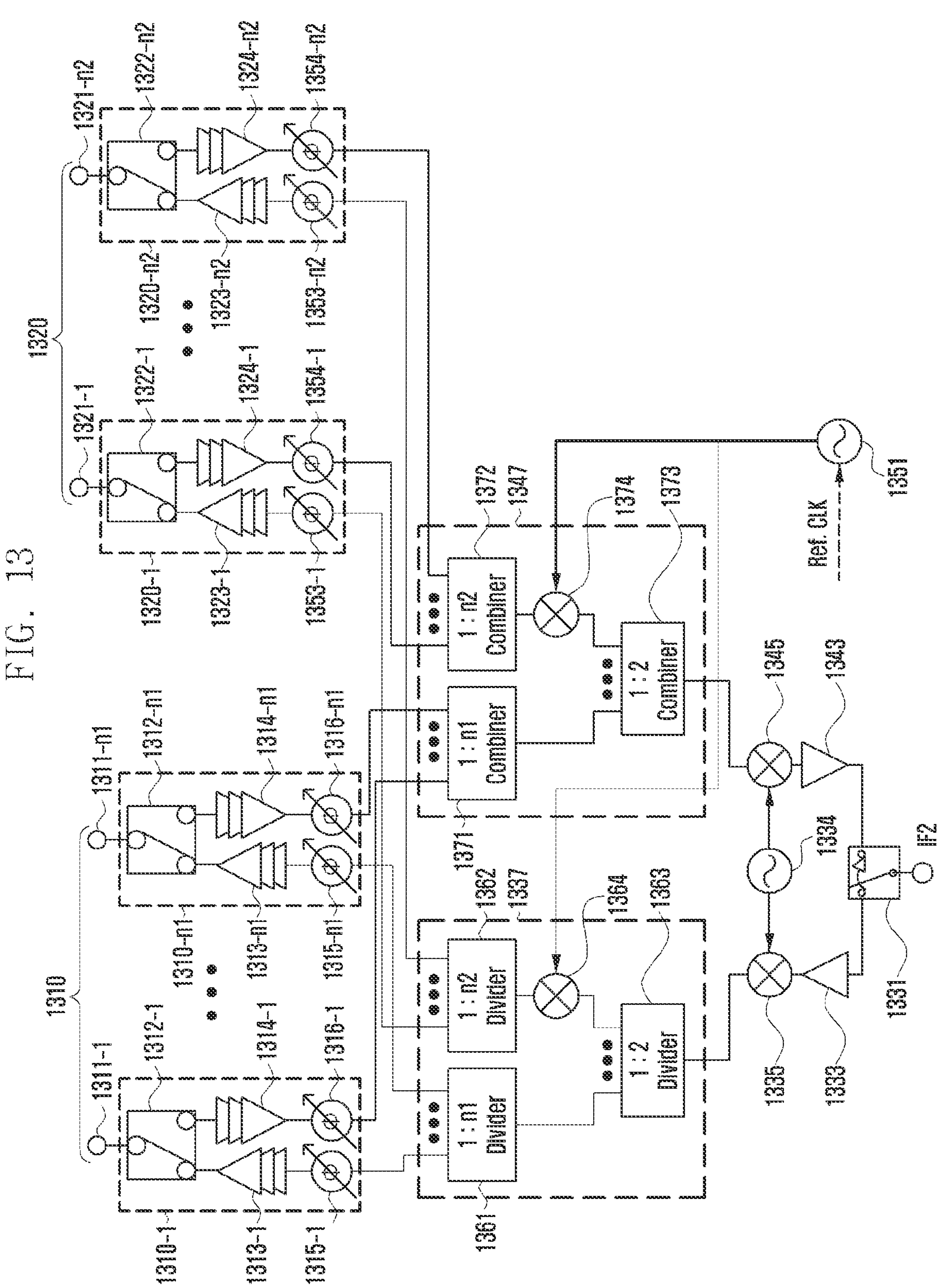
FIG. 13 illustrates an example wireless communication circuit structure configured to process radio signals for multiple communication systems in an example electronic device according to various embodiments.

FIG. 13 illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 13, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5) and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first RF chain array (for example, a first RF chain 1310-1, . . . , an n1$^{th}$ RF chain **1310-*n*1) for processing RF signals transmitted and/or received through multiple first antenna elements 212 of the first antenna structure 210. According to an embodiment, the wireless communication circuit 230 may include a second RF chain array (for example, a first RF chain 1320-1, . . . , an n2$^{th}$ RF chain 1320-*n*2) for processing RF signals transmitted and/or received through multiple second antenna elements 222 of the second antenna structure 220. Although the wireless communication circuit 230 includes n1 (a natural number equal to/larger than 2) antenna ports 1311-1, . . . , 1311-*n*1 in order to connect to multiple first antenna elements 212 of the first antenna structure 210, and includes n2 (a natural number equal to/larger than 2) antenna ports 1321-1, . . . , 1321-*n*2 in order to connect to multiple second antenna elements 222 of the second antenna structure 220 in the illustrated example, embodiments are not limited thereto, and various numbers of antenna ports and RF chains may be used. As an example, the first RF chain 1310-1, . . . , and the n1$^{th}$ RF chain 1310-*n*1 of the first chain array 1310 may be substantially identical to each other. As an example, the first RF chain 1320-1, . . . , and the n2$^{th}$ RF chain 1320-*n*2 of the second chain array may be substantially identical to each other. Hereinafter, the configuration of the first RF chain 1310-1 of the first RF chain array 1310 and the first RF chain 1320-1 (hereinafter, referred to as second RF chain 1320-1) of the second RF chain array 1320 will be described in detail, and descriptions of the configuration of the second RF chain 1310-2, . . . , the n2$^{th}$ RF chain 1310-*n*1 of the first RF chain array 1310, and the second RF chain 1320-2, . . . , the n2$^{th}$ RF chain 1320-*n*2 of the second RF chain array 1320** will be omitted.

According to an embodiment, the wireless communication circuit 230 may include a divider circuit 1337 and a combiner circuit 1347. Although the divider circuit 1337 and the combiner circuit 1347 are illustrated separately, the divider circuit 1337 and the combiner circuit 1347 may be integrated into a single entity.

According to an embodiment, the wireless communication circuit 230 may up-convert a transmission signal (for example, an IF signal) received from the IFIC 260 and may transfer the same to the first RF chain array 1310 or the second RF chain array 1320 via the divider circuit 1337.

According to an embodiment, during transmission, the divider circuit 1337 may divide an RF signal received from a transmission mixer 1335 into multiple RF signals (for example, n1, n2, or n1+n2 signals) and may provide the same to the first RF chain array 1310 and/or the second RF chain array 1320. For example, the divider circuit 1337 may provide divided RF signals to the first RF chain 1310-1, . . . and/or the n1th RF chain **1310-*n*1 of the first RF chain array 1310, and/or the first RF chain 1320-1, . . . and/or the n2th RF chain 1320-*n*2 of the second RF chain array 1320**.

According to an embodiment, the divider circuit 1337 may have a structure similar to that illustrated in FIG. 12B. According to an embodiment, the divider circuit 1337 may include a 1:n1 divider 1361 (for example, the 1:n1 divider 1212 in FIG. 12B), a 1:n2 divider 1362 (for example, the 1:n2 divider 1222 in FIG. 12B), and a 1:2 divider 1363 (for example, the 1:2 divider 1232 in FIG. 12B). As used herein, n, n1, and n2 are natural numbers, and n=n1+n2. The divider circuit 1337 may have a second transmission mixer 1364 (for example, the mixer 1242 in FIG. 12B) disposed between the 1:2 divider 1363 and the 1:n2 divider 1362, similarly to the structure of the divider circuit 1202 in FIG. 12B.

According to an embodiment, the 1:2 divider 1363 may divide an input signal into two signals such that the divided signals are input to the 1:n1 divider 1361 and the second mixer 1364, respectively.

According to an embodiment, the 1:n1 divider 1361 may divide an input signal into n1 signals such that the divided signals are input to, for example, the first RF chain 610-1, 710-1, 810-1, 910-1, 1010-1, or 1110-1, . . . and the n1$^{th}$ RF chain **610-*n*1, 710-*n*1, 810-*n*1, 910-*n*1, 1010-*n*1, or 1110-*n*1 of a first RF chain array (for example, the first RF chain array 610, 710, 810, 910, 1010, or 1110 in FIG. 6, FIG. 7, FIG. 8, FIG. 9, FIG. 10, or FIG. 11**), respectively.

According to an embodiment, the second transmission mixer 1364 may up-convert an input signal, based on a local oscillation frequency supplied from a first local oscillator 1351, such that an RF signal in a designated frequency band (for example, second frequency band) is output.

According to an embodiment, the 1:n2 divider 1362 may divide an RF signal input from the second transmission mixer 1364 into n2 signals such that the divided signals are input to, for example, the first RF chain 620-1, 720-1, 820-1, 920-1, 1020-1, or 1120-1, . . . and the n2$^{th}$ RF chain **620-*n*2, 720-*n*2, 820-*n*2, 920-*n*2, 1020-*n*2, or 1120-*n*2 of a second RF chain array (for example, the second RF chain array 620, 720, 820, 920, 1020, or 1120 in FIG. 6, FIG. 7, FIG. 8, FIG. 9, FIG. 10, or FIG. 11**), respectively.

According to various embodiments, during reception, the combiner circuit 1347 may combine multiple RF signals received from the first RF chain array 1310 and/or the second RF chain array 1320 into a single RF signal and may provide the same to a reception mixer 1345. For example, the combiner circuit 1347 may combine multiple RF signals received from the first RF chain 1310-1, . . . and/or the n1$^{th}$ RF chain **1310-*n*2 of the first RF chain array 1310, and/or the first RF chain 1320-1, . . . and/or the n2$^{th}$ RF chain 1320-*n*2 of the second RF chain array 1320 into a single RF signal and may provide the same to the reception mixer 1345**.

According to an embodiment, the combiner circuit 1347 may have a structure similar to that illustrated in FIG. 12B. According to an embodiment, the combiner circuit 1347 may include a 1:n1 combiner 1371 (for example, corresponding to the 1:n1 divider 1212 in FIG. 12B), a 1:n2 combiner 1372 (for example, corresponding to the 1:n2 divider 1222 in FIG. 12B), and a 1:2 combiner 1373 (for example, corresponding the 1:2 divider 1232 in FIG. 12B). As used herein, n, n1, and n2 are natural numbers, and n=n1+n2. The combiner circuit 1347 may have a second reception mixer 1374 (for example, corresponding to the mixer 1242 in FIG. 12B) disposed between the 1:2 combiner 1373 and the 1:n2 combiner 1372, similarly to the structure of the divider circuit 1202 in FIG. 12B.

According to an embodiment, the 1:n1 combiner 1371 may combine n1 signals input from, for example, the first RF chain 610-1, 710-1, 810-1, 910-1, 1010-1, or 1110-1, . . . and the n1$^{th}$ RF chain **610-*n*1, 710-*n*1, 810-*n*1, 910-*n*1, 1010-*n*1, or 1110-*n*1 of a first RF chain array (for example, the first RF chain array 610, 710, 810, 910, 1010, or 1110 in FIG. 6, FIG. 7, FIG. 8, FIG. 9, FIG. 10, or FIG. 11) and may provide a combined RF signal to the 1:2 combiner 1373**.

According to an embodiment, the 1:n2 combiner 1372 may combine n2 RF signals in a second frequency band input from, for example, the first RF chain 620-1, 720-1, 820-1, 920-1, 1020-1, or 1120-1, . . . and the n2$^{th}$ RF chain

620-*n*2, 720-*n*2, 820-*n*2, 920-*n*2, 1020-*n*2, or 1120-*n*2 of a second RF chain array (for example, the second RF chain array 620, 720, 820, 920, 1020, or 1120 in FIG. 6, FIG. 7, FIG. 8, FIG. 9, FIG. 10, or FIG. 11) and may provide the same to the second reception mixer 1374.

According to an embodiment, the second reception mixer 1374 may down-convert an input signal, based on a local oscillation frequency supplied from the first local oscillator 1351, such that an RF signal in a designated frequency band (for example, first frequency band) is output.

According to an embodiment, the 1:2 combiner 1373 may combine input signals and transfer the combined signals to the reception mixer 1345.

According to various embodiments, the first RF chain 1310-1 may include phase shifters 1315-1 and 1316-1, a power amplifier (PA) 1313-1, and/or a low-noise amplifier (LNA) 1314-1. According to an embodiment, the phase shifter 1315-1 may adjust the phase of an RF signal transferred from the divider circuit 1337 and input to the power amplifier 1313-1 and may output the same.

According to an embodiment, the phase shifter 1316-1 may adjust the phase of an RF signal transferred from the LNA 1314-1 and may output the same.

According to various embodiments, the PA 1313-1 may amplify the power of an RF signal received from the phase shifter 1315-1. According to an embodiment, the PA 1313-1 may amplify the power of an RF signal received from the phase shifter 1315-1 and may output the same to one of multiple first antenna elements 212 of the first antenna structure 210 connected to the first antenna port 1311-1, through a first switch 1312-1.

According to various embodiments, the LNA 1314-1 may low-noise-amplify an RF signal received through the first switch 1312-1 and may output the same. According to an embodiment, the LNA 1314-1 may low-noise-amplify an RF signal received from one of multiple first antenna elements 212 of the first antenna structure 210 connected to the first antenna port 1311-1, through the first switch 1312-1, and may output the same to the phase shifter 1316-1.

According to various embodiments, the first switch 1312-1 may selectively connect the first antenna port 1311-1 to the PA 1313-1 or the LNA 1314-1.

According to an embodiment, during transmission, the wireless communication circuit 230 may connect an input from the IFIC 260 to the PA 1333 through the third switch 1331. The transmission mixer 1335 may up-convert an IF signal amplified by the PA 1333 into a first RF signal in a first frequency band, based on a local oscillation frequency supplied from a second local oscillator 1334. The RF signal in a first frequency band up-converted in the transmission mixer 1335 may be transferred to the first RF chain array 1310 and/or the second RF chain array 1320 through the divider circuit 1337.

According to various embodiments, the wireless communication circuit 230 may down-convert an RF signal in a first frequency band received from the first RF chain array 1310 and/or the second RF chain array 1320 and may output the same to the IFIC 260. According to an embodiment, the reception mixer 1345 may down-convert an RF signal input from the first RF chain array 1310 and/or the second RF chain array 1320 through the combiner circuit 1347, based on a local oscillation frequency supplied from the second local oscillator 1334. The signal (for example, IF signal) down-converted in the reception mixer 1345 may be low-noise-amplified through the LNA 1343 and transferred to the IFIC 260 through the third switch 1331.

According to various embodiments, the second RF chain 1320-1 may include a power amplifier (PA) 1323-1, a low-noise amplifier (LNA) 1324-1, and/or phase shifters 1353-1 and 1354-1.

According to an embodiment, the phase shifter 1353-1 may adjust the phase of an RF signal transferred from the divider circuit 1337 and input to the power amplifier 1323-1 and may output the same.

According to an embodiment, the phase shifter 1354-1 may adjust the phase of an RF signal transferred from the LNA 1324-1 and may output the same.

According to various embodiments, the PA 1323-1 of the second RF chain 1320-1 may amplify the power of an RF signal in a second frequency band received from the phase shifter 1353-1.

According to an embodiment, the RF signal in a second frequency band power-amplified through the PA 1323-1 may be transferred to the second antenna port 1321-1 through a second switch 1322-1 and may be output to one of multiple second antenna elements 222 of the second antenna structure 220.

According to an embodiment, the LNA 1324-1 may receive an RF signal in a second frequency band, which has been received by one of multiple second antenna elements 222 of the second antenna structure 220, from the second antenna port 1321-1 through the second switch 1322-1, may low-noise-amplify the same, and may output the same to the phase shifter 1354-1.

According to an embodiment, the phase shifter 1354-1 may adjust the phase of the low-noise-amplified RF signal in a second frequency band and may output the same to the combiner circuit 1347.

According to various embodiments, in order to down-convert an RF signal in a second frequency band (THz high-frequency band) of the second communication system received through the second antenna structure 220 into an IF signal, a two-step down-conversion process may be performed, for example, by down-converting the same into an RF signal in a first frequency band (millimeter wave band) of the first communication system through the second reception mixer 1374, and then down-converting the same into an IF signal through the reception mixer 1345 shared with the first antenna structure 210.

According to various embodiments, in order to generate an RF signal in a second frequency band (THz high-frequency band) of the second communication system transmitted through the second antenna structure 220, a two-step up-conversion process may be performed, for example, by up-converting an IF signal into an RF signal in a first frequency band (millimeter wave band) of the first communication system through the transmission mixer 1335 shared with the first antenna structure 210, and then up-converting the same into an RF signal in a second frequency band (THz high-frequency band) of the second communication system through the second transmission mixer 1364.

Figure 14:
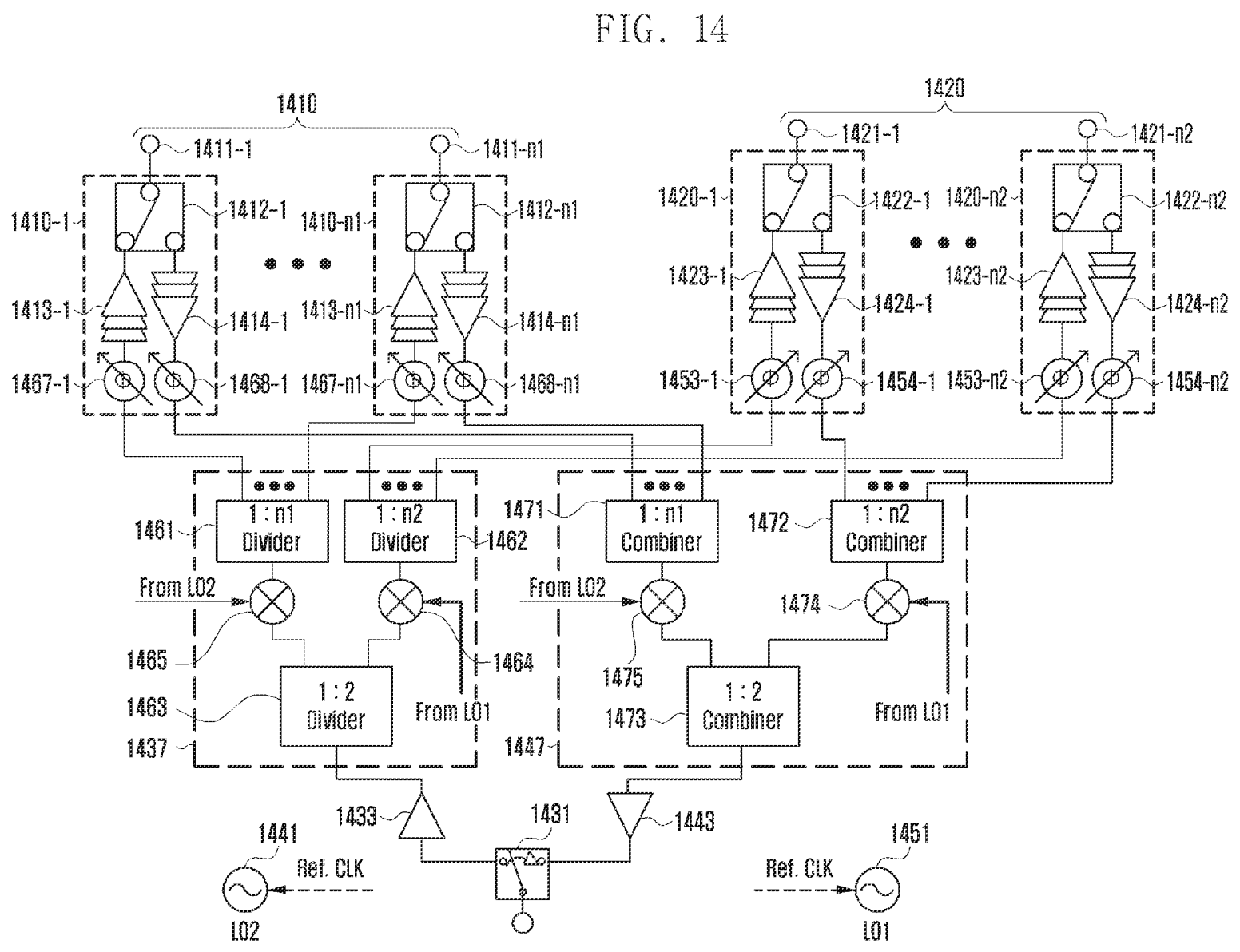

FIG. 14 illustrates an example structure of a circuit (for example, the wireless communication circuit 230 in FIG. 2) configured to process radio signals for multiple communication systems in an example electronic device (for example, the electronic device 200 in FIG. 2) according to various embodiments.

Referring to FIG. 14, the wireless communication circuit 230 may process RF signals transmitted and/or received through multiple first antenna elements (for example, the first antenna elements 212 in FIG. 2, FIG. 3, FIG. 4, or FIG. 5) disposed on a first antenna structure (for example, the first antenna structure 210 in FIG. 2, FIG. 3, FIG. 4, or FIG. 5)

and/or multiple second antenna elements (for example, the second antenna elements 222 in FIG. 2, FIG. 3, FIG. 4, or FIG. 5) disposed on a second antenna structure (for example, the second antenna structure 220 in FIG. 2, FIG. 3, FIG. 4, or FIG. 5).

According to an embodiment, the wireless communication circuit 230 may include a first RF chain array (for example, a first RF chain 1410-1, . . . , an n1$^{th}$ RF chain **1410-*n*1) for processing RF signals transmitted and/or received through multiple first antenna elements 212 of the first antenna structure 210. According to an embodiment, the wireless communication circuit 230 may include a second RF chain array (for example, a first RF chain 1420-1, . . . , an n2$^{th}$ RF chain 1420-*n*2) for processing RF signals transmitted and/or received through multiple second antenna elements 222 of the second antenna structure 220. Although the wireless communication circuit 230 includes n1 (a natural number equal to/larger than 2) antenna ports 1411-1, . . . , 1411-*n*1 in order to connect to multiple first antenna elements 212 of the first antenna structure 210, and includes n2 (a natural number equal to/larger than 2) antenna ports 1421-1, . . . , 1421-*n*2 in order to connect to multiple second antenna elements 222 of the second antenna structure 220 in the illustrated example, embodiments are not limited thereto, and various numbers of antenna ports and RF chains may be used. As an example, the first RF chain 1410-1, . . . , and the n1$^{th}$ RF chain 1410-*n*1 of the first chain array 1410 may be substantially identical to each other. As an example, the first RF chain 1420-1, . . . , and the n2$^{th}$ RF chain 1420-*n*2 of the second chain array may be substantially identical to each other. Hereinafter, the configuration of the first RF chain 1410-1 of the first RF chain array 1410 and the first RF chain 1420-1 (hereinafter, referred to as second RF chain 1420-1) of the second RF chain array 1420 will be described in detail, and descriptions of the configuration of the second RF chain 1410-2, . . . , the n1$^{th}$ RF chain 1410-*n*1 of the first RF chain array 1410, and the second RF chain 1420-2, . . . , the n2$^{th}$ RF chain 1420-*n*2 of the second RF chain array 1420** will be omitted.

According to an embodiment, the wireless communication circuit 230 may include a divider circuit 1437 and a combiner circuit 1447. Although the divider circuit 1437 and the combiner circuit 1447 are illustrated separately, the divider circuit 1437 and the combiner circuit 1447 may be integrated into a single entity.

According to an embodiment, the wireless communication circuit 230 may power-amplify a transmission signal (for example, an IF signal) received from an IFIC (for example, the IFIC 260 in FIG. 2) and may transfer the same to the first RF chain array 1410 and/or the second RF chain array 1420.

According to an embodiment, during transmission, the divider circuit 1437 may divide an RF signal received from a PA 1433 into multiple RF signals (for example, n1, n2, or n1+n2 signals) and may provide the same to the first RF chain array 1410 and/or the second RF chain array 1420. For example, the divider circuit 1437 may provide divided RF signals to the first RF chain 1410-1, . . . and/or the n1$^{th}$ RF chain **1410-*n*1 of the first RF chain array 1410, and/or the first RF chain 1420-1, . . . and/or the n2$^{th}$ RF chain 1420-*n*2 of the second RF chain array 1420**.

According to an embodiment, the divider circuit 1437 may have a structure similar to that illustrated in FIG. 12C. According to an embodiment, the divider circuit 1437 may include a 1:n1 divider 1461 (for example, the 1:n1 divider 1213 in FIG. 12C), a 1:n2 divider 1462 (for example, the 1:n2 divider 1223 in FIG. 12C), and a 1:2 divider 1463 (for example, the 1:2 divider 1233 in FIG. 12C). As used herein, n, n1, and n2 are natural numbers, and n=n1+n2. The divider circuit 1437 may have a second transmission mixer 1464 (for example, the mixer 1243 in FIG. 12C) and a first transmission mixer 1465 (for example, the mixer 1253 in FIG. 12C) disposed additionally, similarly to the structure of the divider circuit 1202 in FIG. 12C. For example, the first transmission mixer 1465 may be disposed between the 1:2 divider 1463 and the 1:n1 divider 1461. For example, the second transmission mixer 1464 may be positioned between the 1:2 divider 1463 and the 1:n2 divider 1462.

According to an embodiment, the 1:2 divider 1463 may divide an input signal into two signals such that the divided signals are input to the first transmission mixer 1465 and the second transmission mixer 1464, respectively.

According to an embodiment, the first transmission mixer 1465 may up-convert an input signal, based on a local oscillation frequency supplied from a second local oscillator 1441, such that an RF signal in a designated frequency band (for example, first frequency band) is output.

According to an embodiment, the 1:n1 divider 1461 may divide a signal input from the first transmission mixer 1465 into n1 signals such that the divided signals are input to, for example, the first RF chain 610-1, 710-1, 810-1, 910-1, 1010-1, or 1110-1, . . . and the n1$^{th}$ RF chain **610-*n*1, 710-*n*1, 810-*n*1, 910-*n*1, 1010-*n*1, or 1110-*n*1 of a first RF chain array (for example, the first RF chain array 610, 710, 810, 910, 1010, or 1110 in FIG. 6, FIG. 7, FIG. 8, FIG. 9, FIG. 10, or FIG. 11**), respectively.

According to an embodiment, the second transmission mixer 1464 may up-convert an input signal, based on a local oscillation frequency supplied from a first local oscillator 1451, such that an RF signal in a designated frequency band (for example, second frequency band) is output.

According to an embodiment, the 1:n2 divider 1462 may divide an RF signal input from the second transmission mixer 1464 into n2 signals such that the divided signals are input to, for example, the first RF chain 620-1, 720-1, 820-1, 920-1, 1020-1, or 1120-1, . . . and the n2$^{th}$ RF chain **620-*n*2, 720-*n*2, 820-*n*2, 920-*n*2, 1020-*n*2, or 1120-*n*2 of a second RF chain array (for example, the second RF chain array 620, 720, 820, 920, 1020, or 1120 in FIG. 6, FIG. 7, FIG. 8, FIG. 9, FIG. 10, or FIG. 11**), respectively.

According to various embodiments, the first RF chain 1410-1 may include phase shifters 1467-1 and 1468-1, a power amplifier (PA) 1413-1, and/or a low-noise amplifier (LNA) 1414-1. According to an embodiment, the phase shifter 1467-1 may adjust the phase of an RF signal transferred from the divider circuit 1461 and input to the PA 1413-1 and may output the same.

According to an embodiment, the phase shifter 1468-1 may adjust the phase of an RF signal transferred from the LNA 1414-1 and may output the same.

According to various embodiments, the PA 1413-1 may amplify the power of an RF signal received from the phase shifter 1467-1. According to an embodiment, the PA 1413-1 may amplify the power of an RF signal received from the phase shifter 1467-1 and may output the same to one of multiple first antenna elements 212 of the first antenna structure 210 connected to the first antenna port 1411-1, through a first switch 1412-1.

According to various embodiments, the LNA 1414-1 may low-noise-amplify an RF signal received through the first switch 1412-1 and may output the same. According to an embodiment, the LNA 1414-1 may low-noise-amplify an RF signal received from one of multiple first antenna elements 212 of the first antenna structure 210 connected to the first antenna port 1411-1, through the first switch 1412-1, and may output the same to the phase shifter 1468-1.

According to various embodiments, the first switch 1412-1 may selectively connect the first antenna port 1411-1 to the PA 1413-1 or the LNA 1414-1.

According to an embodiment, during transmission, the wireless communication circuit 230 may connect an input from the IFIC 260 to the PA 1433 through the third switch 1431. The first transmission mixer 1465 and/or the second transmission mixer 1464 may up-convert an IF signal amplified by the PA 1433 into an RF signal in a first frequency band and/or an RF signal in a second frequency band, respectively. The RF signal in a first frequency band up-converted in the first transmission mixer 1465 may be transferred to the first RF chain array 1410 through a divider (for example, 1:n1 divider) 1461. The RF signal in a second frequency band up-converted in the second transmission mixer 1464 may be transferred to the second RF chain array 1420 through the divider (for example, 1:n2 divider) 1462.

According to various embodiments, the second RF chain 1420-1 may include a power amplifier (PA) 1423-1 and/or a low-noise amplifier (LNA) 1424-1.

According to an embodiment, the second RF chain 1420-1 may further include a phase shifter 1453-1 configured to adjust the phase of an RF signal transferred from the divider circuit 1437 and input to the PA 1423-1 and to output the same.

According to an embodiment, the second RF chain 1420-1 may further include a phase shifter 1454-1 configured to adjust the phase of an RF signal received from the LNA 1424-1 and to output the same.

According to an embodiment, an RF signal in a second frequency band up-converted by the second transmission mixer 1464 may be phase-adjusted by the phase shifter 1453-1 via the 1:n2 divider 1462, power-amplified through the PA 1423-1, transferred to the second antenna port 1421-1 through the second switch 1422-1, and output to one of multiple antenna elements 222 of the second antenna structure 220.

According to an embodiment, the LNA 1424-1 may receive an RF signal in a second frequency band, which has been received by one of multiple second antenna elements 222 of the second antenna structure 220, from the second antenna port 1421-1 through the second switch 1422-1, may low-noise-amplify the same, and may output the same to the phase shifter 1454-1.

According to an embodiment, the phase shifter 1454-1 may adjust the phase of the low-noise-amplified RF signal in a second frequency band and may output the same to the combiner circuit 1447.

According to an embodiment, the combiner circuit 1447 may have a structure similar to that illustrated in FIG. 12C. According to an embodiment, the combiner circuit 1447 may include a 1:n1 combiner 1471 (for example, corresponding to the 1:n1 divider 1213 in FIG. 12C), a 1:n2 combiner 1472 (for example, corresponding to the 1:n2 divider 1223 in FIG. 12C), and a 1:2 combiner 1473 (for example, corresponding to the 1:2 divider 1233 in FIG. 12C). As used herein, n, n1, and n2 are natural numbers, and n=n1+n2. The combiner circuit 1447 may have a first reception mixer 1475 (for example, corresponding to the mixer 1253 in FIG. 12C) and a second reception mixer 1474 (for example, corresponding to the mixer 1243 in FIG. 12C) disposed additionally, similarly to the structure of the divider circuit 1203 in FIG. 12C. For example, the first reception mixer 1475 may be disposed between the 1:2 combiner 1473 and the 1:n1 combiner 1471. For example, the second reception mixer 1474 may be positioned between the 1:2 combiner 1473 and the 1:n2 combiner 1472.

According to an embodiment, the 1:n1 combiner 1471 may combine n1 RF signals input from, for example, the first RF chain 610-1, 710-1, 810-1, 910-1, 1010-1, or 1110-1, . . . and the n1$^{th}$ RF chain **610-*n*1, 710-*n*1, 810-*n*1, 910-*n*1, 1010-*n*1, or 1110-*n*1 of a first RF chain array (for example, the first RF chain array 610, 710, 810, 910, 1010, or 1110 in FIG. 6, FIG. 7, FIG. 8, FIG. 9, FIG. 10, or FIG. 11) and may provide the combined RF signal to the first reception mixer 1475**.

According to an embodiment, the 1:n2 combiner 1472 may combine n2 RF signals in a second frequency band input from, for example, the first RF chain 620-1, 720-1, 820-1, 920-1, 1020-1, or 1120-1, . . . and the n2$^{th}$ RF chain **620-*n*2, 720-*n*2, 820-*n*2, 920-*n*2, 1020-*n*2, or 1120-*n*2 of a second RF chain array (for example, the second RF chain array 620, 720, 820, 920, 1020, or 1120 in FIG. 6, FIG. 7, FIG. 8, FIG. 9, FIG. 10, or FIG. 11) and may provide the same to the second reception mixer 1474**.

According to an embodiment, the first reception mixer 1475 may down-convert an input signal, based on a local oscillation frequency supplied from the second local oscillator 1441, such that an IF signal is output.

According to an embodiment, the second reception mixer 1474 may down-convert an input signal, based on a local oscillation frequency supplied from the first local oscillator 1451, such that an IF signal is output.

According to an embodiment, the 1:2 combiner 1473 may combine input signals and transfer the combined signals to a low-noise amplifier 1443.

According to various example embodiments, an electronic device (for example, the electronic device 200 in FIG. 2) may include multiple first antenna ports (for example, the first antenna ports 611-1, . . . **611-*n*1, 711-1, . . . 711-*n*1, 811-1, . . . 811-*n*1, 911-1, . . . 911-*n*1, 1011-1, 0.1011-*n*1, 1111-1, . . . 1111-*n*1, 1311-1, . . . 1311-*n*1, or 1411-1, . . . 1411-*n*1 in FIG. 6A, FIG. 7, FIG. 8, FIG. 9, FIG. 10, FIG. 11, FIG. 13, or FIG. 14) connected to a first antenna structure for mmWave band communication, multiple second antenna ports (for example, the second antenna ports 621-1, . . . 621-*n*2, 721-1, . . . 721-*n*2, 821-1, . . . 821-*n*2, 921-1, . . . 921-*n*2, 1021-1, . . . 1021-*n*2, 1121-1, . . . 1121-*n*2, 1321-1, . . . 1321-*n*2, or 1421-1, . . . 1421-*n*2 in FIG. 6A, FIG. 7, FIG. 8, FIG. 9, FIG. 10, FIG. 11, FIG. 13, or FIG. 14) connected to a second antenna structure for THz high-frequency band communication, a first transmission mixer (for example, the transmission mixer 635, 735, 835, 935, 1035, 1135, 1335, or 1435 in FIG. 6A, FIG. 7, FIG. 8, FIG. 9, FIG. 10, FIG. 11, FIG. 13, or FIG. 14) configured to up-convert a signal, a first reception mixer (for example, the reception mixer 645, 745, 845, 945, 1045, 1145, 1345, or 1445 in FIG. 6A, FIG. 7, FIG. 8, FIG. 9, FIG. 10, FIG. 11, FIG. 13, or FIG. 14) configured to down-convert a signal, a second transmission mixer (for example, the second transmission mixer 655-1, . . . 655-*n*2, 755-1, . . . 755-*n*2, 855-1, . . . 855-*n*2, 955-1, . . . 955-*n*2, 1055-1, . . . 1055-*n*2, 1155-1, . . . 1155-*n*2, 1364, or 1464 in FIG. 6A, FIG. 7, FIG. 8, FIG. 9, FIG. 10, FIG. 11, FIG. 13, or FIG. 14) connected to the multiple second antenna ports and configured to up-convert a signal, a second reception mixer (for example, the second reception mixer 656-1, 0.656-*n*2, 756-1, . . . 756-*n*2, 856-1, . . . 856-*n*2, 956-1, . . . 956-*n*2, 1056-1, . . . 1056-*n*2, 1156-1, . . . 1156-*n*2, 1374, or 1474 in FIG. 6A, FIG. 7, FIG. 8, FIG. 9, FIG. 10, FIG. 11, FIG. 13, or FIG. 14) connected to the multiple second antenna ports and configured to down-convert a signal, a third transmission mixer (for example, the third transmission mixer 665 in FIG. 6B) configured to up-convert a signal and transfer the signal to the first transmission mixer, a third reception mixer (for example, the reception mixer 675 in FIG. 6B) configured to down-convert a signal transferred from the first reception mixer, a divider circuit (for example, the divider circuit 637, 737, 837, 937, 1037, 1137, 1337, or 1437 in FIG. 6A, FIG. 7, FIG. 8, FIG. 9, FIG. 10, FIG. 11, FIG. 13, or FIG. 14) configured to divide a signal up-converted in the transmission mixer and transfer the signal to at least one of the multiple first antenna ports or the second transmission mixer, and a combiner circuit (for example, the combiner circuit 647, 747, 847, 947, 1047, 1147, 1347, or 1447 in FIG. 6A, FIG. 7, FIG. 8, FIG. 9, FIG. 10, FIG. 11, FIG. 13, or FIG. 14**) configured to combine signals received from at least one of the multiple first antenna ports or the second reception mixer and provide the combined signals to the first reception mixer.

According to various example embodiments, the first transmission mixer may up-convert a signal into an RF signal in a first frequency band, and the second transmission mixer may up-convert the RF signal in the first frequency band up-converted by the first transmission mixer into an RF signal in a second frequency band.

According to various example embodiments, the second reception mixer may down-convert a signal received from the multiple second antenna ports into an RF signal in a first frequency band, and the first reception mixer may down-convert the RF signal in the first frequency band.

According to various embodiments, the electronic device may further include multiple amplifiers (for example, the amplifiers 613-1, . . . **613-*n*1, 713-1, . . . 713-*n*1, 813-1, . . . 813-*n*1, 913-1, . . . 913-*n*1, 1013-1, . . . 1013-*n*1, 1113-1, . . . 1113-*n*1, 1313-1, . . . 1313-*n*1, or 1413-1, . . . 0.1413-*n*1 in FIG. 6A, FIG. 7, FIG. 8, FIG. 9, FIG. 10, FIG. 11, FIG. 13, or FIG. 14) and multiple low-noise amplifiers (for example, the low-noise amplifiers 614-1, . . . 614-*n*1, 714-1, . . . 714-*n*1, 814-1, . . . 814-*n*1, 914-1, . . . 914-*n*1, 1014-1, . . . 1014-*n*1, 1114-1, . . . 1114-*n*1, 1314-1, . . . 1314-*n*1, or 1414-1, . . . 1414-*n*1 n1 in FIG. 6A, FIG. 7, FIG. 8, FIG. 9, FIG. 10, FIG. 11, FIG. 13, or FIG. 14**). The first transmission mixer may up-convert a signal into an RF signal in a first frequency band, the multiple amplifiers may amplify the RF signal in the first frequency band and output the amplified signal through the multiple first antenna ports, the multiple low-noise amplifiers may low-noise-amplify a signal transferred from the multiple first antenna ports and transfer the low-noise-amplified signal to the first reception mixer, and the first reception mixer may down-convert the low-noise-amplified signal into an IF signal.

According to various example embodiments, the electronic device may further include multiple amplifiers (for example, the amplifiers 623-1, . . . **623-*n*2, 723-1, . . . 723-*n*2, 823-1, . . . 823-*n*2, 923-1, . . . 923-*n*2, 1023-1, . . . 1023-*n*2, 1123-1, . . . 1123-*n*2, 1323-1, . . . 1323-*n*2, or 1423-1, . . . 1423-*n*2 in FIG. 6A, FIG. 7, FIG. 8, FIG. 9, FIG. 10, FIG. 11, FIG. 13, or FIG. 14) and multiple low-noise amplifiers (for example, the low-noise amplifiers 624-1, . . . 624-*n*2, 724-1, . . . 724-*n*2, 824-1, . . . 824-*n*2, 924-1, . . . 924-*n*2, 1024-1, . . . 1024-*n*2, 1124-1, . . . 1124-*n*2, 1324-1, . . . 1324-*n*2, or 1424-1, . . . 1424-*n*2 in FIG. 6A, FIG. 7, FIG. 8, FIG. 9, FIG. 10, FIG. 11, FIG. 13, or FIG. 14**). The second transmission mixer may up-convert an RF signal in a first frequency band up-converted into the first frequency band in the first transmission mixer and divided by the divider circuit into an RF signal in a second frequency band, the multiple amplifiers may amplify the RF signal in the second frequency band and output the amplified RF signal through the multiple second antenna ports, the multiple low-noise amplifiers may low-noise-amplify a signal transferred from the multiple second antenna ports and transfer the low-noise-amplified signal to the second reception mixer, and the second reception mixer may down-convert the low-noise-amplified signal into an RF signal in a first frequency band.

According to various example embodiments, the electronic device may further include a 1:n1 divider (for example, the 1:n1 divider 1361 or 1461 in FIG. 13 or FIG. 14) configured to divide a signal received from the divider circuit and provide the divided signal to the multiple first antenna ports, and a 1:n2 divider (for example, the 1:n2 divider 1362 or 1462 in FIG. 13 or FIG. 14) configured to divide a signal and provide the divided signal to the multiple second antenna ports. The second transmission mixer may receive a signal from the divider circuit, up-convert the signal into an RF signal in a second frequency band, and provide the RF signal to the 1:n2 divider.

According to various example embodiments, the electronic device may further include a 1:n1 combiner (for example, the 1:n1 combiner 1371 or 1471 in FIG. 13 or FIG. 14) configured to combine signals transferred from the multiple first antenna ports and provide the combined signals to the divider circuit, and a 1:n2 combiner (for example, the 1:n2 combiner 1372 or 1472 in FIG. 13 or FIG. 14) configured to combine signals transferred from the multiple second antenna ports. The second reception mixer may down-convert a signal received from the 1:n2 combiner into an RF signal in a first frequency band and provide the RF signal to the combiner circuit.

According to various example embodiments, the electronic device may further include a power amplifier (for example, the power amplifier 633, 733, 833, 933, 1033, 1133, 1333, or 1433 n2 in FIG. 6A, FIG. 7, FIG. 8, FIG. 9, FIG. 10, FIG. 11, FIG. 13, or FIG. 14) configured to amplify power of a signal and provide the signal to the first transmission mixer, and a low-noise-amplifier (for example, the power amplifier 643, 743, 843, 943, 1043, 1143, 1343, or 1443 in FIG. 6A, FIG. 7, FIG. 8, FIG. 9, FIG. 10, FIG. 11, FIG. 13, or FIG. 14) configured to low-noise-amplify a signal transferred from the first reception mixer and output the signal.

According to various example embodiments, the electronic device may further include a second local oscillator (for example, the second local oscillator 634, 734, 861, 961, 1034, 1161, 1334, or 1451 in FIG. 6A, FIG. 7, FIG. 8, FIG. 9, FIG. 10, FIG. 11, FIG. 13, or FIG. 14) configured to generate a local oscillation frequency and provide the local oscillation frequency to the first transmission mixer or the first reception mixer, and a first local oscillator (for example, the first local oscillator 651, 751, 851, 951, 1051, 1151, 1351, or 1441 in FIG. 6A, FIG. 7, FIG. 8, FIG. 9, FIG. 10, FIG. 11, FIG. 13, or FIG. 14) configured to generate a local oscillation frequency and provide the local oscillation frequency to the second transmission mixer or the second reception mixer.

According to various example embodiments, the electronic device may further include a phase shifter. The phase shifter may adjust the phase of the local oscillation frequency generated in the first local oscillator and provide the phase-adjusted local oscillation frequency to the second transmission mixer or the second reception mixer.

According to various example embodiments, the electronic device may further include a first phase shifter configured to adjust the phase of the second frequency band signal up-converted in the second transmission mixer, and a second phase shifter configured to adjust the phase of the second frequency band signal provided to the second reception mixer.

According to various example embodiments, an electronic device may include a first antenna structure (for example, the first antenna structure 210 in FIG. 2) including multiple antenna elements (for example, the multiple first antenna elements 212 in FIG. 2) for mmWave band communication, a second antenna structure (for example, the second antenna structure 220 in FIG. 2) including multiple antenna elements (for example, the multiple first antenna elements 222 in FIG. 2) for THz high-frequency band communication, and a circuit (for example, the wireless communication circuit 230 and/or the IFIC 260 in FIG. 2) configured to transmit or receive a radio frequency signal through the first antenna structure or the second antenna structure. The circuit may include multiple first antenna ports (for example, the first antenna ports 611-1, . . . 611-*n*1, 711-1, . . . 711-*n*1, 811-1, . . . 811-*n*1, 911-1, . . . 911-*n*1, 1011-1, . . . 1011-*n*1, 1111-1, . . . 1111-*n*1, 1311-1, . . . 1311-*n*1, or 1411-1, . . . 1411-*n*1 in FIG. 6A, FIG. 7, FIG. 8, FIG. 9, FIG. 10, FIG. 11, FIG. 13, or FIG. 14) connected to the multiple antenna elements of the first antenna structure, multiple second antenna ports (for example, the second antenna ports 621-1, . . . 621-*n*2, 721-1, . . . 721-*n*2, 821-1, . . . 821-*n*2, 921-1, . . . 921-*n*2, 1021-1, . . . 1021-*n*2, 1121-1, . . . 1121-*n*2, 1321-1, . . . 1321-*n*2, or 1421-1, . . . 1421-*n*2 in FIG. 6A, FIG. 7, FIG. 8, FIG. 9, FIG. 10, FIG. 11, FIG. 13, or FIG. 14) connected to the multiple antenna elements of the second antenna structure, a first transmission mixer (for example, the transmission mixer 635, 735, 835, 935, 1035, 1135, 1335, or 1435 in FIG. 6A, FIG. 7, FIG. 8, FIG. 9, FIG. 10, FIG. 11, FIG. 13, or FIG. 14) configured to up-convert a signal, a first reception mixer (for example, the reception mixer 645, 745, 845, 945, 1045, 1145, 1345, or 1445 in FIG. 6A, FIG. 7, FIG. 8, FIG. 9, FIG. 10, FIG. 11, FIG. 13, or FIG. 14) configured to down-convert a signal, a second transmission mixer (for example, the second transmission mixer 655-1, . . . 655-*n*2, 755-1, . . . 755-*n*2, 855-1, . . . 855-*n*2, 955-1, . . . 955-*n*2, 1055-1, . . . 1055-*n*2, 1155-1, . . . 1155-*n*2, 1364, or 1464 in FIG. 6A, FIG. 7, FIG. 8, FIG. 9, FIG. 10, FIG. 11, FIG. 13, or FIG. 14) connected to the multiple second antenna ports and configured to up-convert a signal, a second reception mixer (for example, the second transmission mixer 656-1, . . . 656-*n*2, 756-1, . . . 756-*n*2, 856-1, . . . 856-*n*2, 956-1, . . . 956-*n*2, 1056-1, . . . 1056-*n*2, 1156-1, . . . 1156-*n*2, 1374, or 1474 in FIG. 6A, FIG. 7, FIG. 8, FIG. 9, FIG. 10, FIG. 11, FIG. 13, or FIG. 14) connected to the multiple second antenna ports and configured to down-convert a signal, a third transmission mixer (for example, the third transmission mixer 665 in FIG. 6B) configured to up-convert a signal and transfer the signal to the first transmission mixer, a third reception mixer (for example, the reception mixer 675 in FIG. 6B) configured to down-convert a signal transferred from the first reception mixer, a divider circuit (for example, the divider circuit 637, 737, 837, 937, 1037, 1137, 1337, or 1437 in FIG. 6A, FIG. 7, FIG. 8, FIG. 9, FIG. 10, FIG. 11, FIG. 13, or FIG. 14) configured to divide a signal up-converted in the first transmission mixer and transfer the signal to at least one of the multiple first antenna ports or the second transmission mixer, and a combiner circuit (for example, the combiner circuit 647, 747, 847, 947, 1047, 1147, 1347, or 1447 in FIG. 6A, FIG. 7, FIG. 8, FIG. 9, FIG. 10, FIG. 11, FIG. 13, or FIG. 14) configured to combine signals received from at least one of the multiple first antenna ports or the second reception mixer and provide the combined signals to the first reception mixer.

According to various example embodiments, the first transmission mixer may up-convert a signal into an RF signal in a first frequency band, and the second transmission mixer may up-convert the RF signal in the first frequency band up-converted by the first transmission mixer into an RF signal in a second frequency band.

According to various example embodiments, the second reception mixer may down-convert a signal received from the multiple second antenna ports into an RF signal in a first frequency band, and the first reception mixer may down-convert the RF signal in the first frequency band.

According to various example embodiments, the circuit may further include a 1:n1 divider configured to divide a signal received from the divider circuit and provide the divided signal to the multiple first antenna ports, and a 1:n2 divider configured to divide a signal and provide the divided signal to the multiple second antenna ports. The second transmission mixer may receive a signal from the divider circuit, up-convert the signal into an RF signal in a second frequency band, and provide the RF signal to the 1:n2 divider.

According to various example embodiments, the circuit may further include a 1:n1 combiner configured to combine signals transferred from the multiple first antenna ports and provide the combined signals to the divider circuit, and a 1:n2 combiner configured to combine signals transferred from the multiple second antenna ports. The second reception mixer may down-convert a signal received from the 1:n2 combiner into an RF signal in a first frequency band and provide the RF signal to the combiner circuit.

According to various example embodiments, the circuit may further include a power amplifier configured to amplify power of a signal and provide the signal to the first transmission mixer, and a low-noise-amplifier configured to low-noise-amplify a signal transferred from the first reception mixer and output the signal.

According to various example embodiments, the electronic device may further include at least one printed circuit board (for example, printed circuit boards 201 and/or 202), and the first antenna structure, the second antenna structure, and the circuit may be disposed on the at least one printed circuit board.

According to various example embodiments, the first antenna structure and the second antenna structure may be disposed on a first surface (for example, the first surface 401 in FIG. 4) of the at least one printed circuit board, and the wireless communication circuit may be disposed on a second surface (for example, the second surface 402 in FIG. 4) facing the first surface of the at least one printed circuit board.

According to various example embodiments, the electronic device may further include a housing. The at least one printed circuit board may include a flexible printed circuit board (FPCB). The first antenna structure may be disposed on a first surface of the housing, and the second antenna structure may be disposed on a second surface different from the first surface of the housing.

According to various example embodiments, an electronic device (for example, the electronic device 200 in FIG. 2) may include a first transmission mixer (for example, the third transmission mixer 665 in FIG. 6B) configured to up-convert transmission signals, a second transmission mixer (for example, the transmission mixer 635, 735, 835, 935, 1035, 1135, 1335, or 1435 in FIG. 6A, FIG. 7, FIG. 8, FIG. 9, FIG. 10, FIG. 11, FIG. 13, or FIG. 14) configured to up-convert signals output by the first transmission mixer, a divider circuit (for example, the divider circuit 637, 737, 837, 937, 1037, 1137, 1337, or 1437 in FIG. 6A, FIG. 7, FIG. 8, FIG. 9, FIG. 10, FIG. 11, FIG. 13, or FIG. 14) configured to divide signals output by the second transmission mixer, first antenna ports (for example, the first antenna ports 611-1, . . . **611-*n*1, 711-1, . . . 711-*n*1, 811-1, . . . 811-*n*1, 911-1, . . . 911-*n*1, 1011-1, . . . 1011-*n*1, 1111-1, . . . 1111-*n*1, 1311-1, . . . 1311-*n*1, or 1411-1, . . . 1411-*n*1 in FIG. 6A, FIG. 7, FIG. 8, FIG. 9, FIG. 10, FIG. 11, FIG. 13, or FIG. 14) associated with a first antenna structure for performing first frequency band communication based on signals output by the divider circuit; a third transmission mixer (for example, the second transmission mixer 655-1, . . . 655-*n*2, 755-1, . . . 755-*n*2, 855-1, . . . 855-*n*2, 955-1, . . . 955-*n*2, 1055-1, . . . 1055-*n*2, 1155-1, . . . 1155-*n*2, 1364, or 1464 in FIG. 6A, FIG. 7, FIG. 8, FIG. 9, FIG. 10, FIG. 11, FIG. 13, or FIG. 14) configured to up-convert output signals from the divider circuit; and second antenna ports (for example, the second antenna ports 621-1, . . . 621-*n*2, 721-1, . . . 721-*n*2, 821-1, . . . 821-*n*2, 921-1, . . . 921-*n*2, 1021-1, . . . 1021-*n*2, 1121-1, . . . 1121-*n*2, 1321-1, . . . 1321-*n*2, or 1421-1, . . . 1421-*n*2 in FIG. 6A, FIG. 7, FIG. 8, FIG. 9, FIG. 10, FIG. 11, FIG. 13, or FIG. 14**) associated with a second antenna structure for performing second frequency band communication based on signals output by the third transmission mixer.

According to various embodiments, the electronic device may further include a first local oscillator (for example, the first local oscillator 651, 751, 851, 951, 1051, 1151, 1351, or 1441 in FIG. 6A, FIG. 7, FIG. 8, FIG. 9, FIG. 10, FIG. 11, FIG. 13, or FIG. 14) configured to generate a local oscillation frequency and provide the local oscillation frequency to the third transmission mixer.

According to various embodiments, the electronic device may further include a phase shifter configured to adjust the phase of the local oscillation frequency generated by the first local oscillator and provide the phase-adjusted local oscillation frequency to the third transmission mixer.

According to various embodiments, the electronic device may further include a 1:2 divider (for example, the 1:2 divider 1231, 1232, 1233, 1363, or 1463 in FIG. 12A, FIG. 12B, FIG. 12C, FIG. 13, or FIG. 14) configured to divide the signals output by the second transmission mixer to be transferred to the first antenna ports or the third transmission mixer, a 1:n1 divider (for example, the 1:n1 divider 1361 or 1461 in FIG. 13 or FIG. 14) configured to divide signals output by the 1:2 divider to be transferred to the first antenna ports, and a 1:n2 divider (for example, the 1:n1 divider 1362 or 1462 in FIG. 13 or FIG. 14) configured to divide the signals output by the third transmission mixer to be transferred to the second antenna ports.

According to various embodiments, the first frequency band communication corresponds to 5G ($5^{th}$ generation) communication system using frequency band between 20 GHz to 60 GHz, and the second frequency band communication corresponds to 6G communication system using frequency bands between 100 GHz and 10 THz.

According to various embodiments, the electronic device may further include first phase shifters configured to adjust the phase of the signals output by the divider circuit, and first amplifiers configured to amplify power of signals output by the first phase shifters to be transferred to the first antenna ports.

According to various embodiments, the electronic device may further include second phase shifters configured to adjust the phase of the signals output by the third transmission mixer, and second amplifiers configured to amplify power of signals output by the second phase shifters to be transferred to the second antenna ports.

According to various embodiments, the electronic device may further include a first reception mixer (for example, the second reception mixer 656-1, . . . **656-*n*2, 756-1, . . . 756-*n*2, 856-1, . . . 856-*n*2, 956-1, . . . 956-*n*2, 1056-1, . . . 1056-*n*2, 1156-1, . . . 1156-*n*2, 1374, or 1474 in FIG. 6A, FIG. 7, FIG. 8, FIG. 9, FIG. 10, FIG. 11, FIG. 13, or FIG. 14) configured to down-convert signals received from the second antenna ports, a combiner circuit (for example, the combiner circuit 647, 747, 847, 947, 1047, 1147, 1347, or 1447 in FIG. 6A, FIG. 7, FIG. 8, FIG. 9, FIG. 10, FIG. 11, FIG. 13, or FIG. 14) configured to combine signals received from the first antenna ports or signals output by the first reception mixer, a second reception mixer (for example, the reception mixer 645, 745, 845, 945, 1045, 1145, 1345, or 1445 in FIG. 6A, FIG. 7, FIG. 8, FIG. 9, FIG. 10, FIG. 11, FIG. 13, or FIG. 14) configured to down-convert signals output by the combiner circuit, and a third reception mixer (for example, the reception mixer 675 in FIG. 6**B) configured to down-convert signals output by the second reception mixer.

According to various embodiments, the electronic device may further include a 1:n1 combiner (for example, the 1:n1 divider 1361 or 1461 in FIG. 13 or FIG. 14) configured to combine the signals received from the first antenna ports, and a 1:n2 (for example, the 1:n2 combiner 1372 or 1472 in FIG. 13 or FIG. 14) configured to combine the signals output by the first reception mixer.

According to various embodiments, the electronic device may further include a 1:2 combiner configured to combine signals output by the 1:n1 combiner or signals output by the first reception mixer.

According to various embodiments, the second reception mixer is configured to down-convert signals output by the 1:2 combiner.

According to various embodiments, the electronic device may include a first antenna structure (for example, the first antenna structure 210 in FIG. 2) comprising antenna elements (for example, the multiple first antenna elements 212 in FIG. 2) for performing first frequency band communication, a second antenna structure (for example, the second antenna structure 220 in FIG. 2) comprising antenna elements (for example, the multiple first antenna elements 222 in FIG. 2) for performing second frequency band communication, and a circuit (for example, the wireless communication circuit 230 and/or the IFIC 260 in FIG. 2) configured to transmit or receive a radio frequency signal through the first antenna structure or the second antenna structure. The circuit may include a first transmission mixer (for example, the third transmission mixer 665 in FIG. 6B) configured to up-convert transmission signals, a second transmission mixer (for example, the transmission mixer 635, 735, 835, 935, 1035, 1135, 1335, or 1435 in FIG. 6A, FIG. 7, FIG. 8, FIG. 9, FIG. 10, FIG. 11, FIG. 13, or FIG. 14) configured to up-convert signals output by the first transmission mixer, a divider circuit (for example, the divider circuit 637, 737, 837, 937, 1037, 1137, 1337, or 1437 in FIG. 6A, FIG. 7, FIG. 8, FIG. 9, FIG. 10, FIG. 11, FIG. 13, or FIG. 14) configured to divide signals output by the second transmission mixer, first antenna ports (for example, the first antenna ports 611-1, **611-*n*1, 711-1, . . . 711-*n*1, 811-1, . . . 811-*n*1, 911-1, . . . 911-*n*1, 1011-1, . . . 1011-*n*1, 1111-1, . . . 1111-*n*1, 1311-1, . . . 1311-*n*1, or 1411-1, . . . 1411-*n*1 in FIG. 6A, FIG. 7, FIG. 8, FIG. 9, FIG. 10, FIG. 11, FIG. 13, or FIG. 14) associated with the first antenna structure for performing first frequency band communication based on signals output by the divider circuit, a third transmission mixer (for example, the second transmission mixer 655-1, . . . 655-*n*2, 755-1, 755-*n*2, 855-1, . . . 855-*n*2, 955-1, . . . 955-*n*2, 1055-1, . . . 1055-*n*2, 1155-1, . . . 1155-*n*2, 1364, or 1464 in FIG. 6A, FIG. 7, FIG. 8, FIG. 9, FIG. 10, FIG. 11, FIG. 13, or FIG. 14) configured to up-convert output signals from the divider circuit, and second antenna ports (for example, the second antenna ports 621-1, . . . 621-*n*2, 721-1, . . . 721-*n*2, 821-1, . . . 821-*n*2, 921-1, . . . 921-*n*2, 1021-1, . . . 1021-*n*2, 1121-1, . . . 1121-*n*2, 1321-1, . . . 1321-*n*2, or 1421-1, . . . 1421-*n*2 in FIG. 6A, FIG. 7, FIG. 8, FIG. 9, FIG. 10, FIG. 11, FIG. 13, or FIG. 14**) associated with the second antenna structure for performing second frequency band communication based on signals output by the third transmission mixer.

Embodiments of the disclosure provided in the specification and the drawings are only specific examples presented to easily describe the technical content according to embodiments of the disclosure and to help understanding of embodiments of the disclosure, and are not intended to limit the scope of embodiments of the disclosure. Therefore, the scope of various embodiments of the disclosure is to be interpreted as encompassing not only embodiments disclosed herein, but also all changed or modified forms derived based on the technical idea of various embodiments of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a first transmission mixer configured to up-convert transmission signals;

a second transmission mixer configured to up-convert signals output by the first transmission mixer;

a divider circuit configured to divide signals output by the second transmission mixer;

first antenna ports associated with a first antenna structure for performing first frequency band communication based on signals output by the divider circuit;

a third transmission mixer configured to up-convert output signals from the divider circuit; and second antenna ports associated with a second antenna structure for performing second frequency band communication based on signals output by the third transmission mixer.

2. The electronic device of claim 1, further comprising:

a first local oscillator configured to generate a local oscillation frequency and provide the local oscillation frequency to the third transmission mixer.

3. The electronic device of claim 2, further comprising:

a phase shifter configured to adjust the phase of the local oscillation frequency generated by the first local oscillator and provide the phase-adjusted local oscillation frequency to the third transmission mixer.

4. The electronic device of claim 1, further comprising:

a 1:2 divider configured to divide the signals output by the second transmission mixer to be transferred to the first antenna ports or the third transmission mixer;

a 1:n1 divider configured to divide signals output by the 1:2 divider to be transferred to the first antenna ports; and a 1:n2 divider configured to divide the signals output by the third transmission mixer to be transferred to the second antenna ports.

5. The electronic device of claim 1, wherein the first frequency band communication corresponds to 5G (5$^{th}$ generation) communication system using frequency band between 20 GHz to 60 GHz, and the second frequency band communication corresponds to 6G communication system using frequency bands between 100 GHz and 10 THz.

6. The electronic device of claim 1, further comprising:

first phase shifters configured to adjust the phase of the signals output by the divider circuit; and first amplifiers configured to amplify power of signals output by the first phase shifters to be transferred to the first antenna ports.

7. The electronic device of claim 6, further comprising:

second phase shifters configured to adjust the phase of the signals output by the third transmission mixer; and second amplifiers configured to amplify power of signals output by the second phase shifters to be transferred to the second antenna ports.

8. The electronic device of claim 1, further comprising:

a first reception mixer configured to down-convert signals received from the second antenna ports;

a combiner circuit configured to combine signals received from the first antenna ports or signals output by the first reception mixer;

a second reception mixer configured to down-convert signals output by the combiner circuit; and a third reception mixer configured to down-convert signals output by the second reception mixer.

9. The electronic device of claim 8, further comprising:

a 1:n1 combiner configured to combine the signals received from the first antenna ports; and a 1:n2 combiner configured to combine the signals output by the first reception mixer.

10. The electronic device of claim 9, further comprising:

a 1:2 combiner configured to combine signals output by the 1:n1 combiner or signals output by the first reception mixer.

11. The electronic device of claim 10, wherein the second reception mixer is configured to down-convert signals output by the 1:2 combiner.

12. An electronic device comprising:

a first antenna structure comprising antenna elements for performing first frequency band communication;

a second antenna structure comprising antenna elements for performing second frequency band communication; and a circuit configured to transmit or receive a radio frequency signal through the first antenna structure or the second antenna structure, wherein the circuit comprises:

a first transmission mixer configured to up-convert transmission signals;

a second transmission mixer configured to up-convert signals output by the first transmission mixer;

a divider circuit configured to divide signals output by the second transmission mixer;

first antenna ports associated with the first antenna structure for performing first frequency band communication based on signals output by the divider circuit;

a third transmission mixer configured to up-convert output signals from the divider circuit; and second antenna ports associated with the second antenna structure for performing second frequency band communication based on signals output by the third transmission mixer.

13. The electronic device of claim 12, wherein the circuit further comprises:

a first local oscillator configured to generate a local oscillation frequency and provide the local oscillation frequency to the third transmission mixer.

14. The electronic device of claim 13, wherein the circuit further comprises:

a phase shifter configured to adjust the phase of the local oscillation frequency generated by the first local oscillator and provide the phase-adjusted local oscillation frequency to the third transmission mixer.

15. The electronic device of claim 12, wherein the circuit further comprises:

a 1:2 divider configured to divide the signals output by the second transmission mixer to be transferred to the first antenna ports or the third transmission mixer;

a 1:n1 divider configured to divide signals output by the 1:2 divider to be transferred to the first antenna ports; and a 1:n2 divider configured to divide the signals output by the third transmission mixer to be transferred to the second antenna ports.

16. The electronic device of claim 12, wherein the first frequency band communication corresponds to 5G ($5^{th}$ generation) communication system using frequency band between 20 GHz to 60 GHz, and the second frequency band communication corresponds to 6G communication system using frequency bands between 100 GHz and 10 THz.

17. The electronic device of claim 12, wherein the circuit further comprises:

a first reception mixer configured to down-convert signals received from the second antenna ports;

a combiner circuit configured to combine signals received from the first antenna ports or signals output by the first reception mixer;

a second reception mixer configured to down-convert signals output by the combiner circuit; and a third reception mixer configured to down-convert signals output by the second reception mixer.

18. The electronic device of claim 12, further comprising at least one printed circuit board, wherein the first antenna structure, the second antenna structure, and the circuit are disposed on the at least one printed circuit board.

19. The electronic device of claim 18, wherein the first antenna structure and the second antenna structure are disposed on a first surface of the at least one printed circuit board, and the circuit is disposed on a second surface facing the first surface of the at least one printed circuit board.

20. The electronic device of claim 18, further comprising a housing, wherein the at least one printed circuit board comprises a flexible printed circuit board (FPCB), and wherein the first antenna structure is disposed on a first surface of the housing, and the second antenna structure is disposed on a second surface different from the first surface of the housing.

* * * * *